(12) United States Patent
Bowron

(10) Patent No.: US 12,534,900 B2
(45) Date of Patent: **\*Jan. 27, 2026**

(54) STRUCTURAL MODULAR BUILDING CONNECTOR

(71) Applicant: Z-MODULAR HOLDING, INC., Chicago, IL (US)

(72) Inventor: Julian Bowron, Toronto (CA)

(73) Assignee: Z-MODULAR HOLDING, INC., Chicago, IL (US)

( \* ) Notice: Subject to any disclaimer, the term of this patent is extended or adjusted under 35 U.S.C. 154(b) by 47 days.

This patent is subject to a terminal disclaimer.

(21) Appl. No.: 18/234,207

(22) Filed: Aug. 15, 2023

(65) Prior Publication Data

US 2023/0392366 A1    Dec. 7, 2023

Related U.S. Application Data

(60) Continuation of application No. 17/727,660, filed on Apr. 22, 2022, now Pat. No. 11,739,520, which is a
(Continued)

(51) Int. Cl.
*E04B 1/19* (2006.01)
*E04B 1/24* (2006.01)
(Continued)

(52) U.S. Cl.
CPC .............. *E04B 1/1903* (2013.01); *E04B 1/24* (2013.01); *E04B 1/34326* (2013.01);
(Continued)

(58) Field of Classification Search
CPC .. E04B 1/1903; E04B 1/40; E04B 2001/1978; E04B 2001/2451;
(Continued)

(56) References Cited

U.S. PATENT DOCUMENTS

| 946,423 A | 1/1910 | Connaty |
|---|---|---|
| 2,037,736 A | 4/1936 | Payne |

(Continued)

FOREIGN PATENT DOCUMENTS

| AU | 2014221181 B2 | 3/2018 |
|---|---|---|
| AU | 2018204197 A1 | 7/2018 |

(Continued)

OTHER PUBLICATIONS

Extended European Search Report issued against corresponding EP Patent Application No. 21152108.3 dated May 4, 2021 in English (7 pages).

(Continued)

*Primary Examiner* — Rodney Mintz
(74) *Attorney, Agent, or Firm* — Fitch, Even, Tabin & Flannery, LLP

(57) ABSTRACT

A connector assembly, having an upper connector coupled to a lower connector and a gusset plate sandwiched between the upper and lower connectors. Also, disclosed is a hoistable connector assembly, a lifting frame assembly, a coupling system for modular frame units, a method for assembling a module unit using the connector assembly, and a modular frame unit and building having the connector assembly.

28 Claims, 40 Drawing Sheets

Related U.S. Application Data continuation of application No. 17/184,146, filed on Feb. 24, 2021, now abandoned, which is a continuation of application No. 16/655,823, filed on Oct. 17, 2019, now Pat. No. 10,947,716, which is a division of application No. 15/843,533, filed on Dec. 15, 2017, now Pat. No. 10,450,737, which is a continuation of application No. 15/307,723, filed as application No. PCT/CA2015/050369 on Apr. 30, 2015, now Pat. No. 9,845,595.

(60) Provisional application No. 61/986,438, filed on Apr. 30, 2014.

(51) Int. Cl.
*E04B 1/343* (2006.01)
*E04B 1/348* (2006.01)
*E04B 1/98* (2006.01)
*E04H 1/00* (2006.01)
*F16B 7/00* (2006.01)
*F16B 7/18* (2006.01)
*F16B 9/02* (2006.01)
*F16S 3/04* (2006.01)

(52) U.S. Cl.
CPC ........ *E04B 1/34384* (2013.01); *E04B 1/3483* (2013.01); *E04B 1/98* (2013.01); *E04H 1/005* (2013.01); *F16B 7/00* (2013.01); *F16B 7/185* (2013.01); *F16S 3/04* (2013.01); *E04B 2001/1957* (2013.01); *E04B 2001/1972* (2013.01); *E04B 2001/2406* (2013.01); *E04B 2001/2451* (2013.01); *E04B 2001/2484* (2013.01); *E04B 2001/2496* (2013.01); *F16B 9/02* (2013.01)

(58) Field of Classification Search
CPC ..... E04B 2001/2403; E04B 2001/2406; E04B 2001/2472; E04B 2001/2418; E04B 1/24; E04B 1/34384; E04B 1/3483; E04B 1/98; E04B 2001/2484; E04B 2001/2496; F16B 7/0486; F16B 7/185; B66C 1/66; Y10T 403/342; Y10T 403/341; Y10T 403/347; Y10T 403/44; Y10T 403/4602; Y10T 403/73; Y10T 403/555; Y10T 403/42; E04H 1/005
USPC ....... 52/79.1, 79.2, 79.3, 79.9, 79.13, 125.2, 52/655.1, 655.2; 403/170, 171, 173, 174, 403/176, 202, 205
See application file for complete search history.

(56) References Cited

U.S. PATENT DOCUMENTS

| | | |
|---|---|---|
| 3,205,611 A | 9/1965 | Onanian |
| 3,416,270 A | 12/1968 | Mchugh |
| 3,824,750 A | 7/1974 | Antoniou |
| 3,858,989 A | 1/1975 | Field |
| 3,973,855 A | 8/1976 | Florence |
| 4,003,144 A | 1/1977 | Maddestra |
| D248,447 S | 7/1978 | Hornung |
| D258,194 S | 2/1981 | Stanley |
| 4,620,404 A | 11/1986 | Rizk |
| 4,726,701 A | 2/1988 | Thomas |
| 4,758,111 A | 7/1988 | Vitta |
| 4,925,330 A | 5/1990 | Cornish |
| 5,066,161 A | 11/1991 | Pinney |
| 5,127,759 A | 7/1992 | Orbom |
| 5,259,685 A | 11/1993 | Gilb |
| D357,544 S | 4/1995 | Spransy |
| 5,414,918 A | 5/1995 | Pearson |
| 5,451,115 A | 9/1995 | Sayres |
| 5,516,225 A | 5/1996 | Kvols |
| 5,556,218 A | 9/1996 | Homer |
| 5,590,974 A | 1/1997 | Yang |
| 5,605,410 A | 2/1997 | Pantev |
| 5,727,358 A | 3/1998 | Hayashi |
| 5,816,011 A | 10/1998 | Kuramoto |
| 5,820,289 A | 10/1998 | Kern |
| 5,904,437 A | 5/1999 | Allen |
| 5,921,049 A | 7/1999 | Sugiyama |
| 6,062,761 A | 5/2000 | Allen |
| 6,092,849 A | 7/2000 | Zambelli |
| 6,247,869 B1 | 6/2001 | Lichvar |
| 6,332,657 B1 | 12/2001 | Fischer |
| 6,334,286 B1 | 1/2002 | Zambelli |
| 6,390,719 B1 | 5/2002 | Chan |
| 6,974,276 B2 | 12/2005 | Kirchner |
| 7,334,377 B2 | 2/2008 | Dubensky |
| 7,503,623 B2 | 3/2009 | Favaretto |
| D622,865 S | 8/2010 | Bajrami |
| 7,883,288 B2 | 2/2011 | Jorna |
| 7,941,985 B2 | 5/2011 | Simmons |
| 8,176,703 B2 | 5/2012 | Tremacchi |
| 8,671,644 B2 | 3/2014 | Huang |
| 9,121,433 B1 | 9/2015 | Bacon |
| D756,202 S | 5/2016 | Leduc |
| 9,334,642 B1 | 5/2016 | Tanaka |
| 9,458,619 B2 | 10/2016 | Bowron |
| 9,845,595 B2 | 12/2017 | Bowron |
| 9,932,734 B1 | 4/2018 | Winter |
| 10,036,156 B1 | 7/2018 | Macdonald |
| 10,450,737 B2 | 10/2019 | Bowron |
| D867,108 S | 11/2019 | Bowron |
| 10,526,781 B2 * | 1/2020 | Lestini ................. E04B 1/1912 |
| 11,739,520 B2 * | 8/2023 | Bowron ................... F16B 7/00 52/655.1 |
| 2002/0007614 A1 | 1/2002 | Katayama |
| 2005/0034390 A1 | 2/2005 | Dubensky |
| 2006/0112657 A1 | 6/2006 | Abbot-Wilcox |
| 2009/0087255 A1 | 4/2009 | Jorna |
| 2009/0205276 A1 | 8/2009 | Tremacchi |
| 2009/0307994 A1 | 12/2009 | Cathcart |
| 2011/0219708 A1 | 9/2011 | Ohnishi |
| 2011/0286121 A1 | 11/2011 | Werner |
| 2011/0308063 A1 | 12/2011 | Feeleus |
| 2013/0045042 A1 | 2/2013 | Ohlson |
| 2013/0306808 A1 | 11/2013 | Huang |
| 2014/0102993 A1 | 4/2014 | Werner |
| 2014/0286695 A1 | 9/2014 | Jocham |
| 2014/0294500 A1 | 10/2014 | Schaaf |
| 2015/0184369 A1 | 7/2015 | Carless |
| 2016/0002909 A1 | 1/2016 | Bowron |
| 2017/0002559 A1 | 1/2017 | Bowron |
| 2017/0044753 A1 | 2/2017 | Bowron |
| 2017/0089059 A1 | 3/2017 | Farre Berga |
| 2018/0127967 A1 | 5/2018 | Bowron |
| 2018/0135295 A1 | 5/2018 | Bowron |
| 2018/0216336 A1 | 8/2018 | Macdonald |
| 2019/0024365 A1 * | 1/2019 | Lestini ..................... E04H 5/02 |
| 2019/0078321 A1 | 3/2019 | Bowron |
| 2019/0136504 A1 | 5/2019 | Burgess |
| 2019/0330838 A1 | 10/2019 | Bowron |
| 2020/0354950 A1 | 11/2020 | Bowron |
| 2021/0180311 A1 * | 6/2021 | Bowron ................... F16B 7/00 |
| 2021/0277649 A1 * | 9/2021 | Bowron ............. E04B 1/34331 |
| 2022/0243453 A1 * | 8/2022 | Bowron ............. E04B 1/34384 |

FOREIGN PATENT DOCUMENTS

| | | |
|---|---|---|
| CA | 2744074 A1 | 12/2011 |
| CN | 1149651 A | 5/1997 |
| CN | 2381869 Y | 6/2000 |
| CN | 101575876 A | 11/2009 |
| CN | 101680227 A | 3/2010 |
| CN | 101769008 A | 7/2010 |
| CN | 202559534 U | 11/2012 |
| CN | 202672346 U | 1/2013 |
| CN | 203834666 U | 9/2014 |
| CN | 104612250 A | 5/2015 |

(56) References Cited

FOREIGN PATENT DOCUMENTS

| | | | | |
|---|---|---|---|---|
| DE | 249688 | A1 | 9/1987 | |
| DE | 19517785 | A1 | 11/1996 | |
| DE | 69704916 | T2 | 11/2001 | |
| EP | 0761895 | A1 | 3/1997 | |
| EP | 1683923 | A2 | 7/2006 | |
| EP | 2759648 | A1 | 7/2014 | |
| EP | 2818429 | A1 * | 12/2014 | ........... E04B 1/3483 |
| EP | 2959067 | A4 | 2/2017 | |
| GB | 2300432 | A | 11/1996 | |
| GB | 2554967 | A | 4/2018 | |
| JP | S52-094009 | U | 7/1977 | |
| JP | S62-031604 | U | 2/1987 | |
| JP | S63-179306 | U | 11/1988 | |
| JP | H03-066303 | U | 6/1991 | |
| JP | H03-224926 | A | 10/1991 | |
| JP | H03233042 | A | 10/1991 | |
| JP | H03267431 | A | 11/1991 | |
| JP | H03267431 | B1 | 11/1991 | |
| JP | H04-098904 | U | 8/1992 | |
| JP | H04261733 | A | 9/1992 | |
| JP | H05195584 | A | 8/1993 | |
| JP | H0642060 | A | 2/1994 | |
| JP | H07180221 | A | 7/1995 | |
| JP | H07180228 | A | 7/1995 | |
| JP | 3014203 | U | 8/1995 | |
| JP | H07243239 | A | 9/1995 | |
| JP | H07300901 | A | 11/1995 | |
| JP | H0967869 | A | 3/1997 | |
| JP | H09194179 | A | 7/1997 | |
| JP | H09278352 | A | 10/1997 | |
| JP | H10245929 | A | 9/1998 | |
| JP | H10331267 | A | 12/1998 | |
| JP | 2001214530 | A | 8/2001 | |
| JP | 2002081140 | A | 3/2002 | |
| JP | 2003293458 | A | 10/2003 | |
| JP | 2004270438 | A | 9/2004 | |
| JP | 2005139623 | A | 6/2005 | |
| JP | 2006063787 | A | 3/2006 | |
| JP | 2009024419 | A | 2/2009 | |
| JP | 2010112008 | A | 5/2010 | |
| JP | 2010168889 | A | 8/2010 | |
| JP | 2013167131 | A | 8/2013 | |
| JP | 2013245501 | A | 12/2013 | |
| JP | 2016513192 | A | 5/2016 | |
| JP | 2017515027 | A | 6/2017 | |
| JP | 2018529913 | A | 10/2018 | |
| KR | 100923637 | B1 | 10/2009 | |
| KR | 20110053101 | A | 5/2011 | |
| KR | 10-1233559 | B1 | 2/2013 | |
| KR | 101676411 | B1 | 11/2016 | |
| KR | 20160148659 | A | 12/2016 | |
| TW | 294752 | B | 1/1997 | |
| WO | 9836134 | A1 | 8/1998 | |
| WO | 03069083 | A1 | 8/2003 | |
| WO | 2004035952 | A1 | 4/2004 | |
| WO | 2006096997 | A1 | 9/2006 | |
| WO | 2006122372 | A1 | 11/2006 | |
| WO | 2007144913 | A1 | 12/2007 | |
| WO | 2010035816 | A1 | 4/2010 | |
| WO | 2012083391 | A1 | 6/2012 | |
| WO | 2012129601 | A1 | 10/2012 | |
| WO | 2012129701 | A1 | 10/2012 | |
| WO | 2014127472 | A1 | 8/2014 | |
| WO | 2015164975 | A1 | 11/2015 | |
| WO | 2016165022 | A1 | 10/2016 | |
| WO | 2017027965 | A1 | 2/2017 | |
| WO | 2018132921 | A1 | 7/2018 | |
| WO | 2019016617 | A1 | 1/2019 | |
| WO | 2019162712 | A1 | 8/2019 | |

OTHER PUBLICATIONS

Office Action issued against corresponding South Korean Patent Application No. 10-2016-7033280 dated Apr. 26, 2021 in English and Korean (23 pages).
Certificate of Grant issued for corresponding Malaysian Patent Application No. 2016001907 dated Oct. 27, 2020 in English (5 pages).
Search Report issued against corresponding Brazilian Patent Application No. BR112016025375-2 dated Jul. 12, 2020 with English machine translation ( 11 pages).
Search Report issued against corresponding Chinese Patent Application No. 2019104842745 dated Oct. 27, 2020 with English translation ( 11 pages).
Communication under Rule 71(3) EPC issued for corresponding European Patent Application No. 15 785 510.7 dated Aug. 3, 2020 in English (6 pages).
Office Action issued against corresponding Indonesian Patent Application No. P00201607453 dated Apr. 30, 2020 with English machine translation (4 pages).
Office Action issued against corresponding Indonesian Patent Application No. P00201607453 dated Aug. 24, 2020 with English machine translation (4 pages).
Office Acton issued against corresponding Japanese Patent Application No. 2017-508717 dated Nov. 24, 2020 with English machine translation (9 pages).
Office Action issued against corresponding Mexican Patent Application No. MX/a/2016/014274 dated Aug. 26, 2020 with English machine translation (6 pages).
Office Action issued against corresponding Japanese Patent Application No. 2018-505507 dated Nov. 17, 2020 with English translation (6 pages).
International Preliminary Report on Patentability issued for corresponding International Application No. PCT/CA2019/050960 dated Jan. 12, 2021 (4 pages).
Office Action issued against corresponding EP Patent Application No. 14 754 894.5 dated Apr. 16, 2021 in English (5 pages).
Office Action issued against corresponding CN Patent Application No. 201880013277.4 dated May 27, 2021 with English translation (26 pages).
Office Action issued against corresponding IN Patent Application No. 201917030094 dated May 19, 2021 with English translation (7 pages).
Office Action issued against corresponding MX Patent Application No. MX/a/2017/013296 dated May 17, 2021 with English translation (10 pages).
Office Action issued against corresponding JP Patent Application 2018-505507 dated Jun. 14, 2021 with English translation (6 pages).
Brazilian Patent Office, Application No. BR112015020099-0; Office Action dated Oct. 6, 2021. (in Portuguese with English translation).
Office Action issued against corresponding CA Patent Application No. 2,901,755; dated Sep. 7, 2021 (3 pages).
Office Action issued against corresponding EP Patent Application No. 16836312.5 dated Aug. 27, 2021 (5 pages).
Office Action issued against AU Patent Application No. 2020260531; dated Aug. 19, 2021 (4 pages).
Office Action issued against AU Patent Application No. 2019283912; dated Sep. 27, 2021 (4 pages).
Cnipa, Application No. 201880013277.4; Office Action dated Jan. 21, 2022. (in Chinese with English translation).
EPO; Application No. 18741568.2; Intention to Grant dated Oct. 18, 2021.
JPO; Application No. 2019-540006; Office Action dated Oct. 5, 2021.
IMPI; Application No. MX/a/2018/001821 ; Office Action dated Mar. 11, 2022. (Related case; Machine translation).
KIPO; Application No. 10-2019-7024117; Office Action dated Feb. 24, 2022. (Related case; Machine translation).
Examination Report dated May 17, 2022, in Brazilian Application No. BR112018002870-3, 9 pages.
Written Opinion dated May 2, 2022, in Singaporean Application No. 11202100236X, 6 pages.
Search and Examination Reports dated Apr. 28, 2022, in United Arab Emirates Application No. P6000248/2018, 12 pages.

(56) References Cited

OTHER PUBLICATIONS

Communication dated Mar. 25, 2022, in European Application No. 16836312.5, 4 pages.
Communication dated Feb. 25, 2022, in European Application No. 19833475.7, 6 pages.
Examination Report dated Mar. 16, 2022, in Brazilian Application No. BR112015020099-0, 6 pages.
European Search Report dated Jul. 8, 2022, for European Application No. 22165259.7 (12 pages).
Examination Report dated Jul. 28, 2022, for Indian App. No. 202147003273 (6 pages).
Office Action dated Jun. 20, 2022, in Korean Application No. 10-2022-7011193 , with English language machine translation (7 pages).
Office Action dated Jun. 21, 2022, in Japanese Patent Application No. JP 2021-108974, with English language machine translation (7 pages).
Office Action dated Aug. 1, 2022, in Chinese Application No. 201980054125.3, together with English language translation thereof (36 pages).
Supplementary European Search Report for corresponding application No. PCT/CA2014050110 dated Feb. 17, 2017.
Office Action Issued on basis of Art 35 in corresponding Brazilian Patent Application BR112019014771-3 (Portuguese with English translation) dated Nov. 1, 2022.
Office Action Issued against corresponding Mexican Patent Application No. MX/a/2019/008532 (Spanish with English Translation) dated Oct. 19, 2022.
Search Report dated Nov. 30, 2022, in Singapore Application No. 10201900884S (2 pages).
Written Opinion dated Dec. 1, 2022, in Singapore Application No. 10201900884S (6pages).
Office Action issued against corresponding United Arab Emirates Patent Application No. P6000248/2018 dated Sep. 19, 2023 English Translation (5 pages).
Office Action issued against corresponding Japanese Patent Application No. 2021-500562 dated Aug. 2, 2023 English Translation (6 pages).
Office Action issued against corresponding EP Patent Application No. 21152108.3 dated Sep. 12, 2023 (5 pages).
Office Action issued against corresponding BR Patent Application No. BR112021000532-3 dated Jun. 28, 2023 (8 pages).
Office Action issued against corresponding Korean Patent Application No. 10-2018-7006810 dated Aug. 30, 2023 English Translation (16 pages).
Office Action issued against corresponding Japanese Patent Application No. 2022-016873 dated Sep. 28, 2023 English Translation (4 pages).
Technical Examination report issued against corresponding Brazilian Application No. BR112021000532-3; mailed Dec. 20, 2023 In Portuguese with English Machine Translation ( 8 pages).
Office Action issued against corresponding Korean Application No. 10-2021-7004068; mailed Dec. 18, 2023 In Korean with English Machine Translation ( 24 pages).
Examination Report issued against corresponding United Arab Emirates Application No. P6000048/ 2021; mailed Sep. 5, 2023; In English (7 pages).
Search Report issued against corresponding United Arab Emirates Application No. P6000048/ 2021; mailed Sep. 5, 2023; In English (2 pages).
Partial acceptance issued against corresponding United Arab Emirates Application No. P6000048/ 2021; mailed Dec. 18, 2023; In Arabic with English Translation (2 pages).
Extended European Search Report for corresponding application No. PCT/CA2014050110 dated Jan. 20, 2017.
Written Opinion issued by the Canadian Intellectual Property Office for International Application No. PCT/2016/050954 dated Oct. 14, 2016, 8 pages.
Extended European Search Report issued against corresponding International Application PCT/CA2015050369 dated Nov. 20, 2017. Information on Search Strategy.
Office Action issued against corresponding Japanese Patent Application No. JP2015-558313 dated Mar. 6, 2018.
5 Chinese Office Action dated Jun. 19, 2018.
Extended European Search Report issued against International Application No. PCT/CA2016050954 dated Feb. 14, 6 2019.
Extended European Search Report issued against International Application No. PCT/CA2014050110 dated Jan. 20, 7 2017.
Office Action issued against corresponding Japanese Application 2017-508717 dated Feb. 26, 2019.
First Office Action and Search Report for corresponding Chinese Patent Application No. 201680027827 .9 dated Apr. 15, 2019.
Written Opinion of the International Searching Authority for PCT/CA2015050369 dated Jul. 14, 2015.
Office Action issued against corresponding Chinese Application No. 201480022662.7 dated Jul. 18, 2017.
International Search Report for International Application No. PCT/CA2016/050954 dated Oct. 14, 2016, 5 pages.
International Search Report for International Application No. PCT/CA2018/050065 dated Apr. 16, 2018, 4 pages.
Written Opinion of the International Searching Authority for PCT/CA2018/050065 dated Apr. 16, 2018, 5 pages.
International Search Report for International Application No. PCT/CA2016/050434 dated Jun. 23, 2016.
Written Opinion of the International Searching Authority for International Application No. PCT/CA2014/050110 dated May 5, 2014.
Written Opinion of the International Searching Authority for PCT/CA2016050434 dated Jun. 23, 2016.
IPOS Written Opinion issued against corresponding Singaporean Patent Application No. 11201906602S dated Sep. 4, 2020 in English (7 pages) .
Office Action issued against corresponding Chinese Patent Application No. 201880013 277.4 dated Oct. 27, 2020 in Chinese (13 pages).
Office Action issued against corresponding Indonesian Patent Application No. P00201904813 dated Sep. 14, 2020; English translation submitted herewith (4 pages).
First Examination Report issued against corresponding Australian Patent Application No. 2016247454 dated May 20, 2020 in English (8 pages).
Second Examination Report issued against corresponding Australian Patent Application No. 2016247454 dated Jun. 23, 2020 in English (9 pages).
Office Action issued against corresponding Brazilian Patent Application No. BR112018002870-3 dated Aug. 5, 2020 in Portuguese (4 pages).
Office Action issued against corresponding Chinese Patent Application No. 2016800526457 dated Jun. 9, 2020 in Chinese and English (8 pages).
Office Action issued against corresponding Japanese Patent Application No. 2018-526978 dated Aug. 21, 2020 in Japanese and English (14 pages).
Office Action issued against corresponding Brazilian Patent Application No. BR112015020099 dated Jun. 2, 2020 in Portuguese (4 pages).
Written Opinion issued by the Intellectual Property Office of Singapore for International Application No. PCT/CA2014/050110 dated May 2, 2016, 5 pages.
PCT International Search Report for International Application No. PCT/CA2014/050110 dated May 5, 2014, 4 pages.
English translation of Office Action issued against corresponding Japanese patent application 2018-218118, dated Dec. 17, 2019.
Substantive Examination Report issued by the Intellectual PropertyCorporation of Malaysia against corresponding Malaysian patent application PI 2016001907, dated Jan. 16, 2020.
Examination Report issued by Intellectual Property India against corresponding Indian patent application 201617036767, dated Feb. 21, 2020.
English translation of First Office Action issued against corresponding Japanese patent application 20 17-50871 7, dated Dec. 24, 2019.

(56) References Cited

OTHER PUBLICATIONS

Form 2906 issued by EPO against corresponding EPO patent application 14 754 894 .5, dated Nov. 25, 2019 (in English).
Notice of Grant of Patent issued for corresponding Chinese Patent Application No. 201810153991.5 dated Mar. 30, 2021 with English translation ( 4 pages).
Office Action issued against corresponding South Korean Patent Application No. 10-2021-7005101 dated Apr. 28, 2021 with English translation (7 pages).
Office Action issued against corresponding Chinese Patent Application No. 201880013277.4 dated Oct. 27, 2020 with English translation ( 42 pages).
Office Action issued against corresponding Indian Patent Application No. 201817005845 dated Sep. 14, 2020 with English translation (6 pages).
Certificate of Grant issued by IPOS for Singaporean Patent Application No. 11201801190R dated Oct. 14, 2020, in English (3 pages).
Office Action issued against corresponding Chinese Patent Application No. 201680052645.7 dated Feb. 2, 2021 with English translation (5 pages).
Office Action issued against corresponding Australian Patent Application No. 2016308775 dated Feb. 25, 2021 in English (2 pages).
Office Action issued against corresponding JP Patent Application No. 2018-526978 dated Apr. 22, 2021 with English translation (6 pages).
Certificate of Grant issued for corresponding Australian Patent Application No. 2018204197 dated Nov. 12, 2020 in English (1 page).
Office Action issued against corresponding Indian Patent Application No. 8541/DELNP/2015 dated Nov. 18, 2020 with English translation (6 pages).
Certificate of Patent issued for corresponding Japanese Patent Application No. 2018-218118 with English translation (10 pages).
Notice of Allowance issued for corresponding Mexican Patent Application No. MX/a/2015/010800 dated Jul. 27, 2020 with English translation (2 pages).
Notice of Allowance issued for corresponding South Korean Patent Application No. 10-2015-7026049 dated Nov. 20, 2020 with English translation (7 pages).
Office Action issued against corresponding Chinese Patent Application No. 201810153991.5 dated Aug. 31, 2020 with English translation (6 pages).
Office Action issued against corresponding Canadian Patent Application No. 2,901,755 dated Oct. 30, 2020 in English (4 pages).
Substantive Examination Clear Report issued against corresponding Malaysian Patent Application No. PI 2015002061 dated Nov. 12, 2020 in English ( 1 page).
Written Opinion and Search Report issued against corresponding Singaporean Patent Application No. 10201610543Q dated Sep. 8, 2020 in English (10 pages).
Substantive Examination Report issued against corresponding Indonesian application No. P00202010541; Issued Oct. 11, 2024; in Indonesian with English translation (4 pages).
Substantive Examination Report issued against corresponding Malaysian application No. PI2021007545; Issued Oct. 29, 2024; in English (5 pages).
Search Report issued against corresponding European Patent Application No. 23 179 873.7 dated Oct. 20, 2023 in English (5 pages).
Office Action issued against corresponding Canadian Application No. 3,050,018; mailed May 30, 2024; In English (5 pages).
European Search Report issued in corresponding application EP 25162422.7; mailed Aug. 19, 2025; In English (9 pages).

* cited by examiner

401

402

| Note | Figure 20 |
|---|---|
| 500 | plate for supporting floor material and establishing a seal in the corner area |
| 501 | fastening holes in floor support plate |
| 502 | accessory connection holes |
| | |
| | |
| | |
| | |
| | |

| Note | Figure 21 |
|---|---|
| 510 | single hole connection block with shortened arms |
| 511 | short arm |
| 512 | single hole in short arm |
| | |
| | |
| | |
| | |
| | |
| | |

| Note | Figure 22 |
|---|---|
| 520 | connector with longer arms and three holes for vertical tension bolts |
| 521 | arms |
| 522 | dashed lines showing possible arm lengths |
| | |
| | |
| | |
| | |
| | |

| Note | Figure 23 |
|---|---|
| 530 | intermediate lower connector with short arms |
| 531 | short arms |
| 532 | accessory connection points |
| | |
| | |
| | |
| | |
| | |

| Note | Figure 24 |
|---|---|
| 540 | upper corner connection block |
| 541 | shortened arms |
| 542 | single vertical tension bolt |
| | |
| | |
| | |
| | |
| | |

| Note | Figure 25 |
|---|---|
| 550 | lower corner connector with apertures and reinforcing ribs |
| 551 | apertures |
| 552 | exposed shanks of vertical tension bolts |
| 553 | reinforcing ribs |

| Note | Figure 26 |
|---|---|
| 550 | lower corner connector with apertures and reinforcing ribs |
| 551 | apertures |
| 553 | reinforcing ribs |

| Note | Figure 27 |
|---|---|
| 570 | column to connector size transition adapter |
| 571 | weld backer |
| 572 | reinforcing ribs |
| 573 | sloping faces |
| 574 | joining features on lower face |
| | |
| | |
| | |

| Note | Figure 28 |
|---|---|
| 580 | lower plate connector |
| 581 | column made of plate |
| 582 | end bars on outer edge of plate column |
| 583 | weld preparation at arm end |
| 584 | weld preparation at lower edge of plate |
| 585 | weep hole |
| 586 | bolt holes |
| 587 | cavity |
| | |

| Note | Figure 29 |
|---|---|
| 580 | lower plate connector |
| 581 | column made of plate |
| 583 | weld preparation at arm end |
| 586 | bolt holes |

| Note | Figure 30 |
|---|---|
| 580 | upper plate connector |
| 581 | column made of plate |
| 601 | upper end of column made of plate |
| 602 | location of vertical weld on arm end |
| 603 | location of welds to upper face of arm and body |
| 604 | location of welds to underside of arm and body |
| 605 | threaded holes to receive vertical tension fasteners (typ) |
| 606 | threaded hole to receive gusset plate fasteners (typ) |

| Note | Figure 31 |
|---|---|
| 580 | upper plate connector |
| 601 | upper end of column made of plate |
| 602 | location of vertical weld on arm end |
| 603 | location of welds to upper face of arm and body |
| 605 | threaded holes to receive vertical tension fasteners (typ) |
| 606 | threaded hole to receive gusset plate fasteners (typ) |
| 607 | opening to engage hoisting means |
| | |

| Note | Figure 32 |
|---|---|
| 620 | lower connection block with shear resistance slots |
| 621 | shear resistance slots |
| 622 | thickened area for slot |
| | |

| Note | Figure 33 |
|---|---|
| 620 | lower connection block with shear resistance slots |
| 621 | shear slots |
| 622 | thickened area for slot |
| | |
| | |
| | |
| | |
| | |

| Note | Figure 34 |
|---|---|
| 643 | gusset plate with shear resistance bars |
| 640 | shear resistance bars |
| 641 | optional extended gusset plate with additional shear resistance bars |
| 82 | gusset plate |

| Note | Figure 35 |
|---|---|
| 650 | upper connection block with shear resistance slots |
| 621 | shear resistance slots |
| 622 | thickened area for slot |
| 605 | threaded holes to receive vertical tension fasteners (typ) |
| 606 | threaded hole to receive gusset plate fasteners (typ) |
| 607 | opening to engage hoisting means |
| | |
| | |
| | |

Fig. 36

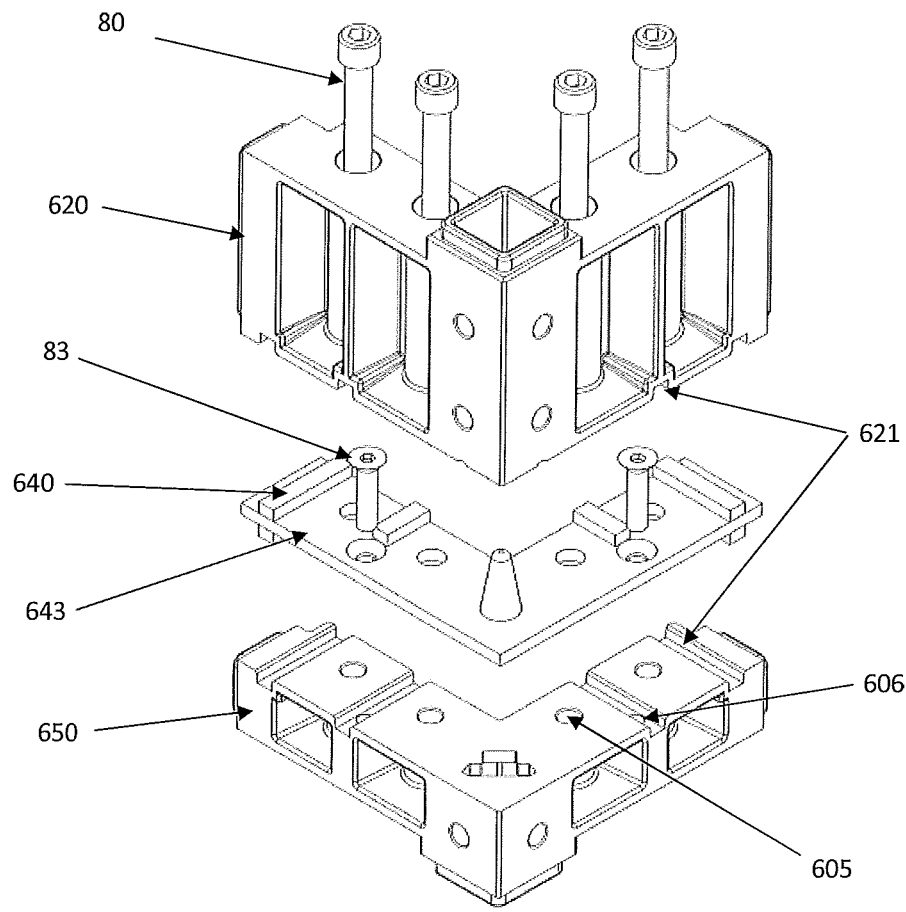

| Note | Figure 36 |
|---|---|
| 620 | lower connection block with shear resistance slots |
| 650 | upper connection block with shear resistance slots |
| 621 | shear resistance slots |
| 605 | threaded holes to receive vertical tension fasteners (typ) |
| 606 | threaded hole to receive gusset plate fasteners (typ) |
| 80 | vertical tension fasteners |
| 83 | gusset plate fasteners |
| 643 | gusset plate with shear resistance bars |
| 640 | shear resistance bars |

| Note | Figure 37 |
|---|---|
| 80 | vertical tension fasteners |
| 670 | lower block |
| 671 | threaded holes for engaging vertical tension fasteners |
| 672 | gusset plate with through holes to pass fasteners or threaded holes for engaging vertical tension fasteners |
| 675 | upper connection block |
| 676 | drilled holes for passing vertical tension fasteners through lower block |
| | |

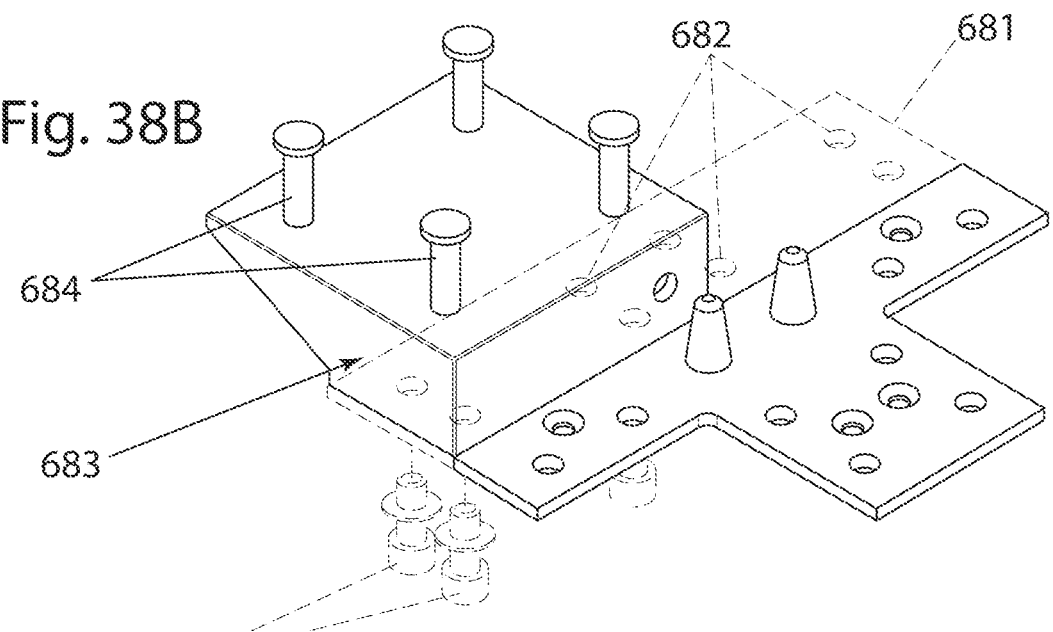
Fig. 38B
Fig. 38A
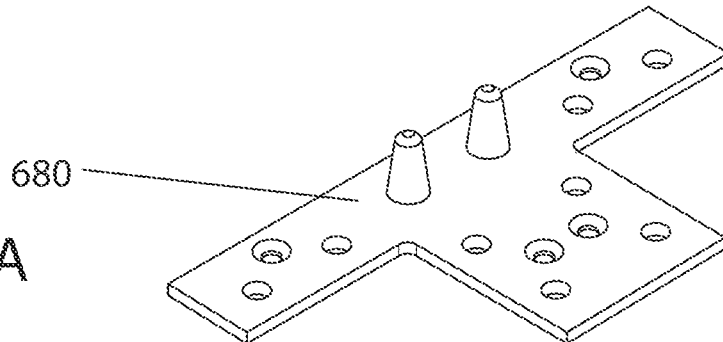
| Note | Figure 38 |
|---|---|
| 680 | typical un-extended double gusset plate |
| 681 | extension of gusset plate |
| 682 | holes for the connection of accessories |
| 683 | hallway slab or accessory connection block |
| 684 | bolts or studs to engage to concrete or other material |
| 685 | Fasteners for joining accessories |
| | |

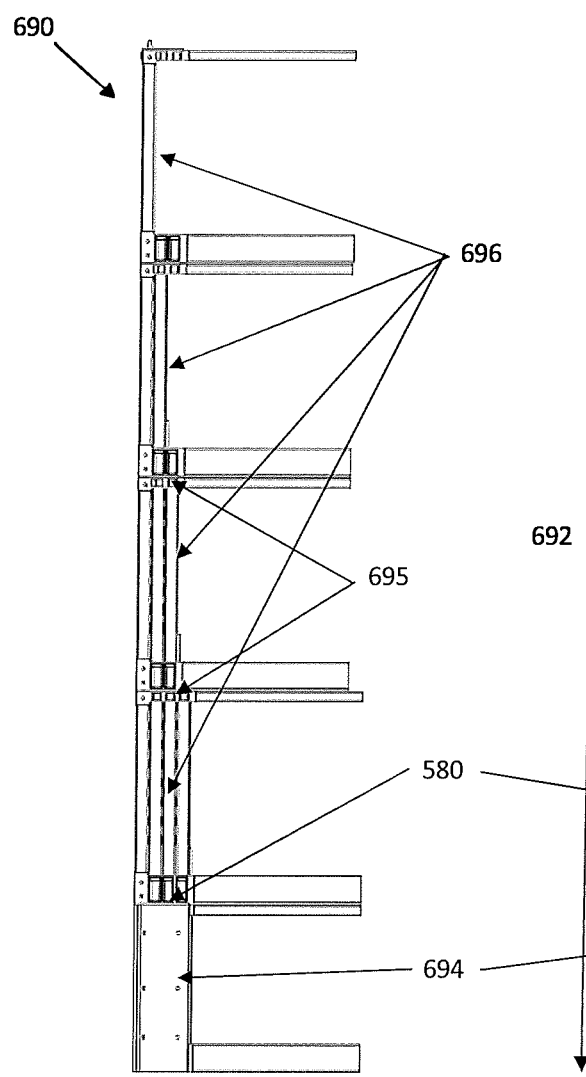
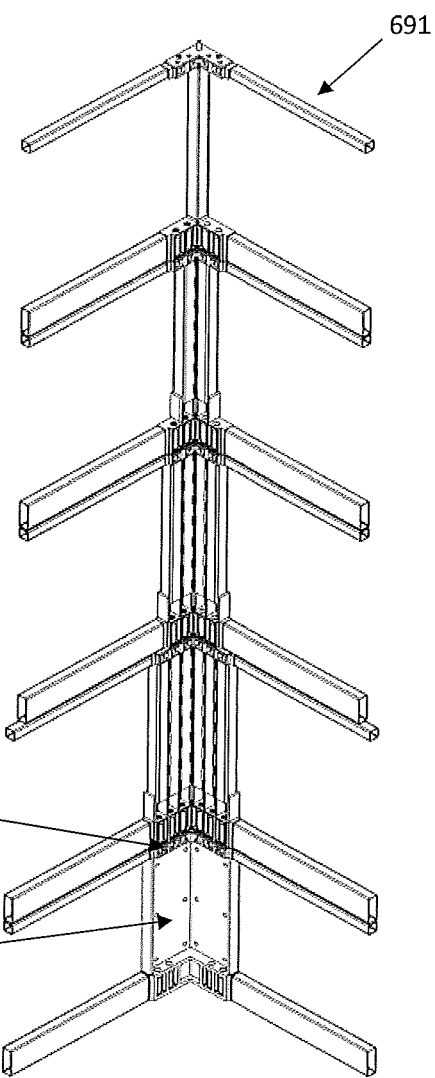

| Note | Figure 39 |
|---|---|
| 690 | side view of structurally graduated stack with increasing numbers of vertical structural elements |
| 691 | perspective view of structurally graduated stack with increasing numbers of vertical structural elements |
| 692 | increasing weight per foot and load-bearing capacity |
| 694 | portion of column fabricated with built up plate |
| 695 | connection blocks with various arm lengths |
| 696 | groups of vertical structural elements |

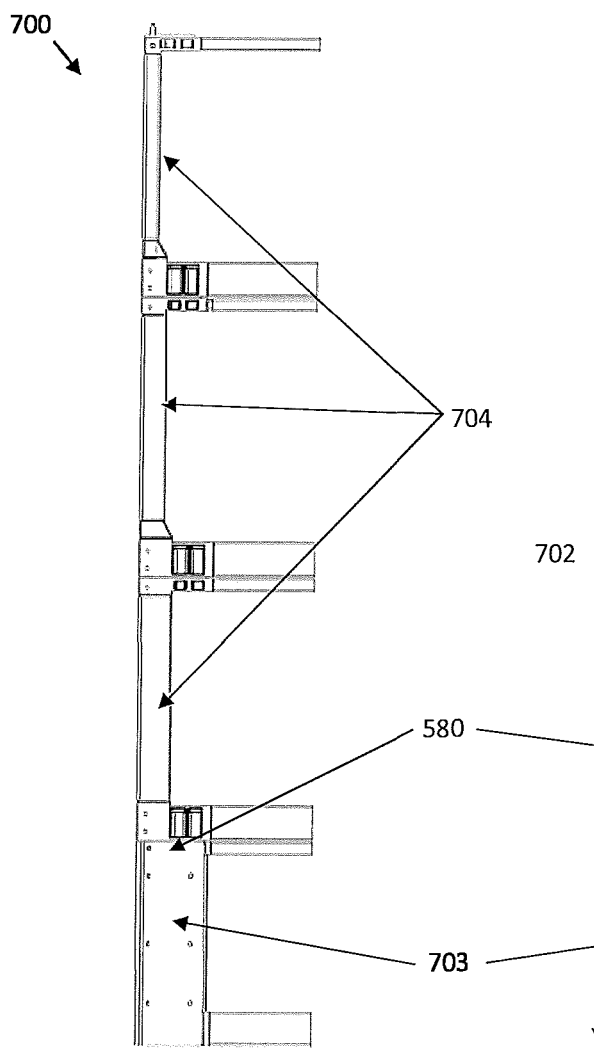
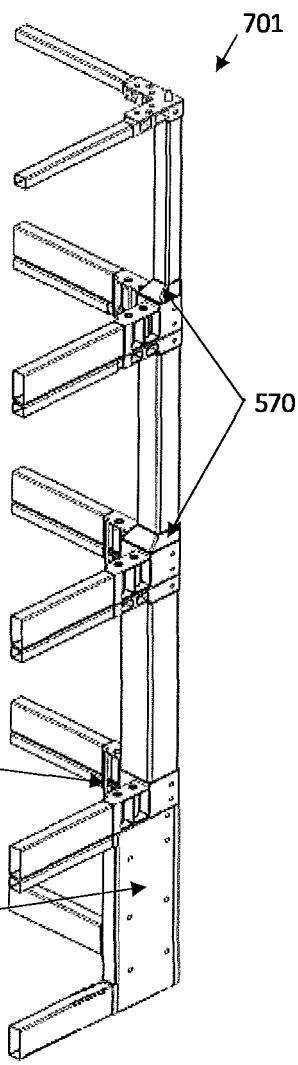

| Note | Figure 40 |
|---|---|
| 570 | column to connector size transition adapters |
| 700 | side view of structurally graduated stack with increasing numbers of vertical structural elements |
| 701 | perspective view of structurally graduated stack with increasing numbers of vertical structural elements |
| 702 | increasing weight per foot and load-bearing capacity |
| 703 | portion of column fabricated with built up plate |
| 704 | increasingly larger tubular sections |
| | |

STRUCTURAL MODULAR BUILDING CONNECTOR

CROSS REFERENCE TO RELATED APPLICATIONS

This application is a continuation of U.S. application Ser. No. 17/727,660, filed Apr. 22, 2022, which is a continuation of U.S. application Ser. No. 17/184,146, filed Feb. 24, 2021, which is a continuation of U.S. application Ser. No. 16/655,823, filed Oct. 17, 2019, which is a continuation of US application 15/843,533, filed Dec. 15, 2017, which is a continuation of U.S. application Ser. No. 15/307,723, filed Oct. 28, 2016, which is a national phase application filed under 35 U.S.C. § 371 of International Application No. PCT/CA2015/0550369, filed Apr. 30, 2015, designating the United States, which claims the benefit of and priority to U.S. provisional application 61/986,438 filed Apr. 30, 2014, having the title STRUCTURAL MODULAR BUILDING CONNECTOR. The content of the above patent applications is hereby expressly incorporated herein by reference into the detailed description thereof.

FIELD

The invention relates to a connector assembly, a hoistable connector assembly using the connector assembly, a method for coupling modular frame units having the connector assembly, a method of assembling a modular unit having the connector assembly and a building having the connector assembly.

BACKGROUND

Prefabricating modular building units constructed from standardized components in a controlled factory setting can be desirable due to the lowered costs and the increased quality which is obtainable in comparison to performing similar work on an outdoor construction job site.

Thus prefabricated modular building units having a floor, walls and an overhead structure, and which contain all the systems and furnishings pre-installed within them are preferred and well known in the art. Building assembly systems composed of the means and methods to join two or more modular building units together to form a larger structure are also well known in the art.

Devices which engage a specially prepared aperture on the upper or side surface of the structural frame so as to provide a releasable connection for the purpose of lifting and moving the modular building units are well known in the art.

A limitation to the construction of slender or tall buildings using factory-built modules is the inability of economically constructed modules to resist and transmit the large moments and tension forces resulting from wind and seismic forces and the large compression loads resulting from the effect of gravity on the building and occupants. Further, all of these force types are exaggerated by narrowness in one or both axes of the building. These effects are greatest in the lower floors and rise in proportion to increasing height and slenderness, so forces are also largest at the lower floors. It is a characteristic of many modular construction systems that the pinned nature of the connections between adjacent modules and the lack of diagonal bracing beyond that necessary for integrity in shipping can limit the effectiveness of force transmission through a larger assembly of conventional module types.

The state of the art for constructing tall or slender building using modules as taught in the art cited herein is to maintain the economies of scale in production by either reinforcing the entirety of all modules of which the building is composed, so all contribute to resisting the forces in a distributed fashion as a stack of ocean freight containers do; or to employ large columns which are situated within or outside of the walls of all of the modules, creating an alternate load path; or to construct an adjoining or interconnected brace frame which by-passes the modules and transmits the large loads to the ground through the secondary structure; or to make use of a tension rod or cable which passes vertically through the building to anchor the modules against uplift and lateral drift. All of the above noted approaches can have limitations in the achievable resistance to forces and transmission of forces, or require the erection of an additional structure, which in turn can limit the achievable height or increases the amount of material used, therefore increasing the cost.

Additionally, methods of construction which employ large columns, particularly when grouped at corners or where occurring at intermediate locations within the walls result in larger spaces between modules, and/or walls of increased thickness which reduces the useful floor area of the resulting building, and/or projections which limit the free use of the voids and walls for the purposes of installing fixtures such as cabinets and shower stalls, and/or which imposes other limitations on the use of the space by the inhabitants, thereby decreasing the value of the resultant building.

Additionally, methods of modular building construction which employ secondary frames add to the assembly time for the building, increasing the cost and duration of construction and reducing the useful floor area, thereby decreasing the value of the resultant building.

Creating a multiplicity of dissimilar module types each having unique details relative to the forces acting on the module within a building is undesirable, as increased variation increases the number of unique components which must be measured, cut and inventoried until use. Additionally, setups of the manufacturing tooling required to accurately locate these parts relative to each other for assembly is error-prone and therefor normally executed by skilled persons, so any increase in the number of setups adds to both production time and cost.

Because the members comprising a networked structure must be of nearly identical length, creating the numerous features required to accurately assemble modules by welding or other means, the subsequent location and connection of the subassemblies of which a module is made, the rigging and hoisting of the completed modules and the fastening of the modules to form structurally sound groupings which provide redundant and adequate load paths as currently practiced, requires a number of precision cutting and assembly operations which increase cost.

It is well known in the art that a moment-connected module frame or building frame reduces the need for diagonal reinforcing elements which otherwise obstruct the view of the occupants and hinder the installation and maintenance of building services. However moment connections which require expansive splice plates as a means of connection require clear access to one or more faces of the module, thus increasing the amount of enclosing and finishing work which must be completed at the site.

Some embodiments of a modular building which best suit the site conditions, the needs of the occupants and the aesthetic tastes of the architect or owner may be composed of module forms having non-orthogonal shapes, including tapering, curving, polygonal etc. however existing systems for the construction of structural modules suited to tall building construction are by nature not suited to non-orthogonal shapes.

Varying shapes of modules and the varying location of walls, fixtures and other components causes the centre of gravity of modules used to construct a building or to furnish a single floor of said building, to vary. To facilitate placement while reducing the clearances to a minimum it is desirable to have the side walls of the modules oriented as closely to perpendicular as possible during hoisting. It has been the case that lengthy delays and repeated trial lifts are required to effect adjustments of the rigging so as to achieve this desirable condition. The time required to make the required changes in turn increases the total duration of the hoisting operation, thus increasing costs for both labour and equipment such as cranes as well as delaying the completion of the building.

The requirement to place and inter-connect modules which are not accurate increases the amount of space required between modules, which increases the difficulty of fireproofing the structure and the difficulty of interconnecting the members so as to achieve the greatest possible strength as well as making integration of modules in to structural groups more difficult and wasting space and providing space for the circulation of sound, smoke and vermin.

The dimensions of a module and the positional disposition of the members within it defines the position and size of the outer wall facings, of the mechanical services, of the abutting and adjoining modules and of the support structures beneath the building and a such there is an interdependent relationship between all the elements of which a modular building is composed.

BRIEF DESCRIPTION OF THE DRAWINGS

Reference will now be made, by way of example, to the accompanying drawings which show example embodiments of the present application, and in which:

FIG. 36 is an exploded perspective view of a coupling assembly showing an embodiment of an upper and lower connector with a gusset plate in between;

FIG. 37 is an exploded perspective view of another embodiment of coupling assembly showing an embodiment of an upper and lower connector with a gusset plate in between;

FIG. 38 (a & b) shows (a) an embodiment of a gusset plate and (b) a further embodiment of a gusset plate with a connection block;

FIG. 39 (a & b) shows an embodiment of (a) a side view and (b) a perspective view of structurally graduated stack with increasing numbers of vertical elements; and FIG. 40 (a & b) shows another embodiment of (a) a side view and (b) a perspective view of a structurally graduated stack with increasing size of vertical elements.

DESCRIPTION OF EXAMPLE EMBODIMENTS

Figure 1:
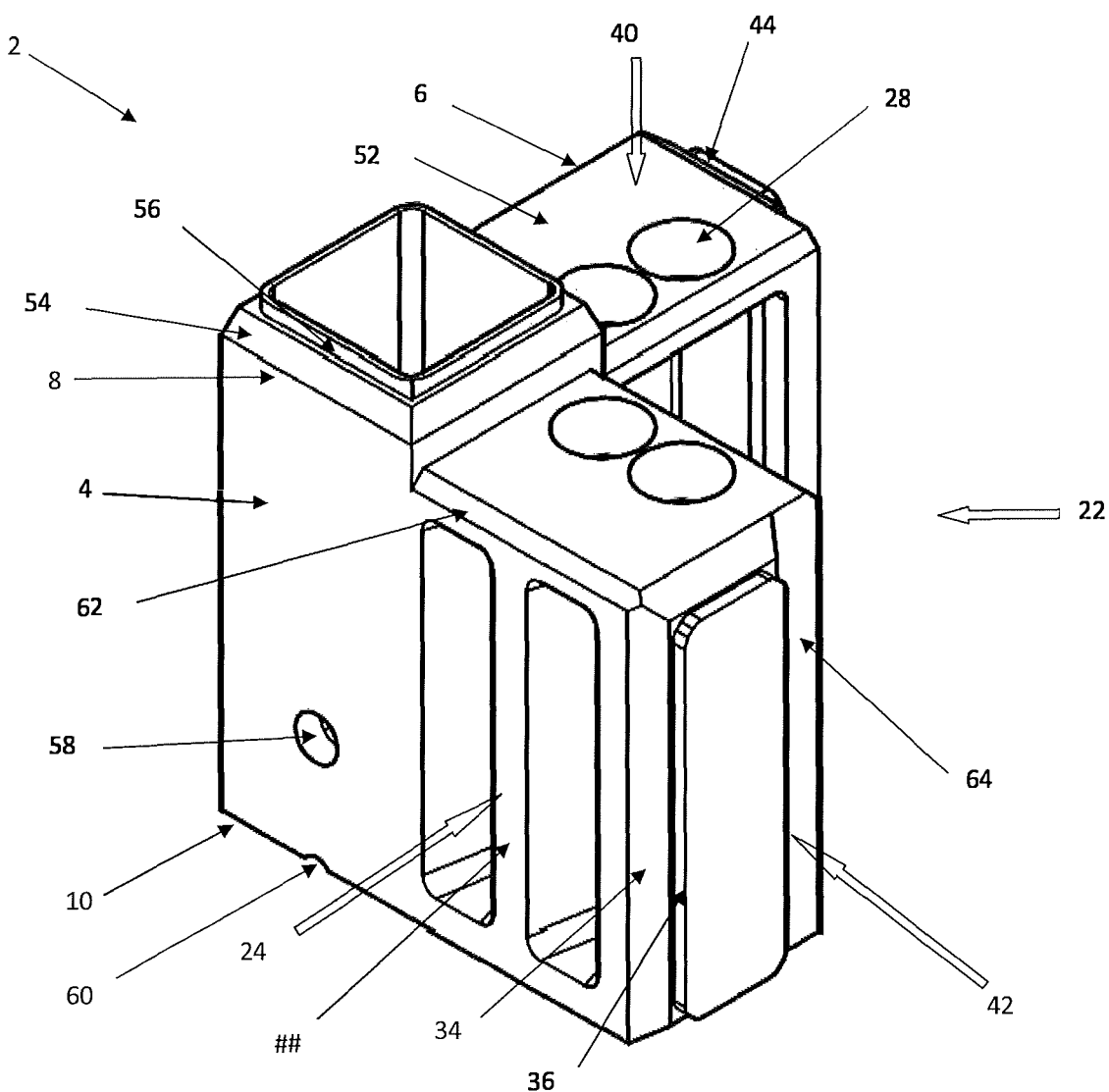
FIG. 1 is a perspective view from a side of a lower corner connector.

Applications of the invention disclosed herein, and some related aspects, as would be recognized by a person of skill in the art, have been described and disclosed in a related PCT application number PCT/CA2014/050110, filed Feb. 14, 2014, the subject matter of which is incorporated herein by reference.

The present invention can help address the need for a compact, accurate, load-bearing, moment-connected, versatile and complete system of interrelated components for the orientation and assembly of module frames, which can facilitate quick and dependable rigging and hoisting of the completed modules and can provide for the connection of the modules to each other and to other necessary components of the building without the need for excessive unfinished areas so as to take full advantage of the structural properties of the modules and which defines and reduces the number of parts, provides features without the need for the fabrication of complex connections in the joining areas, excessive precision in the cutting of the required materials, the execution of difficult welds in difficult positions and a multiplicity of precision setups.

Specifically, the present invention consists of a system of components for the fabrication and assembly of building modules and to interconnect the modules to form buildings composed of those modules, together with a method for the definition of the number, selection and articulation of those components to be used in creating a modules suited to a specific configuration.

The present invention can also help to address the need for a system of components and work methods which allow a fabricator to economically and safely construct buildings of a wide range of types, from single family dwellings to towers of over 20 stories in a plurality of forms, including but not limited to orthogonal, tapering, radiating and curving shapes.

The specification has been initially subdivided in to a section for each component or group of components for convenience in reading.

Corner Blocks

The current invention provides upper and lower load-bearing connectors or blocks which in one embodiment are corner blocks. In a particular embodiment, the blocks are substantially quadrilateral and in other embodiments have polygonal or asymmetrical shapes. These blocks can be mass-produced with features that provide a multiplicity of functions so as to concentrate the precision operations in a small number and size of objects and reduce the amount and complexity of work that must be performed on other members. The upper and lower blocks are of distinct forms and, in one embodiment, are located on the upper and lower ends of the vertical corner members (columns) of generally angular, tubular or built-up form, which perform the function of multi-story columns when modules so constructed are joined using the features on the blocks to form a larger or taller structure.

Likewise other features on the blocks engage the horizontal members of the building and perform the function of continuous horizontal members when modules so constructed are joined to form a larger or wider structure.

In a particular embodiment, the blocks have arms projecting at a plurality of angles including but not limited to perpendicular to the faces of the blocks providing for the location and welding of adjoining members at a plurality of angles. In a particular embodiment, the present invention thus facilitates the fabrication and erection of modules including but not limited to orthogonal, tapering, radiating and curving shapes. The threaded and unthreaded holes in the arms achieve the positioning of threaded fasteners and the vertical walls of the arms provide an increase in the load-bearing capacity and transmission of the compression and tension forces created by the forces acting on the building and by the action of the fasteners.

In a particular embodiment, the blocks have holes in both the body and the arms for the passage and receiving of bolts with nuts or are threaded to receive bolts, so as to provide continuity of vertical tension through the columns and a moment resisting interconnection between adjacent modules or other building structures. The tension resistance resulting from the connection of the columns in the vertical plane enables the structure to resist uplift where it occurs and produces friction on the gusset plate so as to convey forces to the lateral members in the horizontal plane with a high level of fixity.

More specifically, during assembly, the surface of the arms which bear against the gusset plate from both above and below are made tight In a particular embodiment, the bolts are accessible within the wall cavity or other such places and can be arranged flush or below the surface such that a removable patch can be easily configured to cover the location of the bolt and ensure continuity of the fireproofing materials surrounding the load-bearing structures. In a particular embodiment as with connection to the underside of a roof assembly, the bolts may be inserted from the bottom up.

In a particular embodiment, the blocks have projecting features on the distal end faces of the block located to provide backing for the assembly welding, reducing the structural impact of a weld to a connecting member that is cut too short or with an out-of square end or other imperfection reducing the probability of a worker executing a non-conforming welded connection between the corner blocks and the members which are welded to the block and a beveled feature so located on the outside of the block located so as to reduce the likelihood that a weld will require grinding so it does not project beyond the surface and conflict with an adjoining module.

The holes in the corner blocks provide a means of connection to tie-downs and hoisting devices. In a particular embodiment, the upper face of the block is prepared with an opening in to which a quick-release connector can be inserted so as to provide a means of quickly and dependably connecting and disconnecting the module to a lifting device.

In a particular embodiment the blocks have features on the contact faces which engage with corresponding features on the gusset plate so as to increase the resistance to slippage along the contact plane as might occur during a seismic event.

In a particular embodiment, the blocks have projecting flanges co-planar with the faces to which floor or ceiling finishes are to be applied to provide a continuous backer in the area of the fastener access leave-out so as to improve air-tightness and provide support to the flooring or ceiling material. In use, the flooring material covers the top face of the frame up to the end of the arms of the block, but is cut away at the block to expose the top face to allow for the insertion of the bolts for assembly. This can leave the flooring unsupported. The flange shown can help to support the floor in that area and to create a continuous surface so there is no crack in the sealing between floors, which can help with fireproofing.

In a particular embodiment the blocks have a multiplicity of holes on the vertical surface for the connection of accessories such as balconies, hallways and facade treatments.

In a particular embodiment, the blocks have one, two, three or more holes for the passage of vertical tension fasteners and there is one such hole for each vertical structural member which may be centered above it. In another particular embodiment, there are two or more holes for each vertical member. The length of the arms on the blocks through which the fasteners pass and the length of the arms on the gusset plate between the blocks vary in relation to the number of such holes.

In a particular embodiment the lower block has openings through the face so as to reduce the amount of steel which must be drilled or otherwise removed from the casting to allow passage of the bolts. In combination with this feature or separately the block may be reinforced with ribs to as to augment the load bearing capacity and resistance to twisting.

Another component is a block having features on its one end prepared to receive a tubular structural member of one dimension and having features on the other end prepared to receive a tubular member of another dimension, or the corresponding features of a block, and having tapered sides and internal ribs or other reinforcing means so as to transmit the forces between the two members without distorting. As shown in FIG. 40, it can be desirable to change sizes of columns in relation to the load. Smaller columns are used in the upper parts of the building where loads are smaller, larger columns in the lower parts where load are higher due to the accumulated gravity load and increased overturning forces. The component shown in FIG. 27 allows a column of one size to be placed on top of a connector of the next larger size, as for instance a 4"×4" column on a 6"×6" connection block, which is in turn on top of a module with 6" square columns. This eliminates the need for specialized adapter blocks having two different end configurations as these have expensive tooling but are produced in small quantities.

Another component is a block configured so as to allow a column fabricated from plate to be welded to its exterior vertical faces so as to bear directly on and connect to a connection prepared in a similar manner or a block of the types previously described. As can be appreciated by someone knowledgeable in the art two or more such columns joined in to a T or X configuration can achieve both large weights per foot and increased cross-section resulting in greater buckling resistance without projecting in to the occupied spaces of a building.

Gusset Plate

Another component is a plate which is interposed between the blocks at the top and bottom ends of columns or groups of columns, which has upward-facing tapered locating pins for engaging and directing a descending module by sliding contact with a corresponding locating recess on the underside of a the corner block thus locating the module in the correct position for fastening. The plate also provides through holes for use in connecting adjacent modules with bolts to provide structural continuity in the horizontal plane both during construction and in the completed building and by virtue of its ductility, for accommodating slight variations in column length so as to ensure a continuous load path which bears equally on all members of the column group thus formed. As can be appreciated by someone knowledgeable in the art, the plate can be shaped to fit between a single vertical column or between two or more columns arranged in an orthogonal or other disposition. In a particular embodiment shims of a similar dimension and prepared with appropriate holes are placed in one or both sides of the connection to accommodate for variations in the finished dimensions of the modules thus maintaining the correct geometry of the modules stack.

In a particular embodiment, the gusset plate is provided with projections on its upper and lower faces which engage with corresponding grooves in the contact faces of the blocks above and below so as to increase the resistance to sliding movement as might occur during a seismic event and reduce the load which such movement would apply to the shanks of the vertical tension fasteners.

Stairwells and Elevator Shafts

The system of the present invention allows for the fabrication of modules within which are installed stairs or elevating devices and which separate at the mateline between two modules without a significant visual or functional disruption.

Overheight Modules

The system of the present invention allows for the fabrication of modules which comprise the upper and lower halves of habitable volumes which are taller than shipping restrictions will normally allow and which are joined at the mateline between two or more stacked modules without a significant visual or functional disruption.

Hallways

Another group of components of the present invention is a structural hallway floor that is made from a suitable material such as reinforced concrete, sandwich plate, wood or formed metal together with supporting pedestals. In a particular embodiment, the slab is composed of reinforced concrete with reinforcement bars placed so that features on the support pedestals engage them so as to resist bending of the pedestals, thus creating a moment connection between stacks of adjacent modules thus connected. The pedestals are provided with holes that align with corresponding holes in the upper and lower corner blocks and serve to connect two parallel stacks of modules as well as connecting the adjacent columns within a stack on one side so as to create a combined load path. The pedestals and floor slabs may also be connected to the sides or ends of a stack of modules on one side of the slab and a balcony support frame on the outside to form a building with balconies or breezeways. The floor slab and pedestal assemblies can also be used as convenient carriers for building services such as ducts, pipes and wiring to facilitate the fabrication of these components off site in the factory environment.

In a particular embodiment the gusset plate can be extended as required and provided with holes for the passage of fasteners to support and engage accessory support and connection assemblies of a variety of sizes.

System of Interdependent Detailing

The present invention also comprises a pre-determined grid upon which the dimensioning of the interconnected elements of subject building are based together with a system of fixtures which ensure the grid is maintained throughout all fabricated assemblies in all axes which ensures an accurate and interdependent relationship extending from corner blocks, to members, to subassemblies, to modules and to whole buildings in all axes. The dimensioning system thus serves to reduce fractional element and module sizing, to increase the number of common parts and to reduce the difficulty of coordination with foundation and podium contractors and which facilitates the work of all internal or external suppliers of components to be integrated in the modules so fabricated.

In a particular embodiment, the system is based on increments of no more or no less than two inches in three axes with a centre-to-centre accuracy between holes used for fastening of plus or minus $\frac{1}{32}$" and an outside to outside dimensional accuracy of all mating surfaces of plus 0" minus $\frac{1}{16}$".

Fixtures

The present invention includes a system for the assembly of the module frames which ensures that modules conform to the grid established above, and that no part of a module projects beyond the outermost ideal dimension, which increases the achievable speed of assembly and accuracy of the structure and, eliminates the possibility of additive dimensional drift, resulting in a reduction in the difficulty of erection, the difficulty of fireproofing, the possibility of interconnecting modules with a greater degree of fixity and a reduction in wall thickness and wasted space.

Table Fixture

A component of the system of the present invention is an adjustable fixture consisting of a flat table or a flat table mounted on trunions to allow pivoting, which is of sufficient thickness and prepared with a grid of holes to receive vertical pins so located as to orient the components of a module ceiling or floor frame for assembly welding, thus creating module subassemblies such as floors, ceilings and walls. The locating holes are laid out so as to ensure that modules conform to the grid established above, which is coordinated with other building elements to ensure that the modules thus produced are easily assembled in to form a complete module and the complete module can be assembled to form a building. The pins are equipped with a system of spacers used in ensuring the correct elevation of the components of the assembly so as to produce flush conditions as required for the application of floor or ceiling surfaces. The fixture is thus configured to ensure that welding is executed in a position ideal for the structural welding and so as to ensure that the completed parts do not exceed the tolerance envelope resulting in accumulating tolerance conditions.

Rotating Fixture

Another component of the present invention is an adjustable and rotatable fixture which orients a ceiling frame, a floor frame, the corner columns, the intermediate columns, the column reinforcements and the diagonal bracing, all of a plurality of dimensions; relative to each other for assembly welding so as to ensure that modules conform to the grid established above ensuring ease in the interconnection of modules and so as to ensure that the completed parts do not exceed the tolerance envelope and to ensure the parts can be oriented in a position ideal for the execution of the structural welds.

Quick Connect Hoisting Connector

Another component of the present invention is a releasable and compact quick-connector which is employed in the attachment of the hoisting apparatus to the module, which is installed in a specially prepared opening in the corner blocks, from above, without tools, which is resistant to being accidentally released and which can be removed without tools. In a particular embodiment, the connector is structurally ideal in that the upward-facing bearing surface of the toggle and the corresponding downward-facing bearing surface of the receiving block and the tension-loaded part of the toggle shaft which conveys the load from the bearing surface to the hoisting apparatus are in ideal proportion so as to maximize the load-bearing capacity of the combined elements within the most compact space and while maintaining the dimensional limits of the assembly within the top face of the corner block.

Hoisting Frame

Another component of the present invention is a hoisting apparatus which is arranged so as to suspend the load in an ideal posture for placement in the building, which in a particular embodiment is horizontal and which provides for the rapid adjustment of the position of all of the connection points from which lines pass to the crane hook so as to compensate for differences in the centre of gravity which occur in the length of a module. The device described also allows for altering the spread between pairs of cables on one side of the frame effecting a change in the dependent angle from vertical of the pair of lines which pass to the crane hook on one side of the module so as to move the centre of crane attachment to one side of the long axis of the frame so as to compensate for changes in the centre of gravity of loads which occur in the width of the module suspended from it.

Reinforcing Members

Further the invention comprise a system of standardized reinforcing members which connect with each other and with the columns, lateral framing, diagonal bracing and corner blocks described herein, eliminating the need for case-by-case design and fabrication or customization of reinforcement components.

Reinforcement Analysis

Further, the present invention comprises a work method for systematically analysing the forces acting on a building composed of modules, defining the optimum location for the application of the standardized reinforcing systems, selecting from a list of standardized reinforcements with progressive buckling and uplift resistance and thereby incorporating only such reinforcements as are minimally necessary to strengthen the areas under additional stress, without adding unnecessary structural material to more locations than required, without significantly disrupting the application of fireproofing materials and without requiring additional thickness of the walls of the module.

Built Up Columns

Further, the present invention comprises a method for the fabrication and connection of the outer columns so they form groupings with greater resistance to the compressive and tensile forces resulting from the loads encountered in the construction of tall and/or slender buildings.

In a particular embodiment the resistance to horizontal drift, buckling and uplift of the columns is increased by joining two or more columns by welding along their vertical edges or other suitable means in to groups and welding or otherwise attaching these groups to the connector blocks in the areas provide for the purpose.

In a particular embodiment the columns are comprised of plates joined by welding or other suitable means along their edges and these assemblies are welded or otherwise joined to the blocks. In a particular embodiment these plates are 1" or more in thickness. In another particular embodiment, the plate columns by-pass the blocks to which they are welded and make contact with the top and bottom faces of the gusset plate along the ends of the plates.

In a particular embodiment the columns are progressively larger and engage blocks having correspondingly larger bodies and connection features. In a particular embodiment these columns are 4" square, 6" square, 8" square, 10" square, rectangular and so on, or the metric equivalents, corresponding to standard structural hollow metal or composite sections.

Benefits

Increases Height without Frame

By eliminating the risk of inadvertently creating a connection which is not fully compressed during assembly and which is therefore not fully fixed, and by providing for a larger number of fasteners, and by facilitating the placement of the reinforcement, the system of components and work methods of the present invention can serve to increase the height of a building which can be built without the requirement for a secondary external or internal bracing frame, and to increase its useable floor area due to involving a larger portion of the members in the structural function and the enhanced fixity of the connections, the creation and assurance of multiple and redundant load paths, the integration of the brace frame in to the module walls and the resulting efficient transfer of the external, internal and self-loads imposed on the completed building through the adjacent modules and thence to the ground.

Increases Height with Frame

By reducing the amount of steel required in upper floors and thus its total weight, this invention also serves to increases the height of a building which is built with the use of a secondary external or internal bracing frame of a given size.

Reduces Number of Unique Parts, Number of Locations and Size of Members

By analyzing the loads applied and more efficiently involving more of the required members in the structural function the invention also reduces the size of members required and limits the number, size and locations where unique reinforcement details and the related complexity of the fireproofing is required, thereby reducing the cost of such buildings,

Reduces Requirement for Precision

The present invention can help to further reduces the precision of the parts which must be made by workers in the modular production facility, which reduces the cost of the fabrication.

Reduces Complex Fabrication

The present invention concentrates many of the complex features required to join members, hoist modules and join modules in a single mass-produced component, helping to reduce both the complexity and the requirement for skilled work necessary to construct a module.

Allows Taller and Wider

Additionally the system can allow the building of taller modules composed of two stacked frames one of which has openings in the ceiling and the other of which has openings in the floor, longer modules due to the performance of the bracing and wider modules due to the improved behavior of the apertures in the ends, thus providing greater flexibility to designers of buildings so constructed.

Reduces Wall Thickness

By better perfectly distributing the load-bearing components the present invention can help to reduce the wall thickness required to accommodate structure and services.

Reduces Site Labour for Patching

By placing the tension connections within the wall cavity and concentrating the connection means in the vicinity of the column, the present invention can help to reduce both the number and the extent of the leave-out areas which must be subsequently patched.

The invention in accordance with an embodiment disclosed in the specification will now be described with reference to the accompanying drawings.

Figure 2:
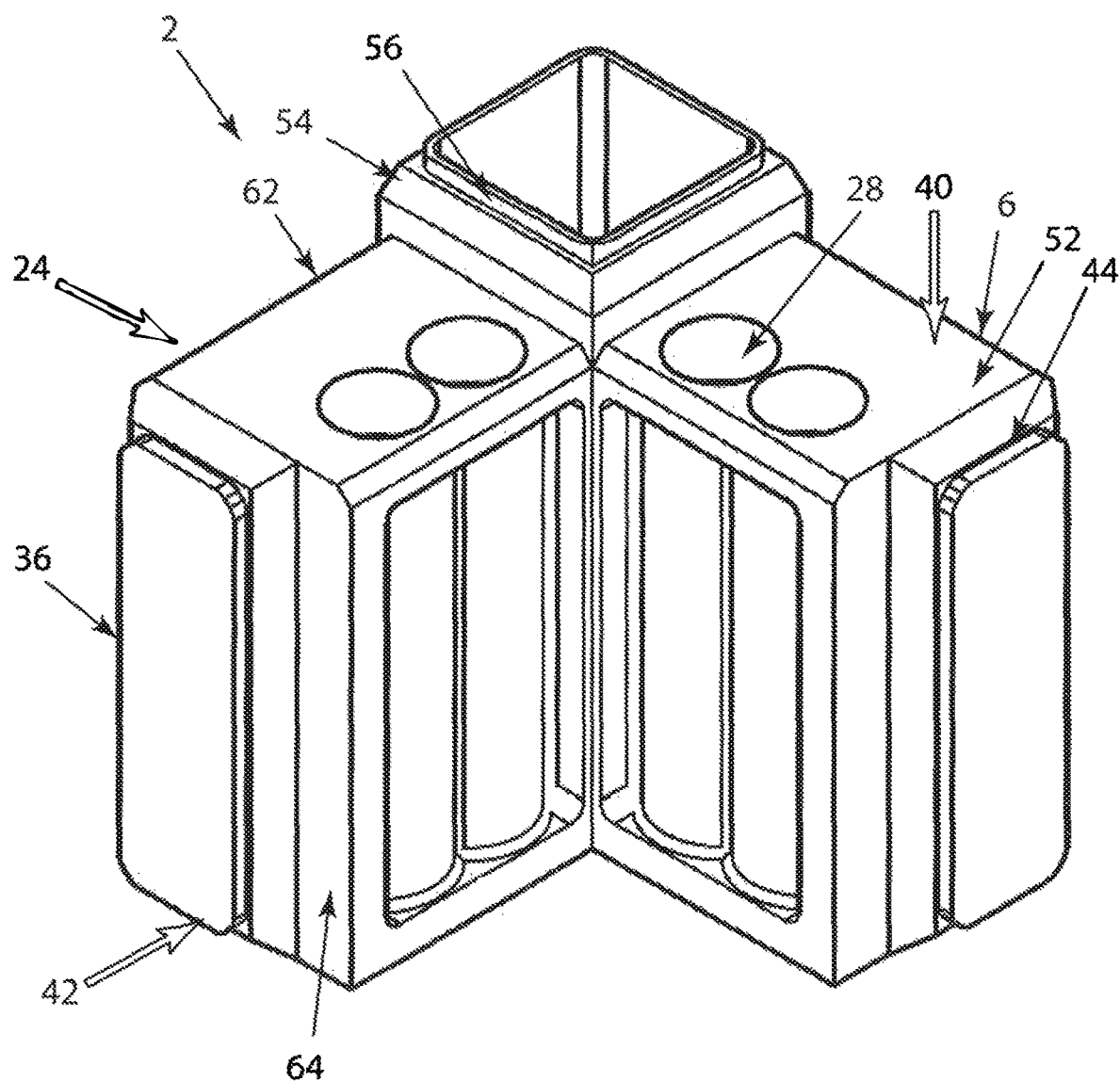
FIG. 2 is another perspective view from an inner face of the lower corner connector.
Figure 3:
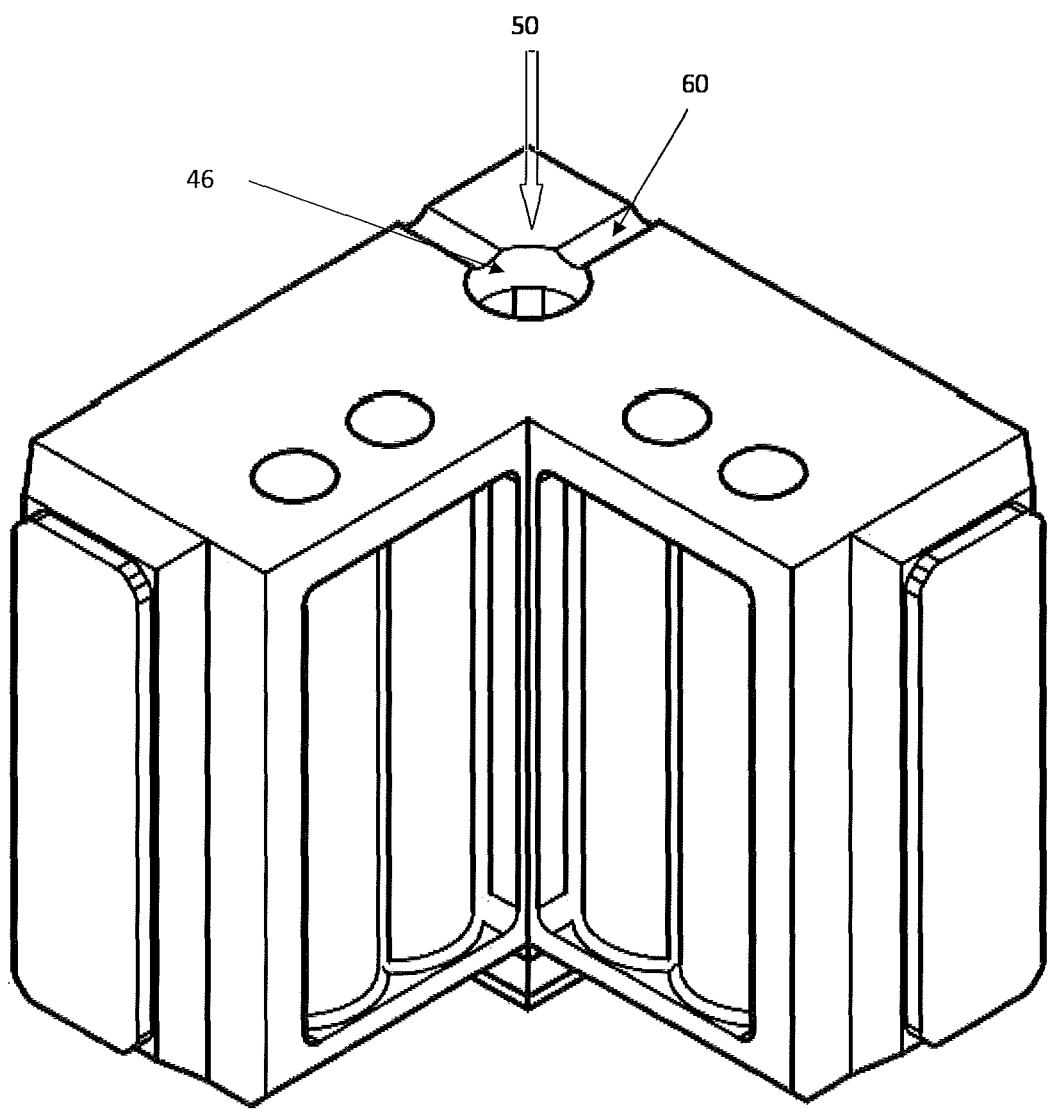
FIG. 3 is another perspective view from an inner face of an inverted lower corner connector of FIG. 2.

FIGS. 1-3 disclose an embodiment of a lower connector 2. The lower connector is generally made up of lower connector body 4, with arms 6 extending from the lower connector body 4. The lower connector body 4 at one end, designated as the lower connector body column receiving end 8, is adapted for receiving and coupling to a column, post or other structural unit of a modular frame; while the other end, designated as the lower connector body gusset contact end 10, is adapted for coupling to a gusset plate 82. In addition, in one embodiment, the lower connector body 4 can be provided with a lower connector body aperture 58 for coupling of the lower connector body 4 to a part or unit that can help in forming a modular structure (FIG. 9).

Figure 9:
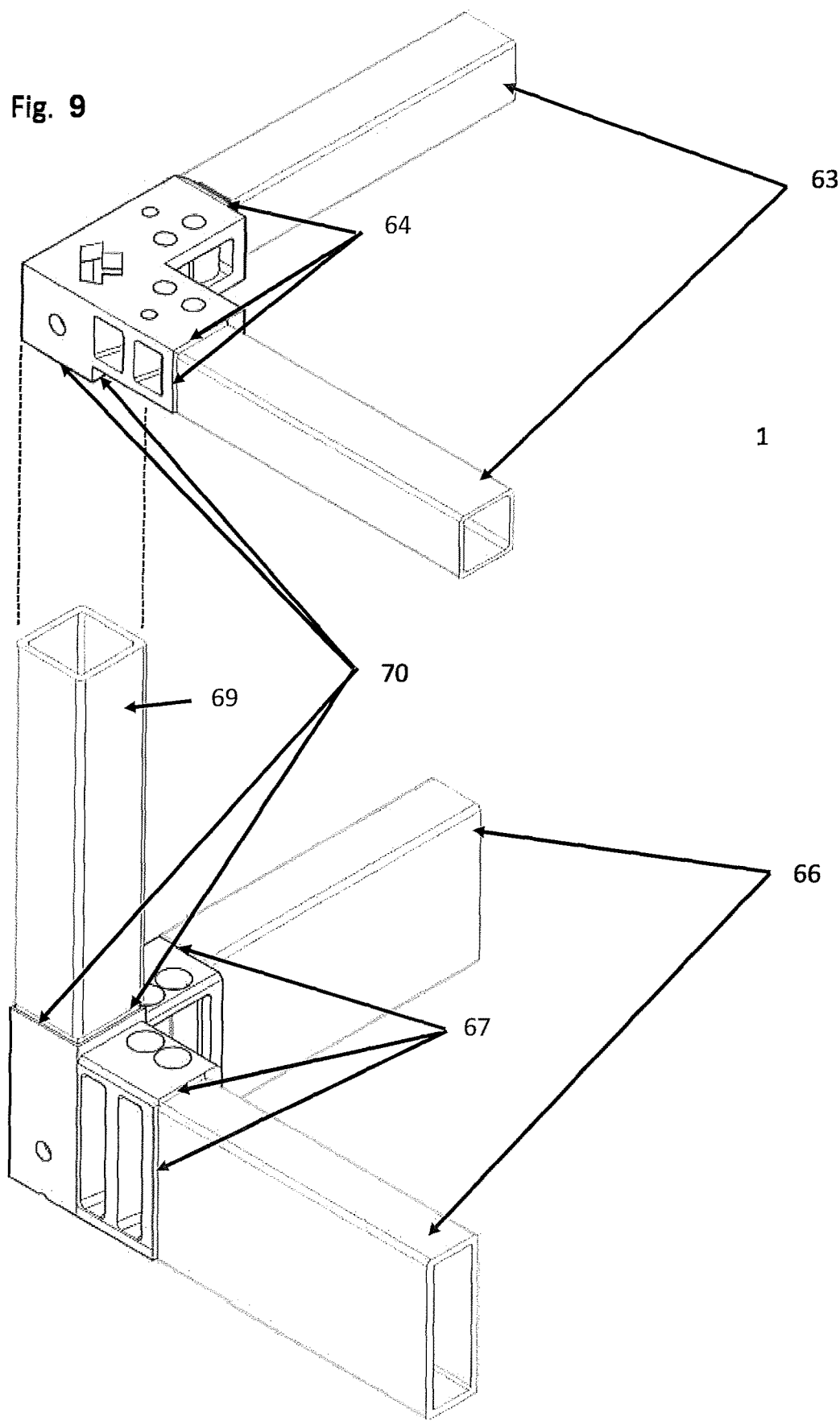
FIG. 9 is a perspective view of a portion of a modular frame showing the connection between an upper and lower corner connector.

The lower connector body column receiving end 8 is provided with features that can assist in coupling to the column, post or other structural unit of a modular frame (FIG. 9). In the embodiment shown, the lower connector body 4 is provided with lower connector body weld receiving bevel 54 and weld backer 56 extending from the lower connector body weld receiving bevel 54. Such features can assist with proper placement of column, post or other structural unit and for forming a weld, and can in some embodiments, do not require any modification of the column, post or other structural unit.

The lower connector body 4 is also provided with a lower connector body gusset contact face 50 at the lower connector body gusset end 10, and that can come in contact with a gusset plate 82, as described herein. In the embodiment disclosed herein, the lower connector body gusset contact face 50 is generally planar (FIG. 3). In one embodiment, for example and without limitation, the lower connector body gusset contact face 50 can be provided with weep channels 60 that can allow for drainage of any water, condensate or other liquid out of the lower connector 2.

In the embodiment shown in FIGS. 1-3, the lower connector 2 is provided with a pair of arms 6 extending from the lower connector body 4. In the embodiment shown in FIGS. 1-6 (lower connector is FIGS. 1-3 and upper connector in FIGS. 4-6), the arms are positioned to be perpendicular to each other, i.e., one arm extends at nearly 90° to the second arm. However, the position of the arms can be varied depending upon the design and application requirements, and the arms can be present at angles less than or greater than 90° (please see FIGS. 7 and 8, where the arms extend in opposing directions).

Due to the placement of the lower connector 2 in a modular structure (FIG. 9), the lower connector is provided with a lower connector inner face 22 and the lower connector outer face 24. The lower connector inner face 22 is designated by the modular structure that is formed, with the face of the connector being positioned towards the modular structure being considered as the lower connector inner face 22, and the face of the lower connector 2 positioned away from the inside of the modular structure being designated as the lower connector outer face 24.

In the embodiment shown, the lower connector arms 6 has a lower connector arm load bearing face 40 and lower connector arm beam contact face 42, which can engage a beam or other structural unit to form the modular structure. In the embodiment shown, the lower connector arm load bearing face 40 lies is a plane different than the plane of the lower connector body column receiving end 8, with the plane of the lower connector arm load bearing face 40 being more closer to the plane having the lower connector body gusset end 10 than the plan of the lower connector body column receiving end 8. This results in the lower connector arm load bearing face 40 being spaced-apart from the lower connector body column receiving end 8, and can help with the weld operation to form the modular structural unit (FIG. 9).

The lower connector arm 6 can be provided with fixing apertures 28 that can be used for coupling of the lower connector 2 to the upper connector 102, and for forming the connector assembly 1, disclosed herein. In one embodiment, as disclosed in the Figures, the fixing apertures 28 can be positioned closer to the lower connector inner face 22, which can help to provide a lower connector arm load bearing surface 52 positioned closer to the lower connector outer 24. The lower connector arm load bearing surface 52 can provide an area on the arms 6 for positioning and bearing the load of additional structural features of a modular structure. In other preferred embodiment, there can be more holes or less holes as required by the loads to be transmitted and the positioning of load bearing elements bearing upon the surfaces of the blocks.

In one embodiment, for example and without limitation, the lower connector arm load bearing face 40 can be provided with edges that are beveled 62. These can provide a location for the weld between the edge of the lower end of the reinforcing members (for an embodiment of a reinforcing member, please see 405 in FIGS. 17, 18 and 19) and the outer edge of the upper face of the block such that the member being joined does not require beveling and the weld will not project beyond the surface and additionally requires a minimum of grinding to make the weld flush.

The arms 6 of the lower connector 2 are also provided with a boss 44 extending from the lower connector arm beam contact face 42, which is positioned at a distal end of the arms 6 that extend from the lower connector body 4. The boss 44 can be provided with features for coupling of the lower connector arm 6 to the beam or other structural unit of a modular frame. In one embodiment, the boss 44 is provided with a lower connector weld receiving bevel 34 having a lower connector arm weld receiving backer 36 extending from the bevel 34, and which can assist in forming a weld with a beam or other structural unit of a modular frame (FIG. 9).

In one embodiment, for example and without limitation, the boss 44 can be positioned towards one side of the beam contacting face 42 of the lower connector arm 6. In the embodiment shown in the figures, the boss 44 is positioned proximate to the outer face 24 of the lower connector 2, and is also spaced from the edge of the lower connector arm 6 close to the lower connector inner face 22. By positioning the boss 44 close to the outer face 24, a channel 64 is provided on the beam contacting face 42 of the lower connector arm 6 close to the inner face 22. The channel 64 can provide space for passing wires or other conduits in a modular structure.

Figure 7:
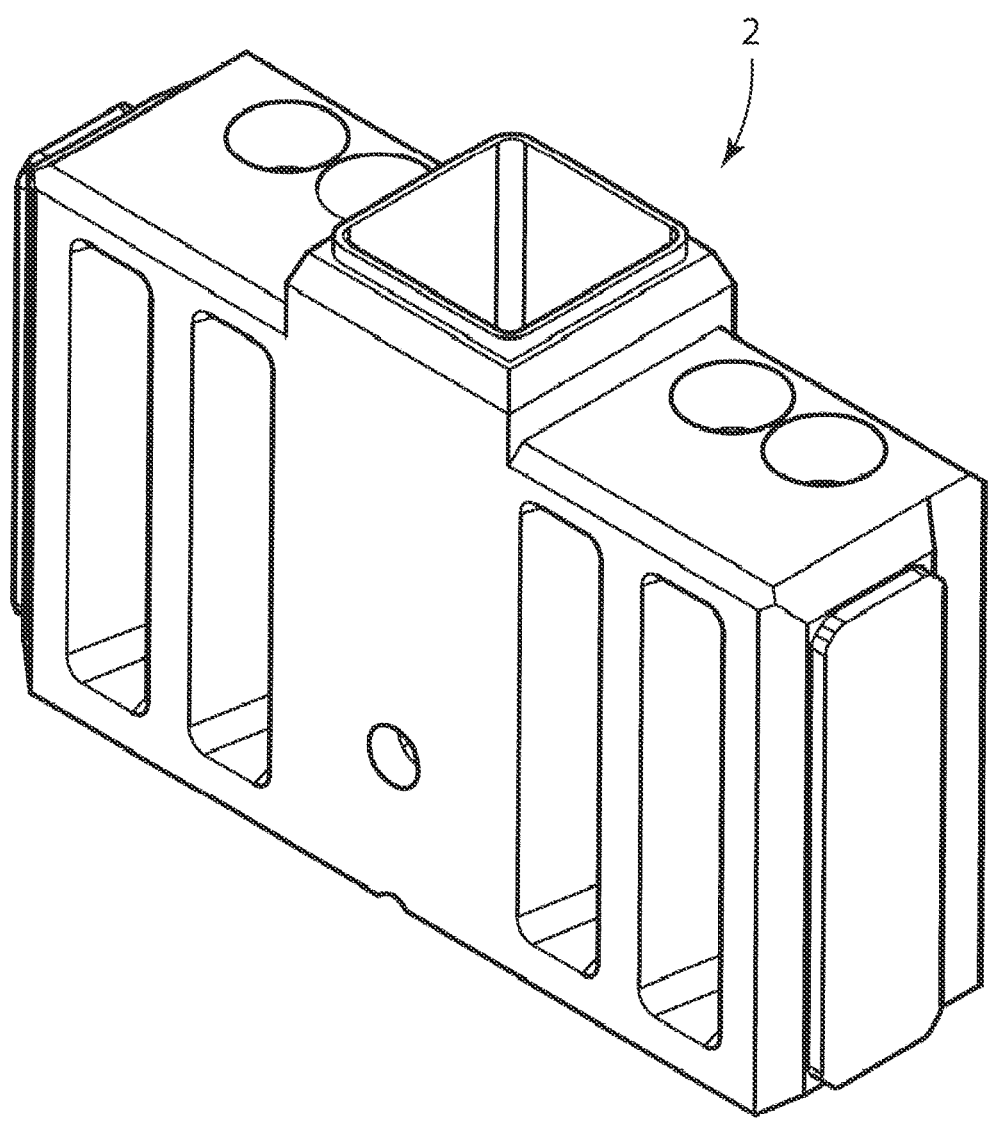
FIG. 7 is a perspective view of a second embodiment of a lower connector.
Figure 8:
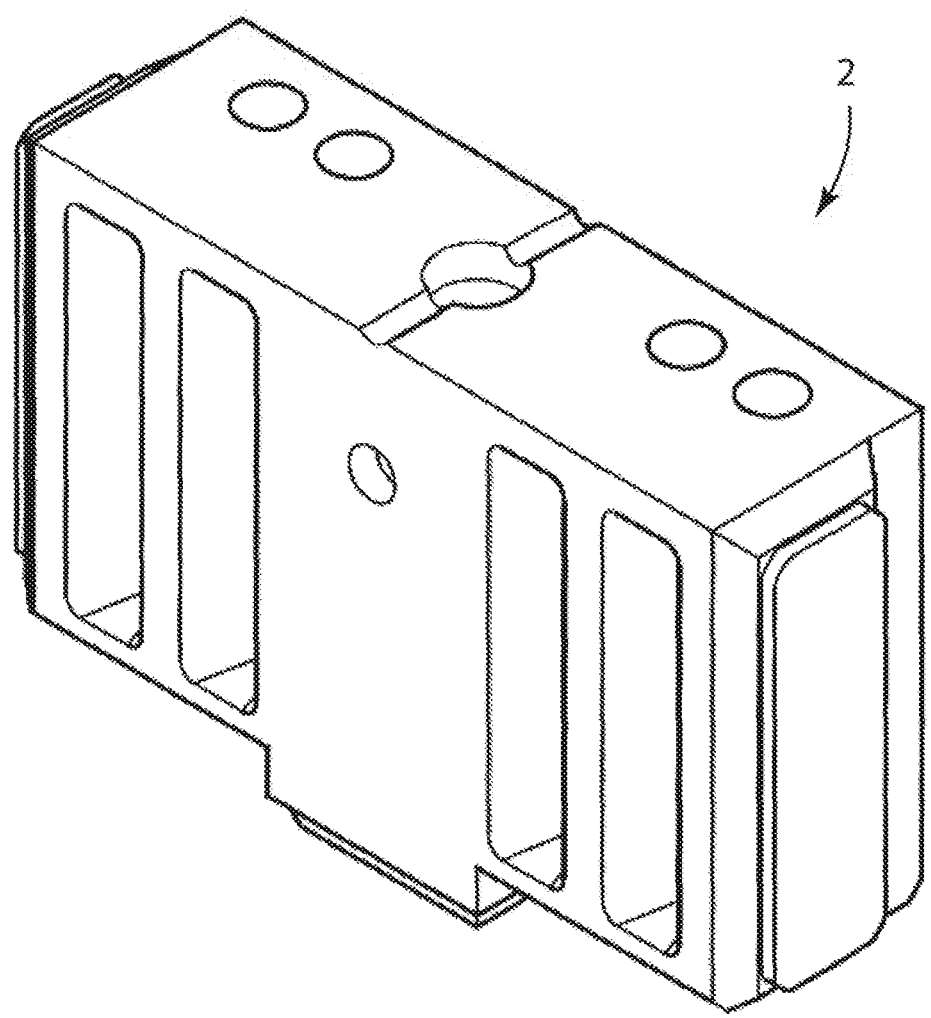
FIG. 8 is a perspective view of the second embodiment of an inverted lower connector.

FIGS. 7 and 8 show a second embodiment of a lower connector 2 having features similar to the lower connector 2 embodiment disclosed in FIGS. 1-3. The embodiment disclosed in FIGS. 7 and 8 have arms extending in opposing directions, rather than being perpendicular to each other as shown in FIGS. 1-3. The direction of the arms 6 is not particularly limited and can vary depending upon the application and design requirements, as should be recognized by a person of skill in the art based on the teaching in this specification.

Figure 4:
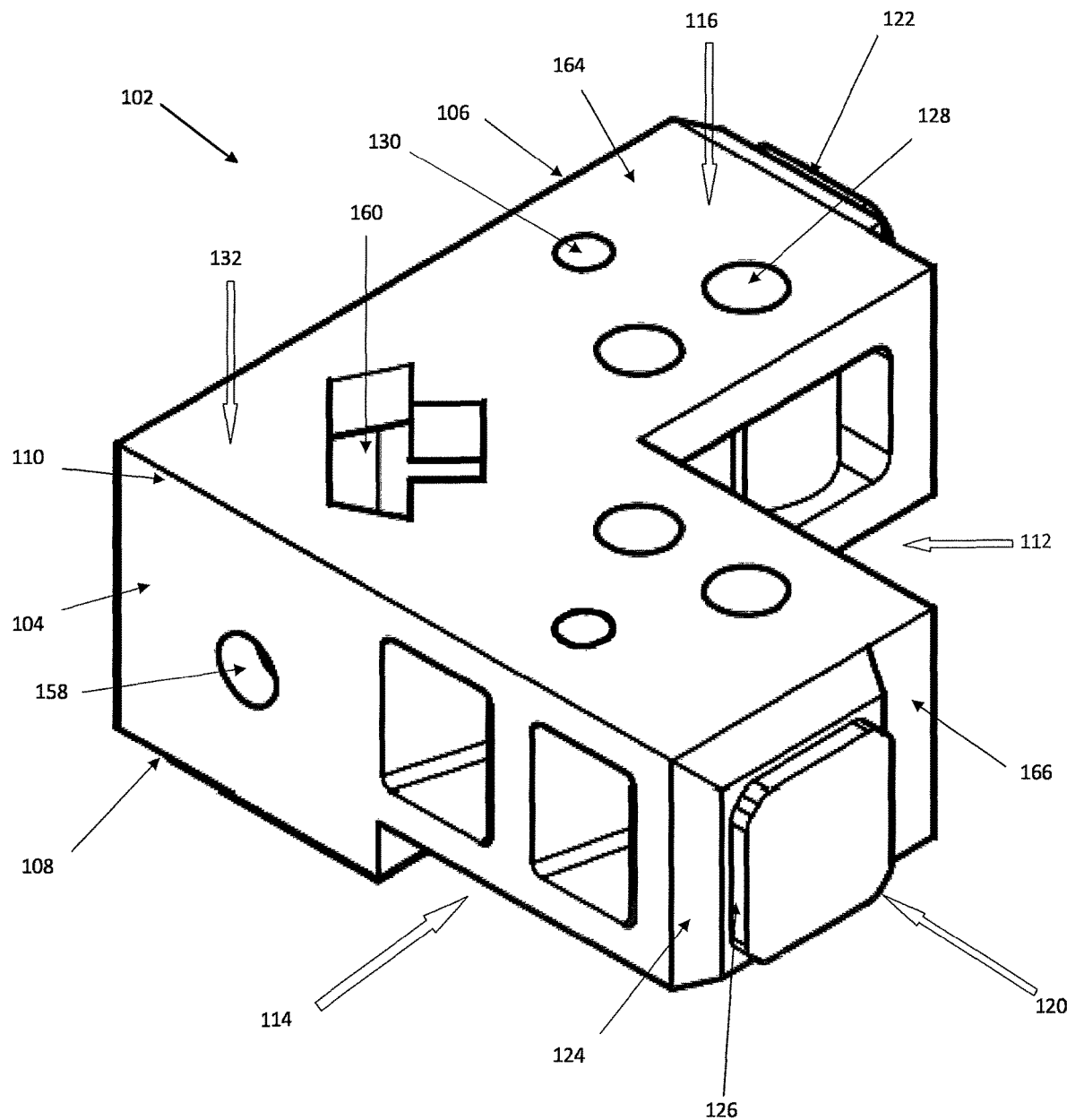
FIG. 4 is a perspective view from a side of an upper corner connector.
Figure 5:
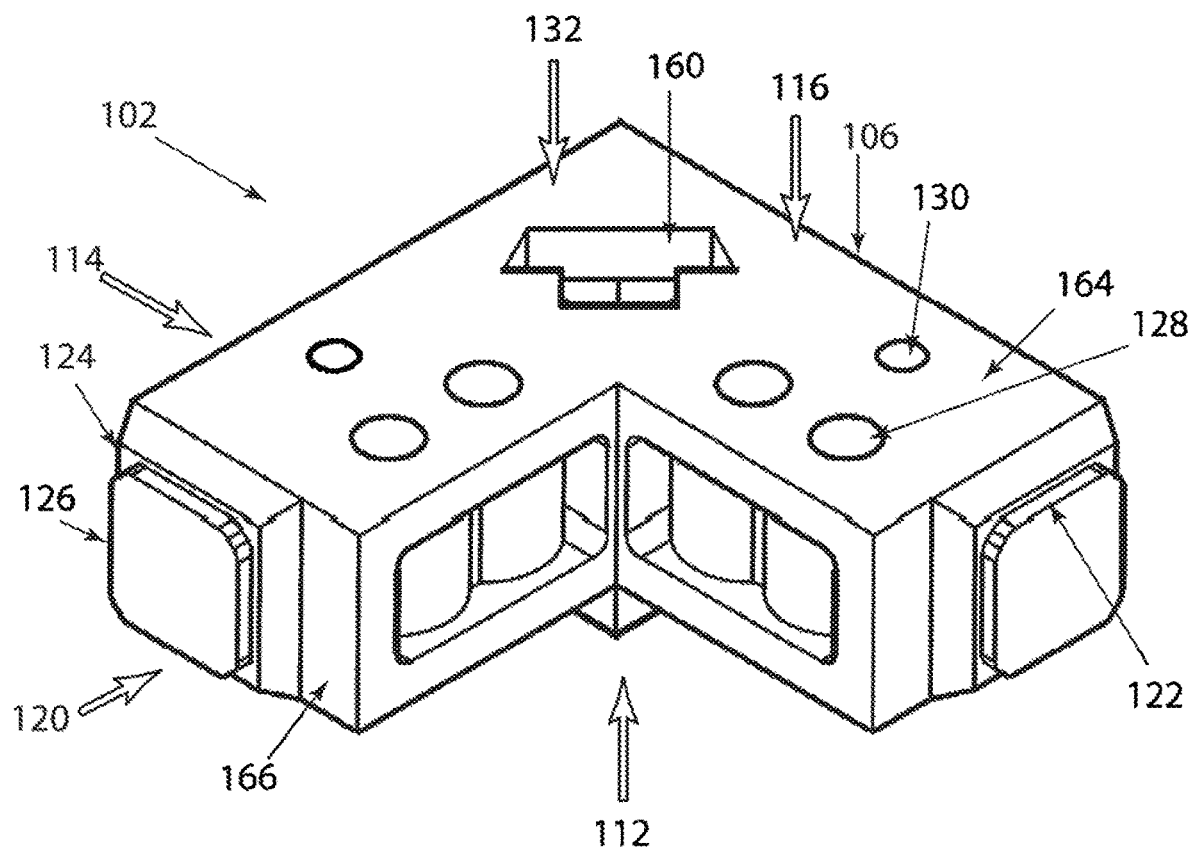
FIG. 5 is another perspective view from an inner face of the upper corner connector.
Figure 6:
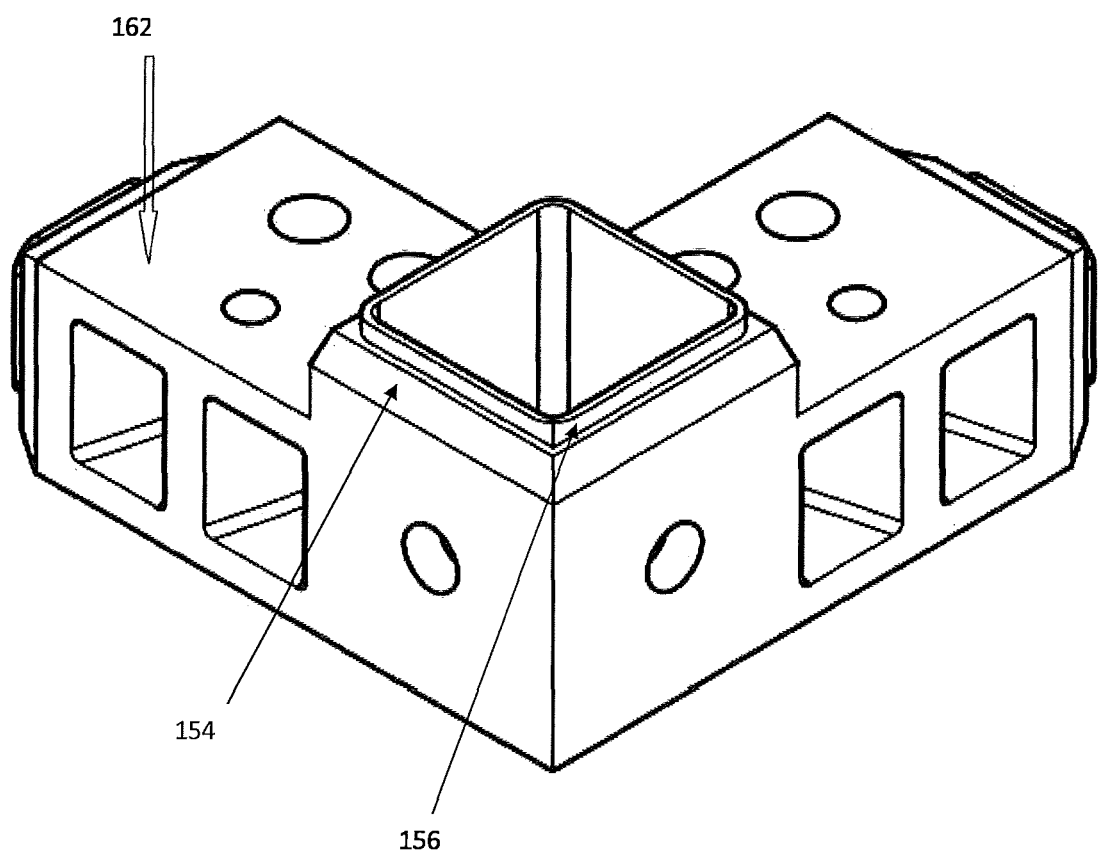
FIG. 6 is another perspective view from an outer face of an inverted upper corner connector of FIG. 5.
Figure 10:
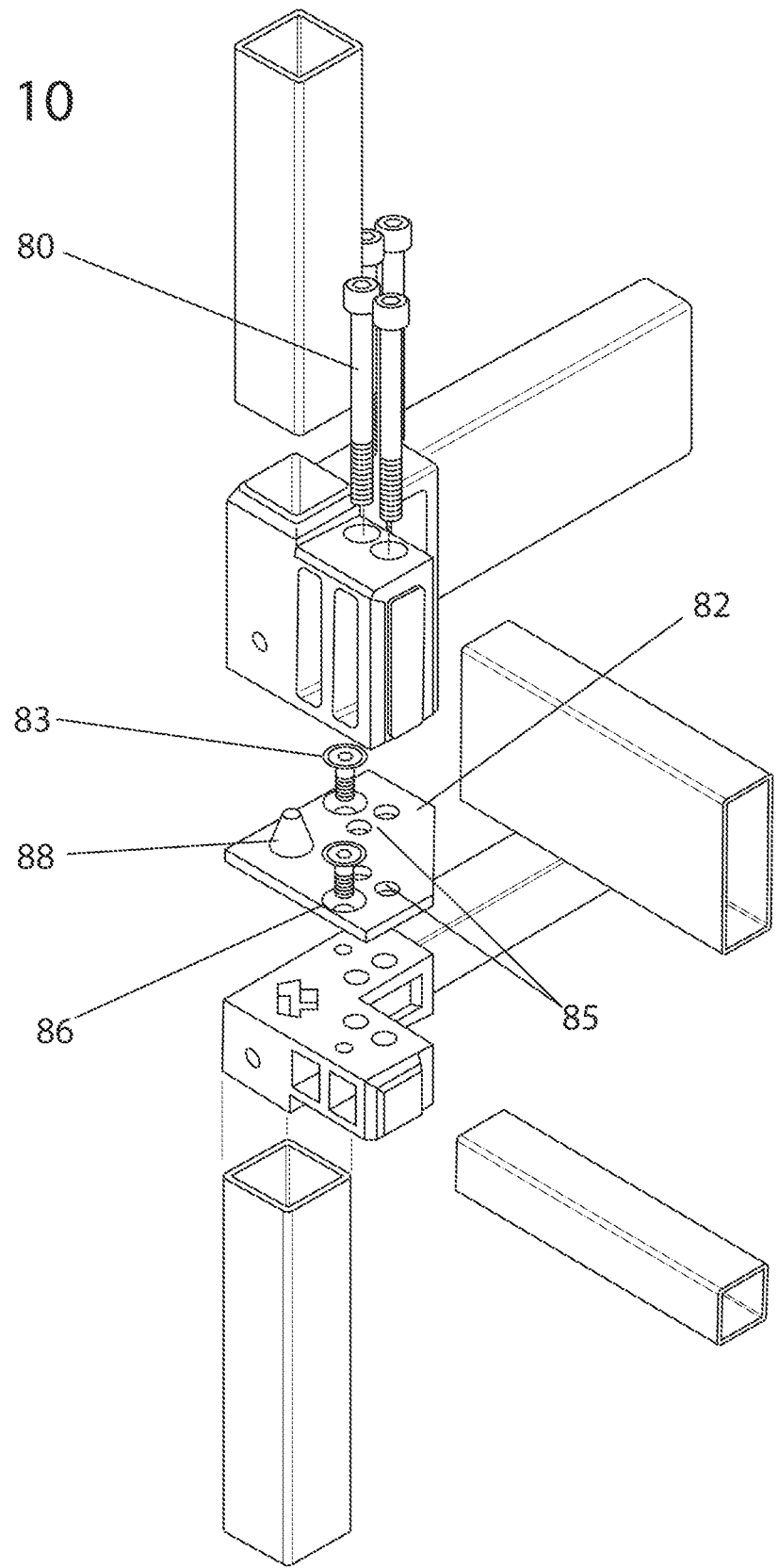
FIG. 10 is an exploded perspective view of a coupling assembly connecting two modular frames.
Figure 11:
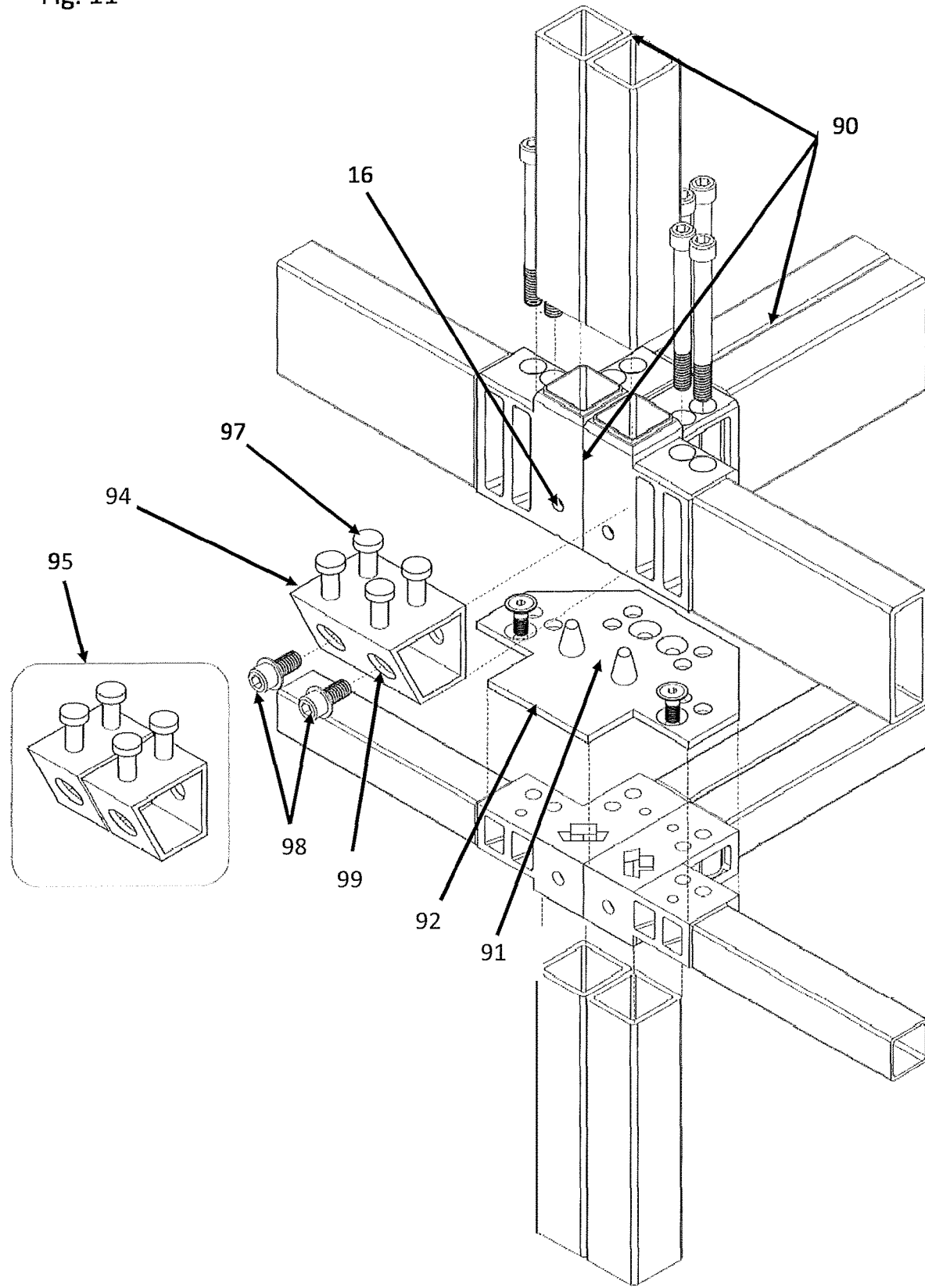
FIG. 11 is an exploded perspective view of a second embodiment of a coupling assembly connecting four modular frames.

FIGS. 4 to 6 disclose an embodiment of an upper connector 102. The upper connector 102 is generally made up of upper connector body 104, with arms 106 extending from the upper connector body 104. The upper connector body 104 at one end, designated as the upper connector body column receiving end 108, is adapted for receiving and coupling to a column, post or other structural unit of a modular frame; while the other end, designated as the upper connector body gusset contact end 110, is adapted for coupling to a gusset plate 82. The gusset plate as shown in FIG. 10 provides the locating pin and takes up the vertical space created by the gusset plate as shown in FIG. 11, which are used to tie adjacent modules together. In addition, in one embodiment, the upper connector body 104 can be provided with an upper connector body aperture 158 for coupling of the upper connector body 104 to a part or unit that can help in forming a modular structure (FIG. 9).

The upper connector body column receiving end 108 is provided with features that can assist in coupling to the column, post or other structural unit of a modular frame. In the embodiment shown, the upper connector body 104 is provided with upper connector body weld receiving bevel 154 (FIG. 6) and weld backer 156 extending from the upper connector body weld receiving bevel 154. Such features can assist with proper placement of column, post or other structural unit and for forming a weld, and can in some embodiments, do not require any modification of the column, post or other structural unit.

The upper connector body 104 is also provided with an upper connector body gusset contact face 132 at the upper connector body gusset end 110, and that can come in contact with a gusset plate 82, as described herein. In the embodiment disclosed herein, the upper connector body gusset contact face 132 is generally planar (FIGS. 4 and 5). In one embodiment, as shown in FIGS. 4 and 5, the upper connector body gusset contact face 132 can be provided with a T-shaped opening 160 that can be used for lifting and moving a modular assembly, as further disclosed herein and in the PCT application noted-above, which incorporated herein by reference.

In the embodiment shown in FIGS. 4-6, the upper connector 102 is provided with a pair of arms 106 extending from the upper connector body 104. In the embodiment shown, the arms are positioned to be perpendicular to each other, i.e., one arm extends at nearly 90° to the second arm. However, the position of the arms can be varied depending upon the design and application requirements, and the arms can be present at angles less than or greater than 90°. Moreover, like the lower connector 2, the upper connector arms 106 can lie in the same plane as the upper connector gusset contact face 132 to provide a flat or planar surface that is contact with the gusset plate 82.

Due to the placement of the upper connector 102 in a modular structure (FIG. 9), the upper connector 102 is provided with an upper connector inner face 112 and the upper connector outer face 114. The upper connector inner face 112 is designated by the modular structure that is formed, with the face of the connector being positioned towards the modular structure being considered as the upper connector inner face 112, and the face of the upper connector 102 positioned away from the inside of the modular structure being designated as the upper connector outer face 114.

In the embodiment shown, the upper connector arms 106 has an upper connector arm gusset contact face 116, upper connector arm load bearing face 162 (FIG. 6) and an upper connector arm beam contact face 120, which can engage a beam or other structural unit to form the modular structure. In the embodiment shown, the upper connector arm load bearing face 162 lies is a plane different than the plane of the upper connector body column receiving end 108, with the plane of the upper connector arm load bearing face 162 being more closer to the plane having the upper connector body gusset end 110 than the plan of the upper connector body column receiving end 108. The positioning of the upper connector arm load bearing face 162 results in it being spaced-apart from the upper connector body column receiving end 108, and can help with the weld operation to form the modular structural unit.

The upper connector arm 106 can be provided with fixing apertures 128 that can be used for coupling of the lower connector 2 to the upper connector 102, and for forming the connector assembly 1, disclosed herein. In one embodiment, as disclosed in the Figures, the fixing apertures 128 can be positioned closer to the upper connector inner face 112, which can help to provide an upper connector arm load bearing surface 164 positioned closer to the upper connector outer 114. The upper connector arm load bearing surface 164 can provide an area on the arms 106 for positioning and bearing the load of additional structural features of a modular structure. In addition, the upper connector arm 106 can be provided with upper connector arm gusset coupling aperture 130. The position of the upper connector arm gusset coupling aperture 130 is not particularly limited, and in one embodiment, as shown in FIGS. 4-6 is positioned proximate to the upper connector outer face 114.

The arms 106 of the upper connector 102 are also provided with a boss 122 extending from the upper connector arm beam contact face 120, which is positioned at a distal end of the arms 106 that extend from the upper connector body 104. The boss 122 can be provided with features for coupling of the upper connector arm 106 to the beam or other structural unit of a modular frame. In one embodiment, the boss 122 is provided with an upper connector weld receiving bevel 124 having an upper connector arm weld receiving backer 126 extending from the bevel 124, and which can assist in forming a weld with a beam or other structural unit of a modular frame (FIG. 9).

In one embodiment, for example and without limitation, the boss 122 can be positioned towards one side of the beam contacting face 120 of the upper connector arm 106. In the embodiment shown in the figures, the boss 122 is positioned proximate to the outer face 114 of the upper connector 102, and is also spaced from the edge of the upper connector arm 106 close to the upper connector inner face 112. By positioning the boss 122 close to the outer face 114, a channel 166 is provided on the beam contacting face 120 of the upper connector arm 106 close to the inner face 112. The channel 166 can provide space for passing wires or other conduits in a modular structure similar to that as used in the lower connector 2.

The terms "upper" and "lower" as used herein, and particularly with respect to the connectors, are relative and can be interchanged. However, for the purpose of describing the connector assembly 1, upper connector 102 refers to connector that would typically be positioned at an upper corner or upper end of a modular frame that can be lifted and positioned on a second (or lower) modular frame. While lower connectors 2 refer to connectors positioned on the lower corner or lower end of a modular frame, and that would be closer to ground or floor (than the upper connector).

In the embodiments shown, the upper corner connector (102) and lower corner connector (2) can be made from hollow castings of steel. The connectors can have mechanical properties such as tensile strength and ductility equal to or greater than mild steel and metallurgical properties such that the connector can be welded to mild steel with standard practices such as structural metal inert gas (MIG) welding.

In a further embodiment, the upper and lower connectors (102, 2) each have a body (104, 4), respectively, which in one particular embodiment can be hollow. The upper connector body (104) and the lower connector body (4) can have a variety of shapes depending upon the design and application requirements. However, in the figures, the upper and lower connectors (102, 2) have a shape having a square cross-section.

In one embodiment, the connector bodies (102, 4) are 4" square to accept a 4"×4" Hollow Structural Section (HSS). In another embodiment, the connector bodies (102, 4) are 6" square to accept a 6"×6" HSS. Connectors 102 and 2 have adequate thickness for the intended function and details such as draft angles and uniformity of sections which facilitate casting. In a particular embodiment, the casting are drilled and surfaces milled to a high accuracy as measured between centres of the apertures 28 and the other apertures, as well as the faces of the block. Additionally, perpendicularity and parallelism are similarly maintained to high tolerances, or other tolerances as may be convenient. In another embodiment, the connector is made by assembling one or more of rolled sections, flat or brake-formed plate by welding or mechanical means. In a further embodiment, the part is made by casting non-ferrous, plastic, cementitious or any other suitable material. In another embodiment, the portions of the blocks to which the columns and arms will be connected can have features to locate the HSS and facilitate welding.

The connector assembly can be formed by sandwiching the gusset plate (82, 92) between the upper connector and lower connector (FIGS. 10 and 11). The gusset plate (82, 92) shown has two faces, where the first face can be in contact with lower connector and the second face can be contact with the upper connector. In addition, the gusset plate (82, 92) is provided with through holes 85, which align with apertures on the upper connector and lower connector, allowing fastening of the connectors using fastening means 80. The fastening means 80 is not particularly limited, and can include nut and bolts, screws.

The arms of the connectors also have bosses (44, 122) which provide location to the longitudinal and transverse members of the module frame and backing for the assembly welds. In the embodiment shown, the edges of the arms of the upper and lower connectors have beveled edges. Bevels (34, 124) provide a location for the weld bead which allows the weld to lie flush and eliminates the need to bevel the connected member.

The outer faces of connector body can have a plurality of holes (or bores) which are threaded or unthreaded as required by circumstances for use in the connection of column groups, hallway slabs, fixtures, hoisting means or other useful features through the use of bolts, pins, clips, joining plates or other fastening means. In another embodiment, the connector is taller and additional holes are provided for the use of additional fasteners or the addition of additional bracing or other features. In another embodiment, the connector is more or less than 4-sided and not quadrilateral, but rather has trapezoidal, parallelogram or other shapes so as to facilitate the production of round, curving, tapering, star-shaped or other building forms.

As described above, the lower connector 2 has arms 6 with holes (or apertures) for the passage of tension bolts 80 which pass through gusset plate 82 to secure the module vertically and provide a continuous tension and moment connection which passes loads through the connection between the stacked columns and the horizontal beams. Similar features can be provided in the upper connector for similar objectives. In a further embodiment, these arms project perpendicular to the surface, in another embodiment they have tapered sides so as to permit the connection of members at an angle and in another embodiment the whole of the arms projects at an angle.

In one embodiment, the gusset plate 82 is cut from steel plate or other material having adequate thickness and mechanical properties for the intended function. In a further embodiment, it is ⅜" thick. The gusset plate 82 has through holes 85, countersunk holes 86 and at least one locating pin 88. Flathead screws 83 passed through holes 86 and threaded in to holes 130 in upper connector 102 accurately unite adjacent columns and thus whole modules. The ductility of plate 82 in the vertical plane ensures that the column groups are acting together to sustain large loads. The precision of the location of holes 86 for the flathead screws and the corresponding holes in the connectors ensures module-to-module tolerances are maintained and controlled.

The gusset plate 82 can be sized to fit on top of 1, 2, 3, 4 or more columns providing equivalent vertical separation in all locations and forming groups of 2, 3, 4 or more modules (FIGS. 11, 14-19). FIG. 11 shows a plate joining 2 columns which joins and interconnects the corresponding modules creating a structural diaphragm that unites all floors of the modules so connected on that level and in turn unites the building in a structural whole (see plate 92 in FIG. 11 and plate 680 and 681 in FIG. 38). The gusset plate 82 can be provided with one or more pins 88 on the face contacting the lower connector 2. The locating pins 88 can engage with a locating pin receiving aperture 46 positioned on the lower connector body gusset contact face 50, which can help with proper positioning of the lower connector 2.

To create the floor frame of a module, longitudinal floor beam and lateral floor beam are cut to length (FIGS. 9 and 10). In a particular embodiment, these beams are 3"×8" HSS for the perimeter and 3"×6" HSS for the infill members. Because the locating and welding fixture, described herein, positions the pre-machined connecting blocks and defines the hole locations and their locations relative to each other, provides the exterior dimensions of the assembly, the fixture ensures that modules made using the fixture conform to the established grid previously described. In addition, the features on the blocks ensure that the beams do not require beveling on the edges of the ends and the cutting to length operation is not critical in either length or squareness. The beams are coupled to corresponding arms 6 on the lower corner connector 2 and welded in the manner previously described.

A person skilled in the art should recognize that the assembly of the ceiling follows a similar process using members of an appropriate size placed in the same fixture. In a particular embodiment, these are 3"×3" HSS for the perimeter with 2"×2" HSS for the infill members. Thus both top and bottom frames capture the outer dimensions of the same fixture and are coordinated.

A suitable material such as fibre-cement board, or steel sheet deck and concrete toping, or steel-composite sheet decking is applied to the top face of the floor beams of the module floor thus built, and fastened appropriately, or concrete or other material is filled between the framing so as to support occupant loads and provide the necessary diaphragm action to the module and in turn to a building composed of modules. Similarly, material such as drywall or fire-proof board and insulation of a variety of types depending on conditions is applied to the surfaces of the framing and boards and in voids in walls and ceilings to provide a variety of functions such as privacy to the occupants, to provide fireproofing to the structure and to limit the transmission of sound. Please see FIG. 12 that shows loose piece 105 that is positioned in aperture 104 to attain the properties described herein.

By positioning the boss which functions as a positioning means and as a backer for the welded structural connection to the arm of the block at the distal end of the arm, instead of at its base, the present invention eliminates the need for the holes in the HSS and positions the load-bearing faces of the adjoining connector bodies in direct contact, thus ensuring a connection with a high degree of fixity and less likelihood of settlement due to incorrect assembly.

This direct contact ensures that the connection formed by the members can develop the full strength and load-transmitting capability of which the connection is capable while reducing the amount of work required to prepare the connector and the HSS for assembly.

Additionally, the configuration of the connector of the present invention provides for a greater number of fasteners so as to increase the tension capacity of the connection as well as providing a greater area for the connection of supplementary reinforcing members which increase both the buckling resistance and the tension capacity of the structure so produced (FIG. 22, 28-32).

As would be recognized by a person of ordinary skill in the art, the features disclosed and discussed in the embodiments of the upper connector may be applied on the lower connector, and vice versa, as needed based on the application and design requirements. Additional embodiments of the upper and lower connectors are described further herein based on reference to the accompanying figures.

Figure 13:
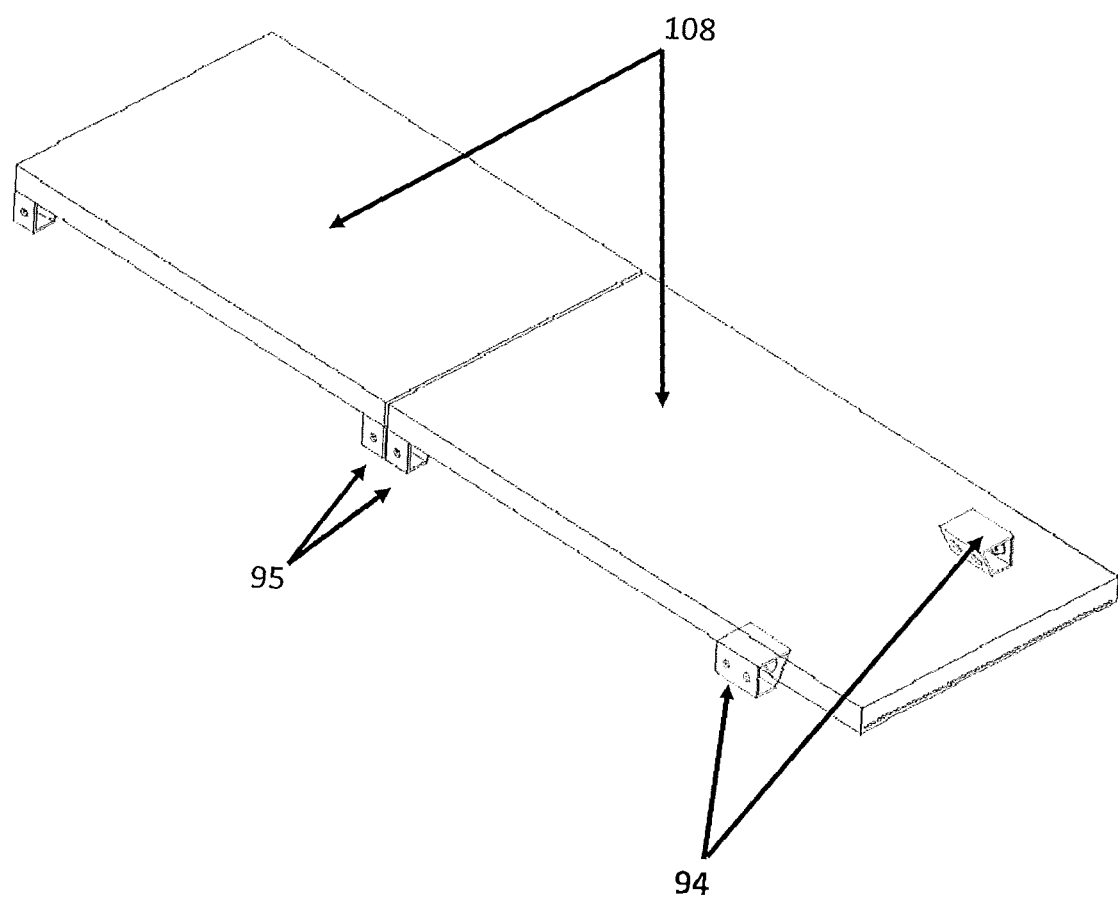
FIG. 13 is a perspective view of a hallway slab having pedestals for coupling to the connector assembly, as disclosed herein.
Figure 14:
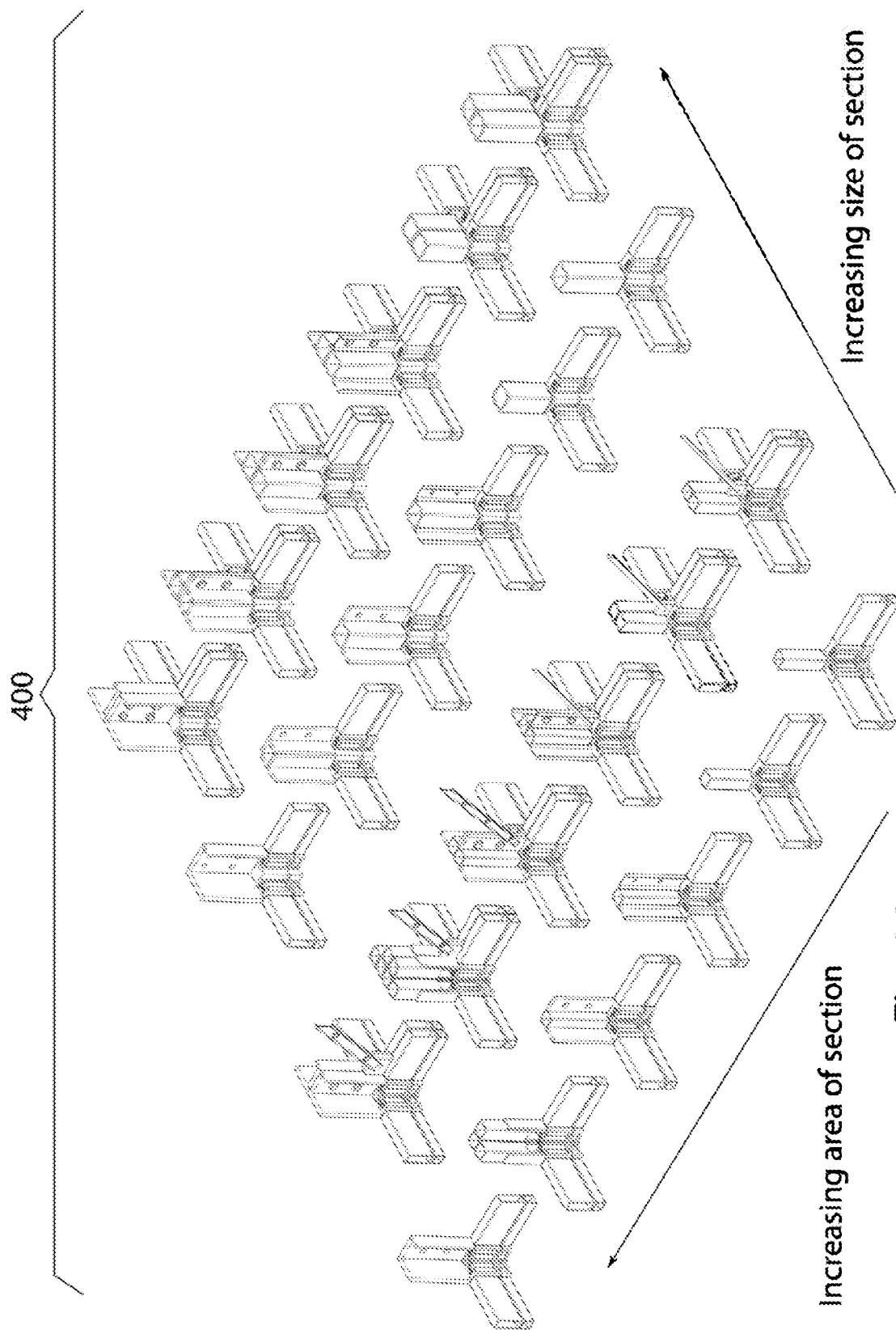
FIG. 14 discloses sections of embodiments of a modular frame having the connector assembly, disclosed herein.
Figure 15:
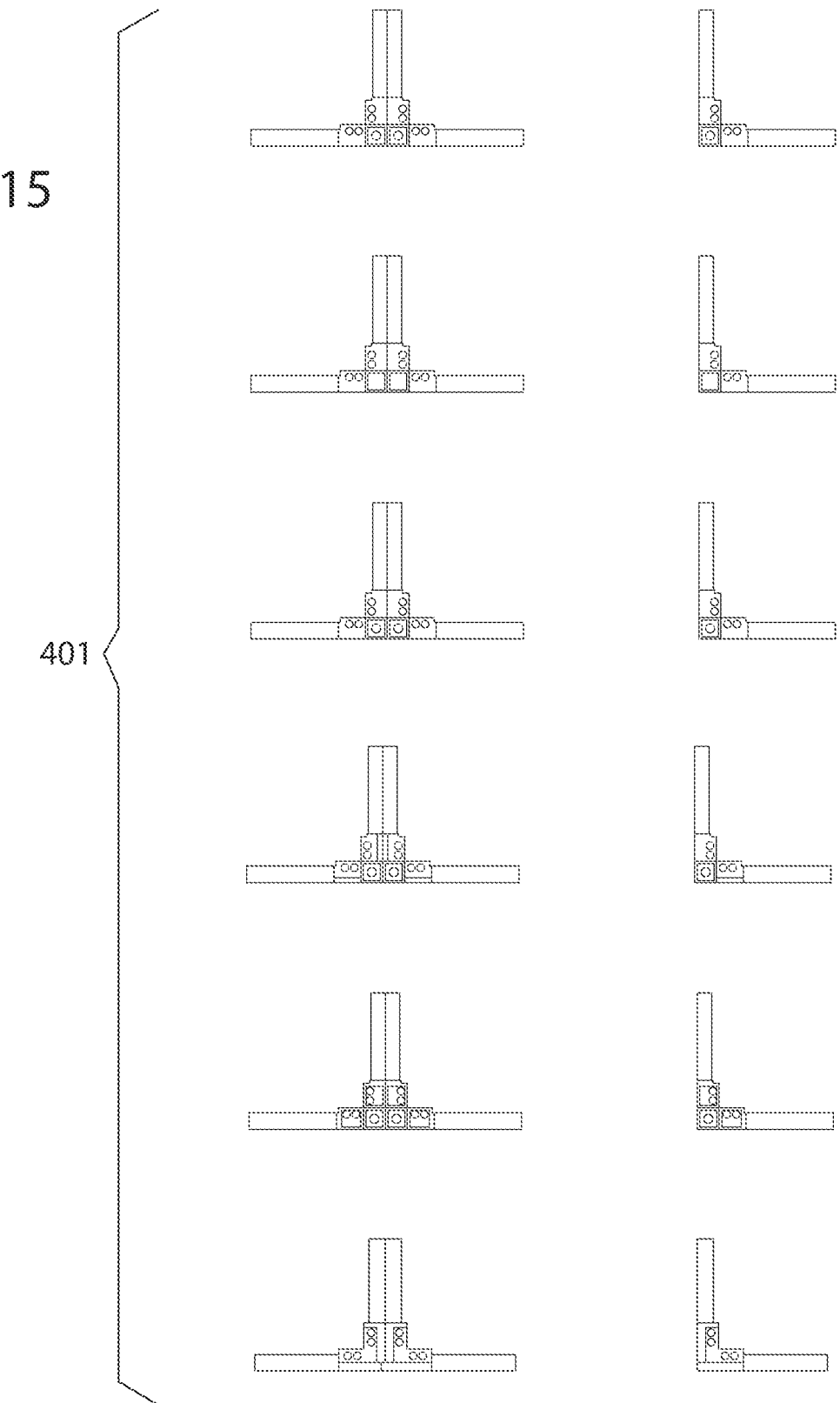
FIG. 15 discloses a top view of a section of the embodiments of a modular frame having the connector assembly, disclosed herein.
Figure 16:
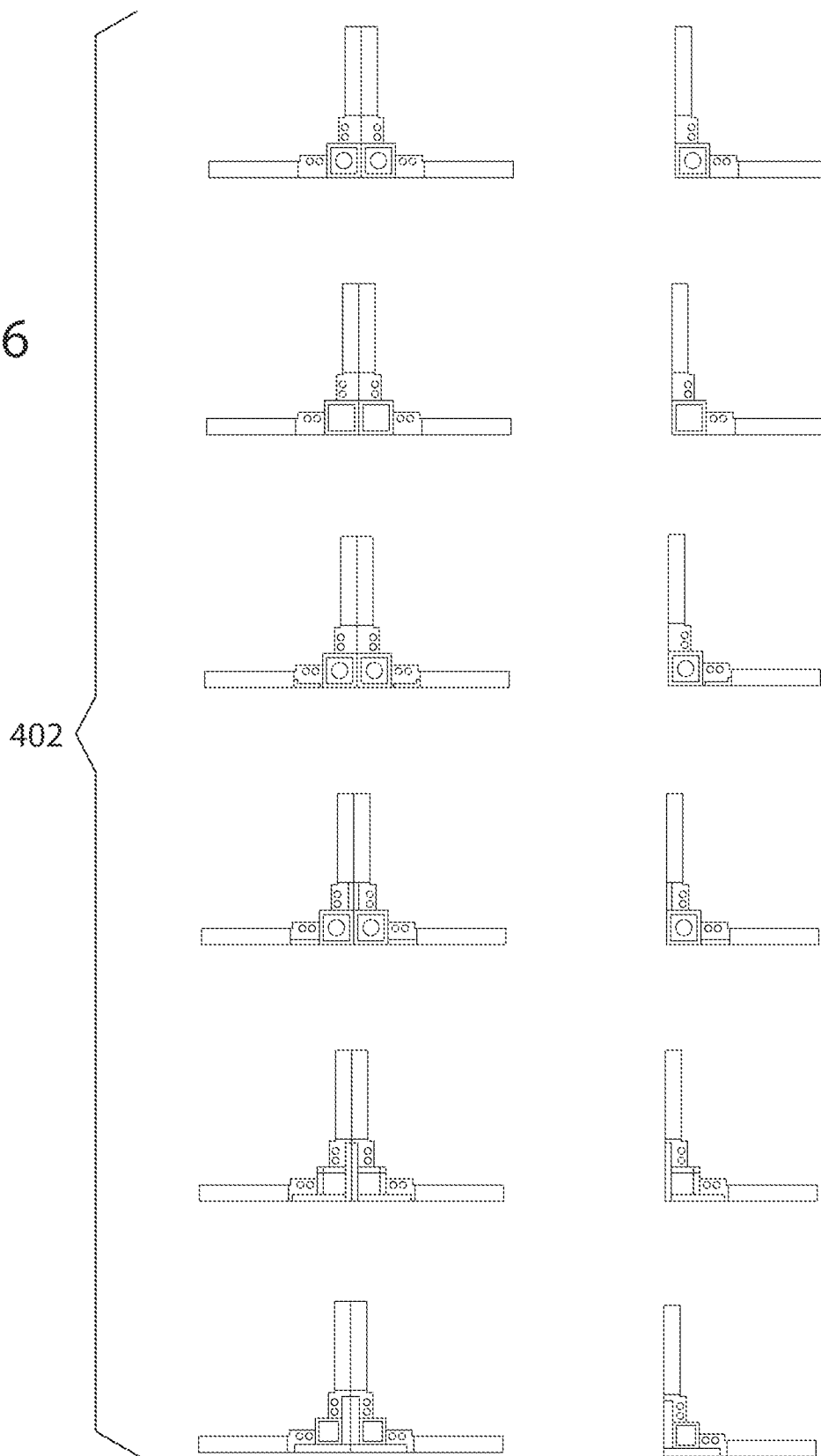
FIG. 16 discloses a top view of a section of the embodiments of a modular frame having the connector assembly, disclosed herein.

FIG. 13 discloses a flooring slab 108 of monolithic construction incorporating pedestal 95 that rests upon and connected to extended gusset plate, lower connector or upper connector. FIGS. 14-16, 18 and 19 show the increasing area of a section of the assembly that goes from a single column to a wider plate, and also shows an increase in the size of the sections going from a single column to increase in size of the column and number of columns.

Figure 20:
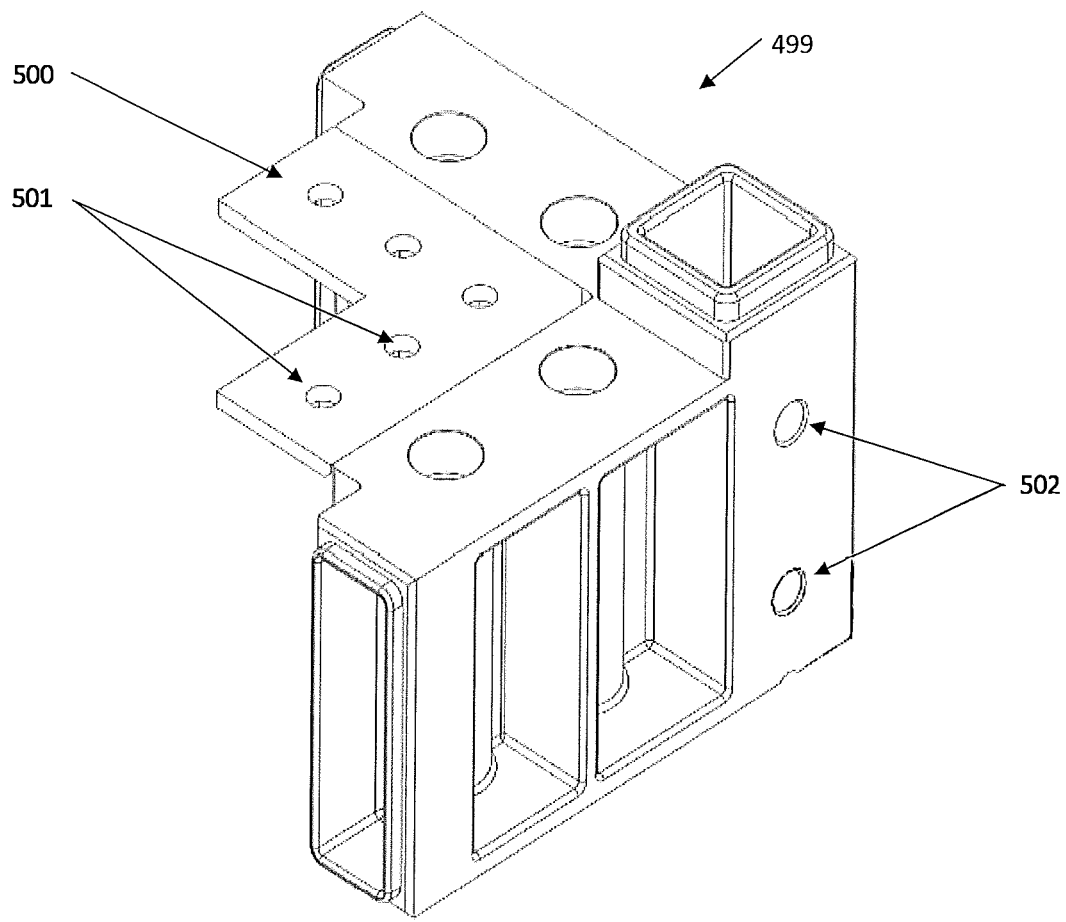
FIG. 20 is a perspective view from a side of a third second embodiment of a lower corner connector.

A third embodiment of the lower column connector 499 is disclosed in FIG. 20, which has a flange or plate 500 extending from the arms towards the inner face of the lower column connector 499. The flange or plate 500 can be used for supporting a floor or ceiling structure. In one embodiment, as shown in FIG. 20, the flange or plate 499 lies in the same plane (co-planar) as the lower connector arm load bearing face 40, so as to provide a continuous backer in the area. In a particular embodiment, the flange or plate 499 can be provided with connection holes 501 that can be used for fastening or coupling a floor or ceiling with the lower column connector 499. In a related embodiment, the upper connector may also be equipped with similar features.

Figure 21:
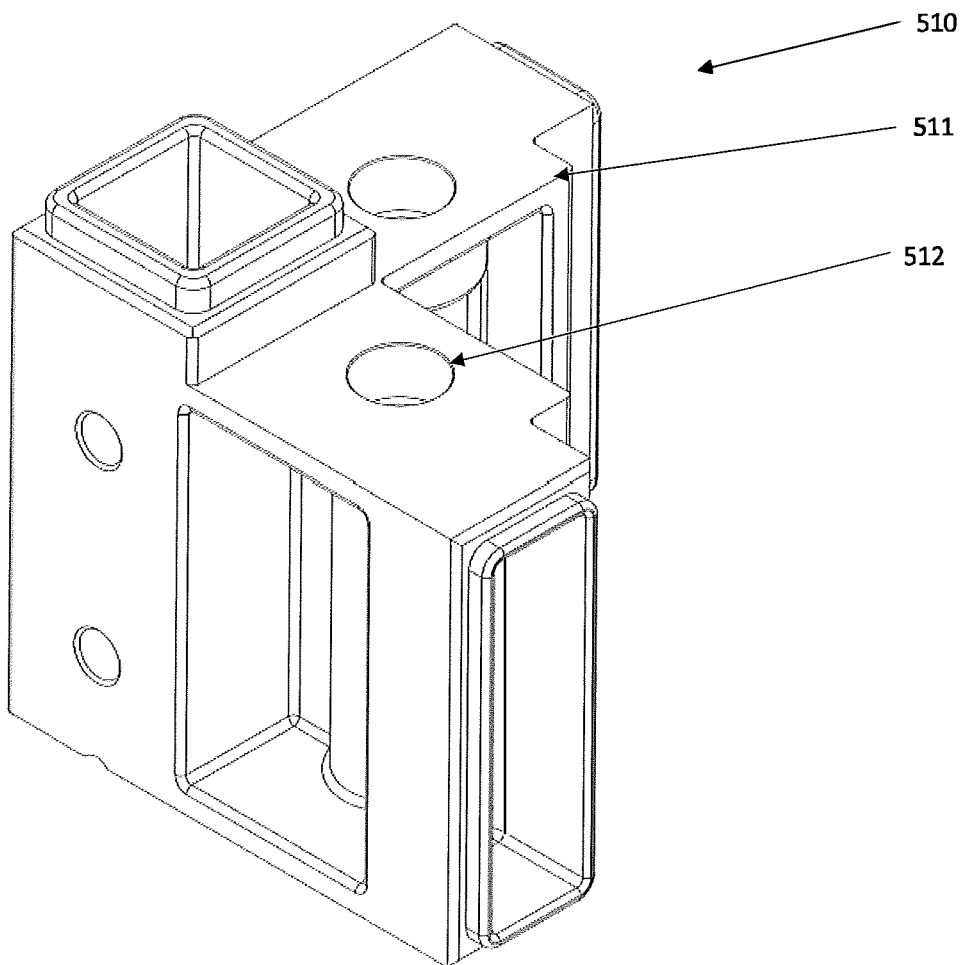
FIG. 21 is another perspective view from the side of a fourth embodiment of the lower corner connector.
Figure 22:
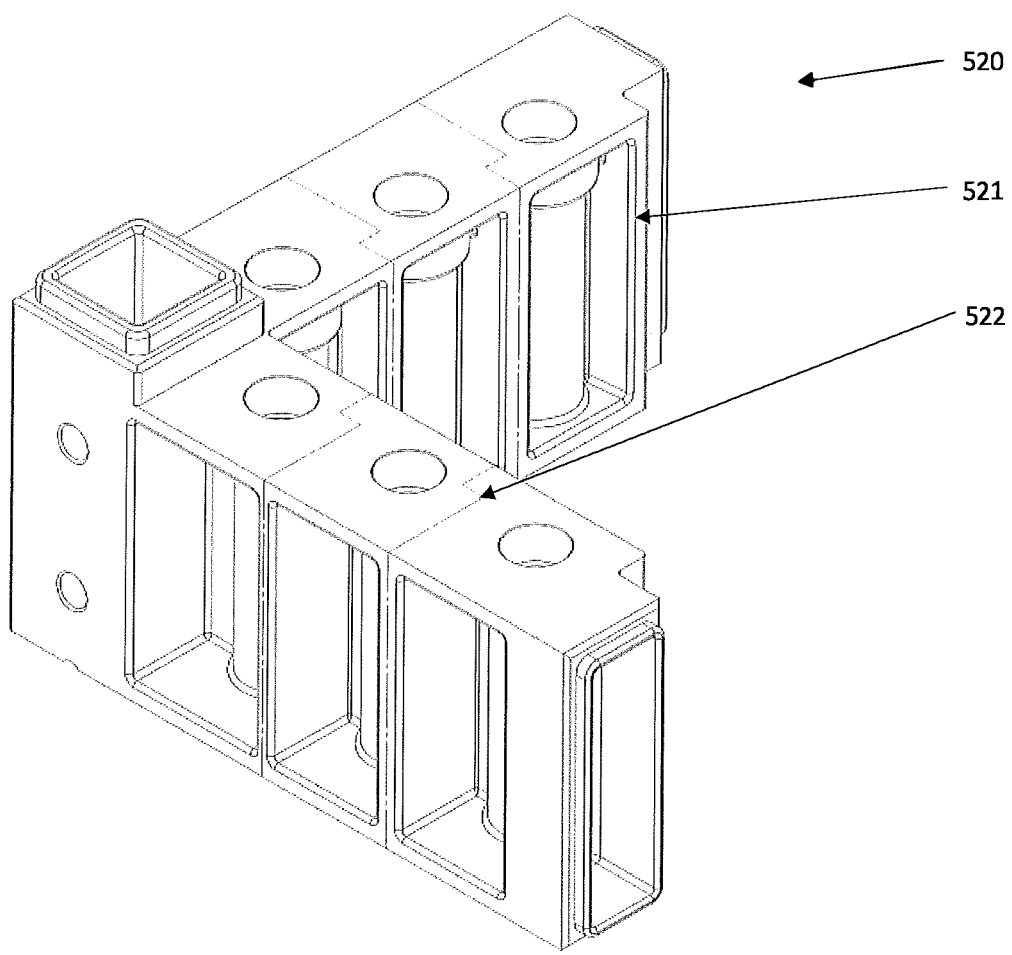
FIG. 22 is a perspective view from a side of a fifth embodiment of a lower corner connector.

FIGS. 21 and 22 show a fourth and fifth embodiment of lower column connector 520. As shown in the embodiments, the lower connector 520 can be made using arms (511, 521) of varying length that can be used, depending upon the design and application requirements. Moreover, the arms (511, 521) can be provided with a varying number of holes 512, which are formed based on the application and design requirements.

Figure 23:
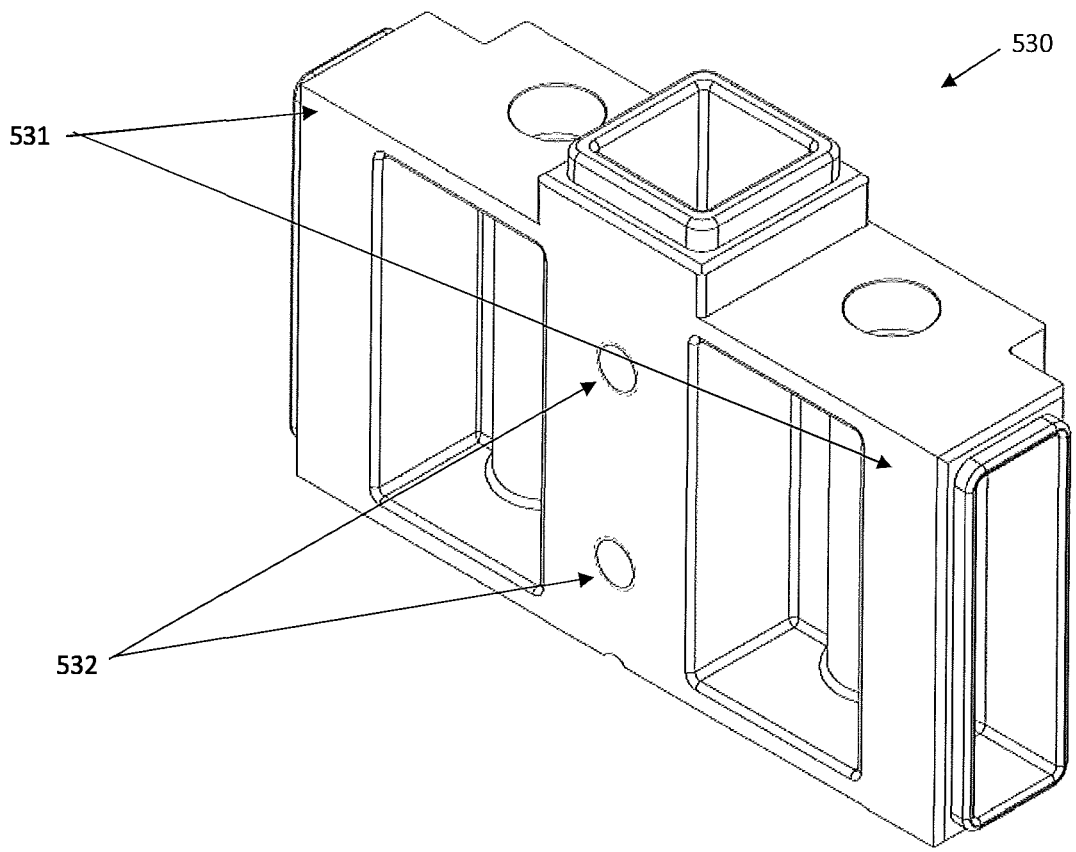
FIG. 23 is a perspective view from a side of a sixth embodiment of a lower corner connector.

FIG. 23 discloses a sixth embodiment of a lower column connector that can be used in accordance with the specification. In the embodiment, the arms 531 extend in opposing directions, rather than at 90° as shown in FIGS. 21 and 22. As would be recognized by a person of ordinary skill in the art, the direction of the arms can be varied, with the arms being less than or more than 90°, as required. Further to the above, FIGS. 20-23 disclose an alternate embodiment of the arms (511, 521, 531) where the channel is formed by providing a cut-out on the inner face of the arms.

Figure 24:
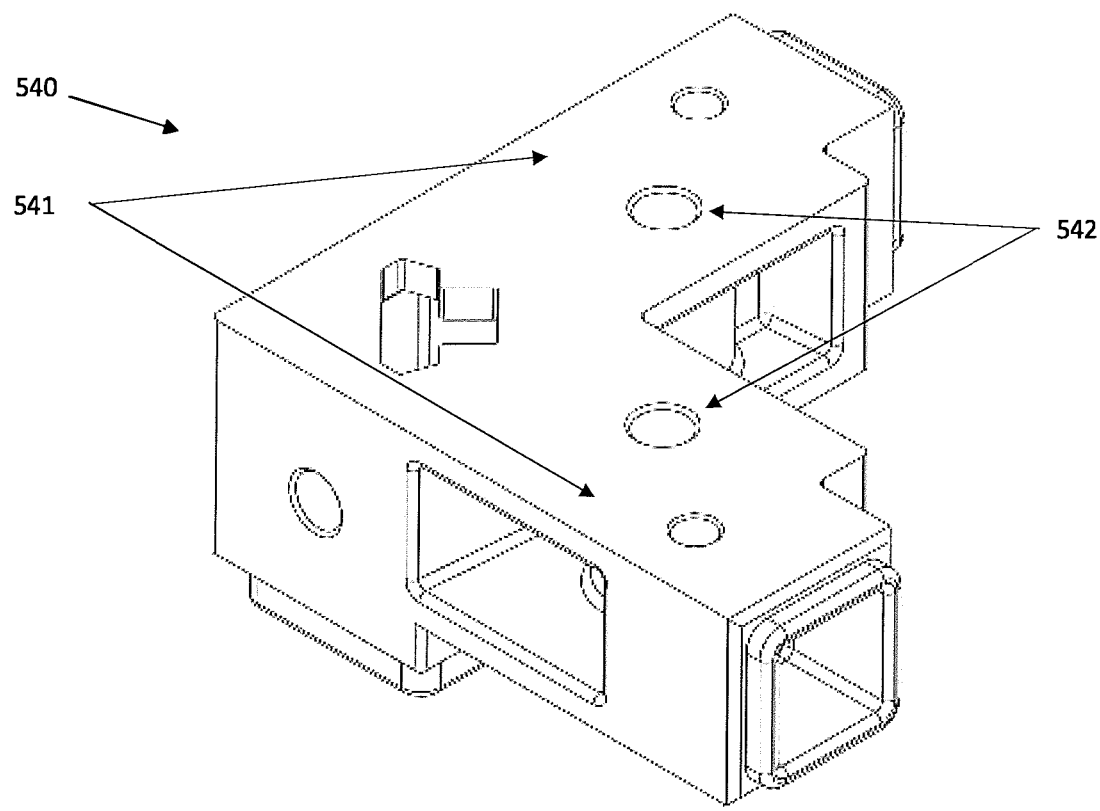
FIG. 24 is a perspective view from a side of a second embodiment of an upper corner connector.

FIG. 24 discloses a second embodiment of an upper column connector 540 that can be used in accordance with the specification. Analogous to the lower connector shown in FIGS. 21-23, the arm length of the upper column connector 540 can be varied. Further, the embodiment discloses an alternate embodiment of the arms 541 where the channel is formed by providing a cut-out on the inner face of the arms. FIG. 24 discloses an upper connector configured so as to mate with the lower connector shown in FIG. 21. As would be recognized by a person of ordinary skill in the art, the upper blocks vary in length and the number of holes so as to engage with the lower blocks which are fastened to them.

Figure 25:
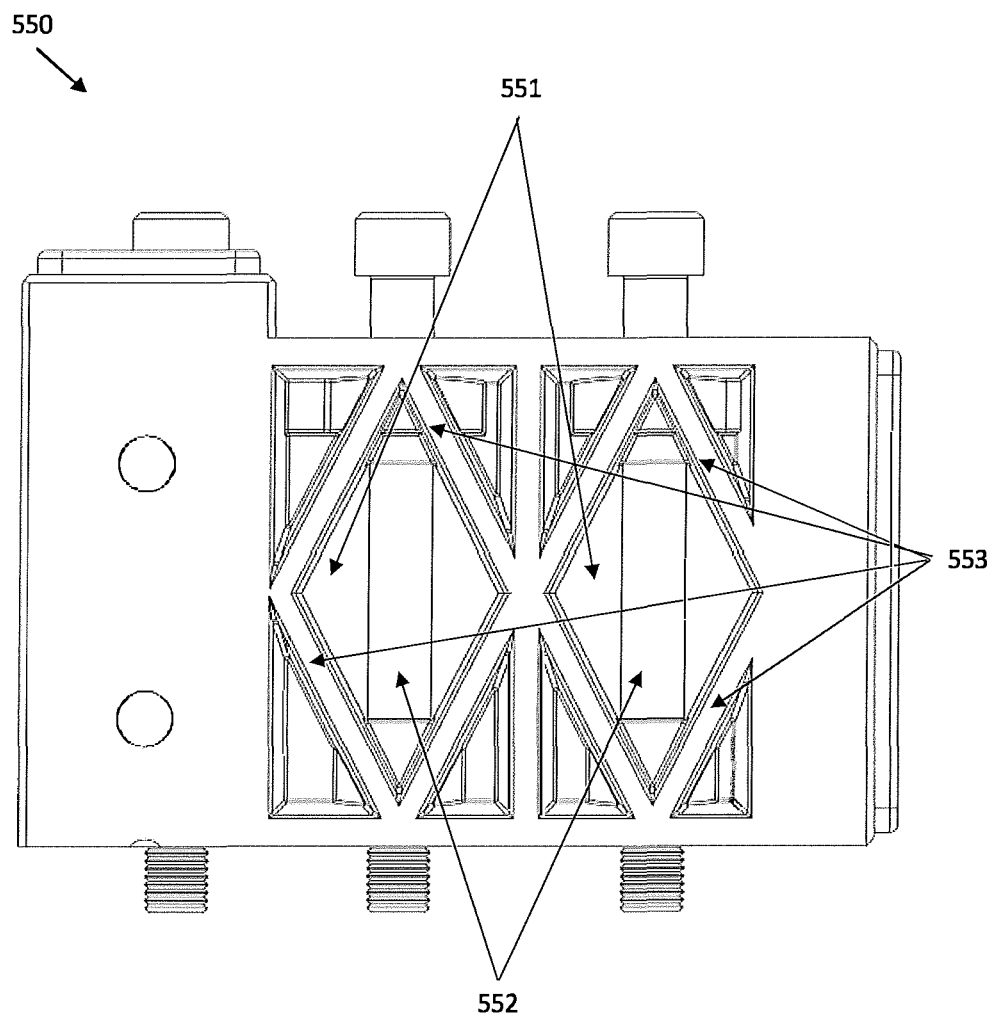
FIG. 25 is a side elevation view of a seventh embodiment of a lower corner connector.
Figure 26:
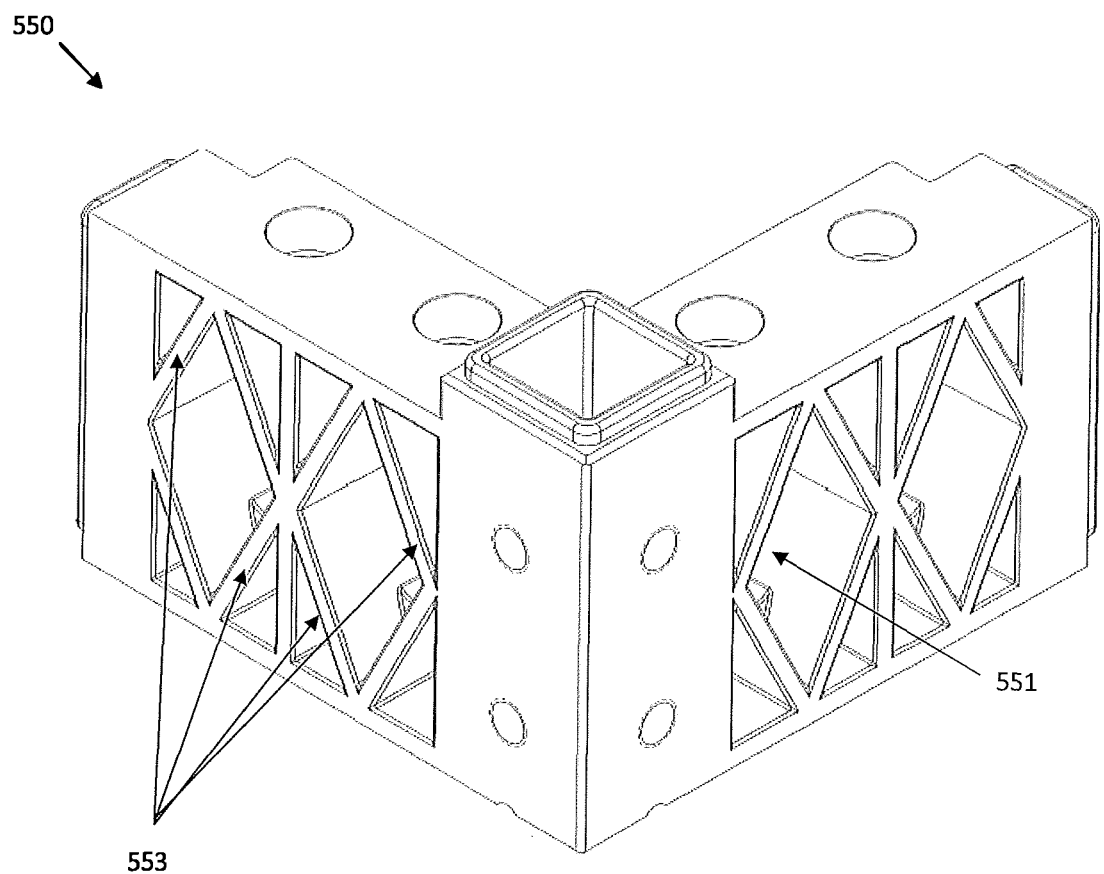
FIG. 26 is a perspective view from an outer face of the seventh embodiment of a lower corner connector.

A seventh embodiment of the lower column connector is shown in FIGS. 25 and 26. The lower column connector 550 is provided with apertures 551 in the arms of the connector 550 that extend from the inner face to the outer face of the connector 550. By forming apertures 551 that extend from the inner face to the outer face of the connector 550, the extent of drilling in the arms (for passage of bolts or other fastening means) can be reduced. In a particular embodiment (as shown in FIGS. 25 and 26), the arms with apertures 551 can be reinforced by ribs 553 that can help to increase the load bearing capacity and also can help to prevent twisting of the arms of the connector 550.

Figure 28:
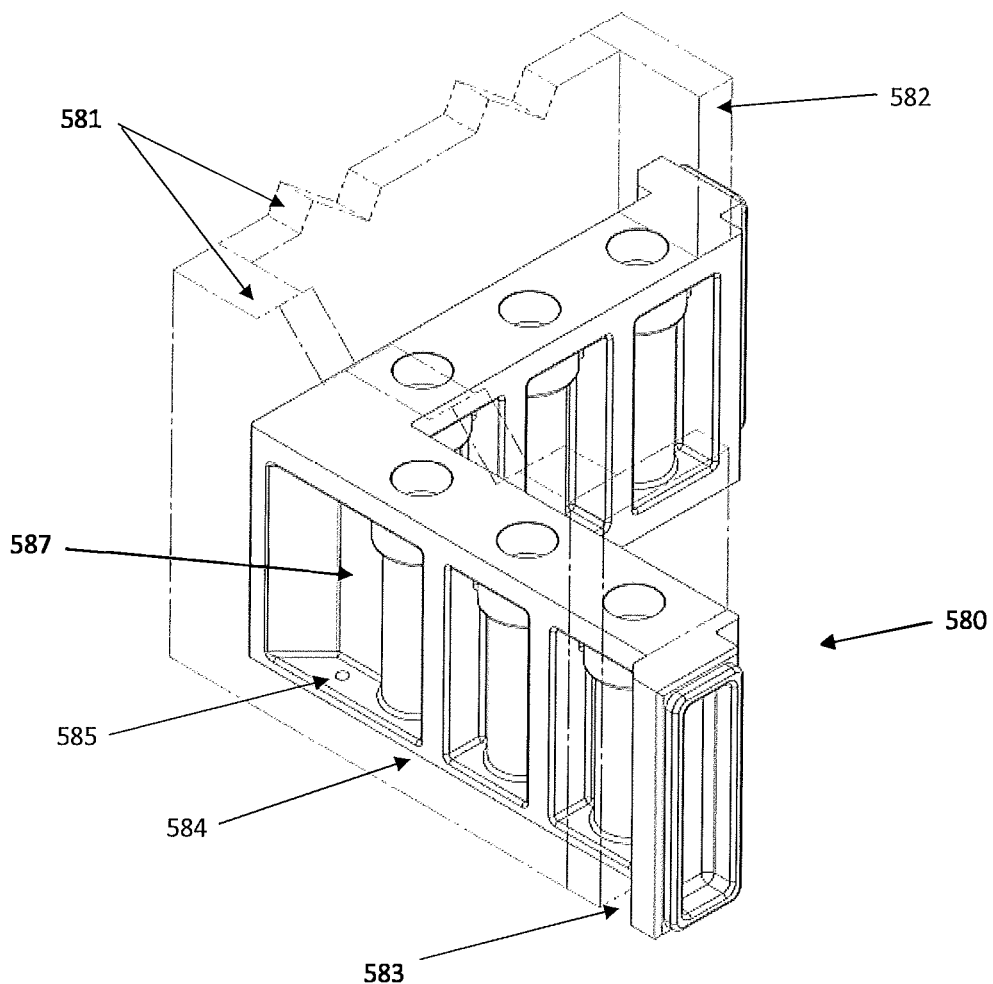
FIG. 28 is a perspective view from a side of an eighth embodiment of a lower plate connector.
Figure 29:
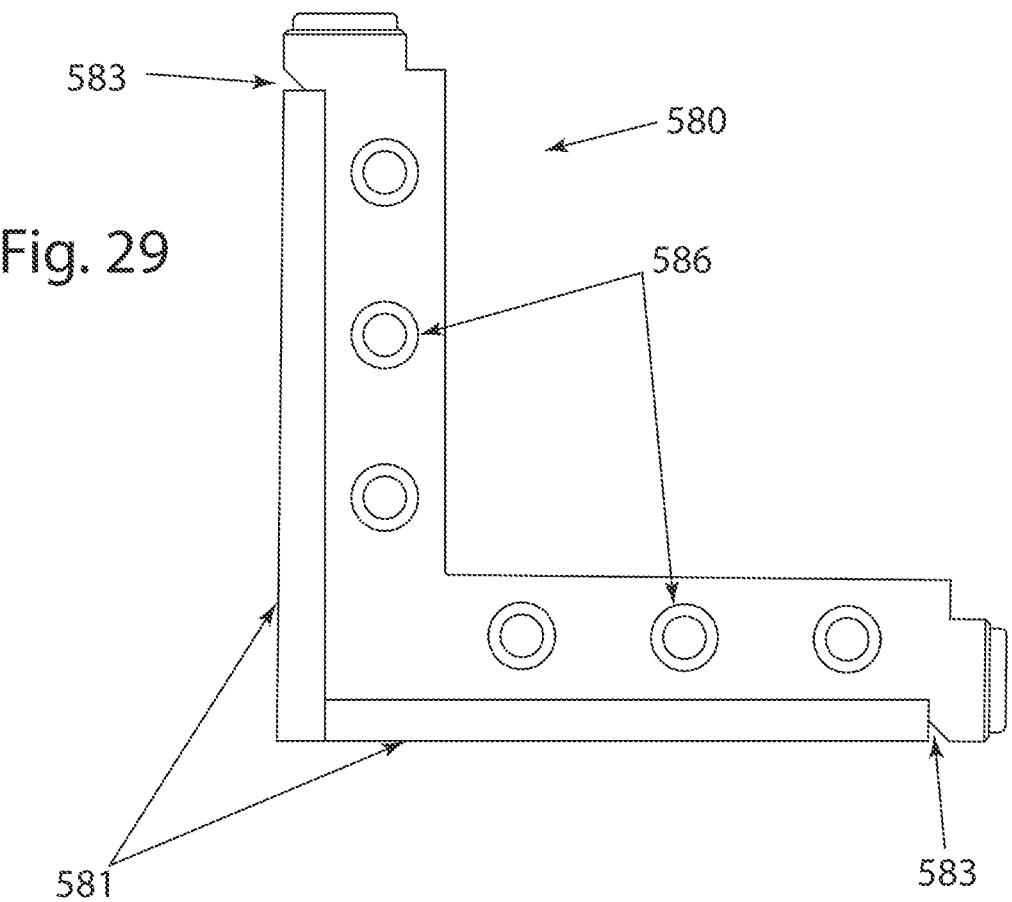
FIG. 29 is a plan view of the lower plate connector shown in FIG. 28.

An eighth embodiment of the lower connector is shown in FIGS. 28 and 29 that can be used as a lower plate connector 580 for connection with a column plate 581. In the embodiment shown, the outer face of the arms has a cut-out that can engage with a column plate. Further, the cut-out on the outer surface of the arms results in the lower connector arm beam contact face extending towards the outer face of the arm. This provides a weld preparation 583, that can a beveled surface as shown in FIG. 29.

Further to the above, a cavity 587 can be formed on the outer face of the arms. The edges of the arms forming the cavity can also be beveled to provide additional surface for welding of the column plate to the lower connector 580. In addition, weep holes 585 can be formed in the arms for providing a route for drainage, as may be needed.

Figure 30:
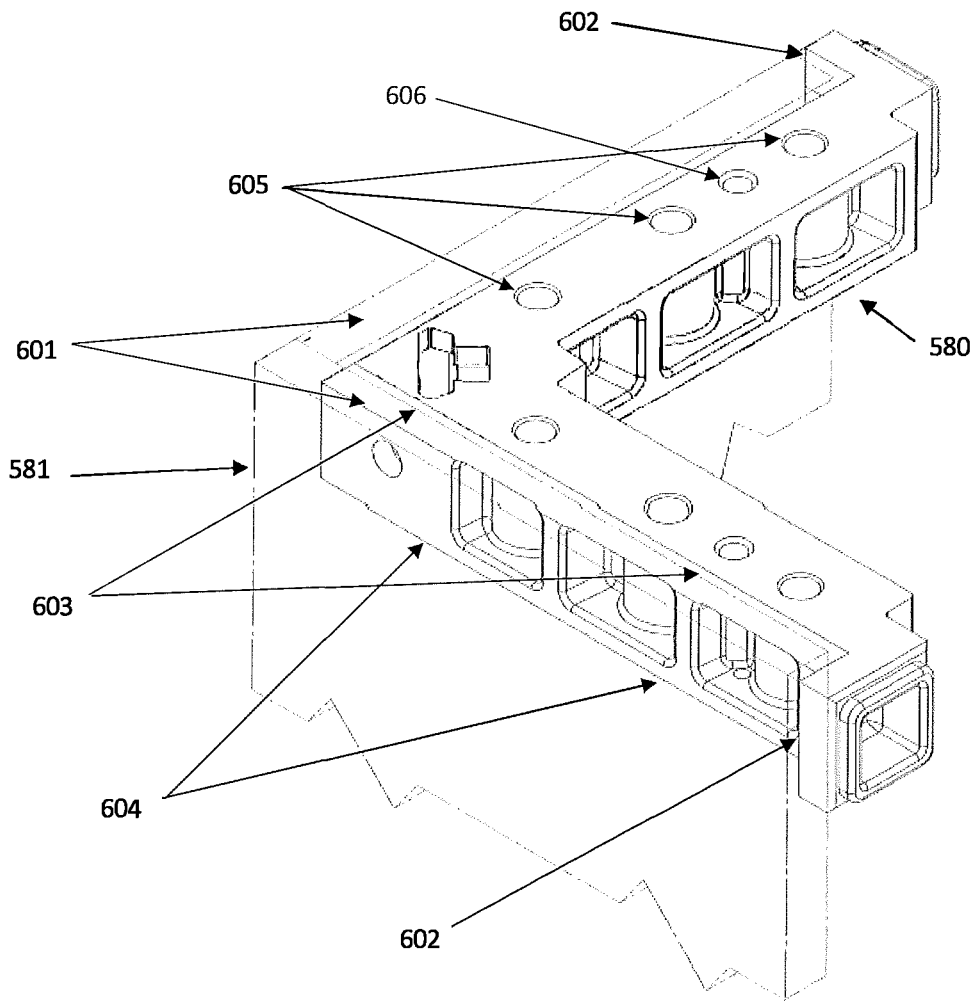
FIG. 30 is a perspective view from a side of a third embodiment of an upper corner connector.
Figure 31:
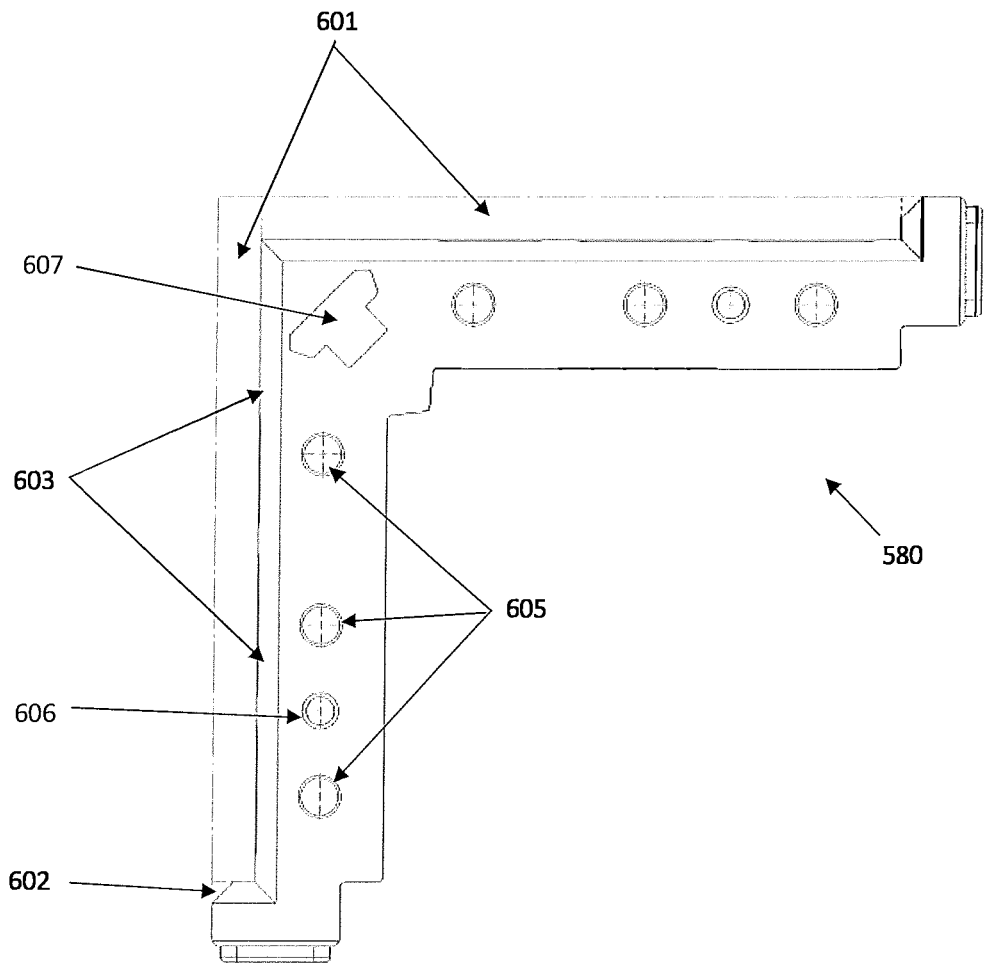
FIG. 31 is a plan view of the third embodiment of the upper corner connector shown in FIG. 30.

A third embodiment of the upper connector is shown in FIGS. 30 and 31 that can be used as an upper plate connector 580. Analogous to the lower connector shown in FIGS. 28 and 29, the upper plate can be used for connection with a column plate 581. In the embodiment shown, the outer face of the arms has a cut-out that can engage with a column plate. Further, the cut-out on the outer surface of the arms results in the upper connector arm beam contact face extending towards the outer face of the arm. This provides a weld preparation 602 that can be a beveled surface as shown in FIG. 31.

Further to the above, a cavity can be formed on the outer face of the arms. The edges of the arms forming the cavity can also be beveled to provide additional surface for welding of the column plate to the upper connector 604. In addition, holes (605, 606) can be formed in the arms for allowing fastening of the upper connector to a gusset plate or lower connector. In addition, an opening 607 to engage a hoisting means can also be provided.

Figure 32:
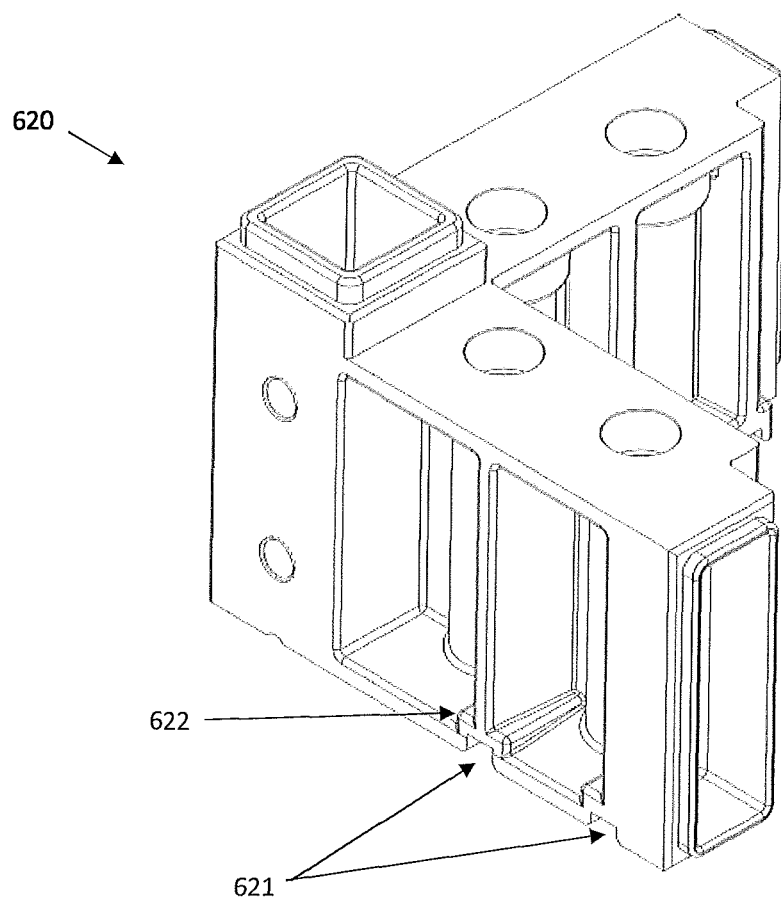
FIG. 32 is a perspective view from a side of a ninth embodiment of a lower corner connector.
Figure 33:
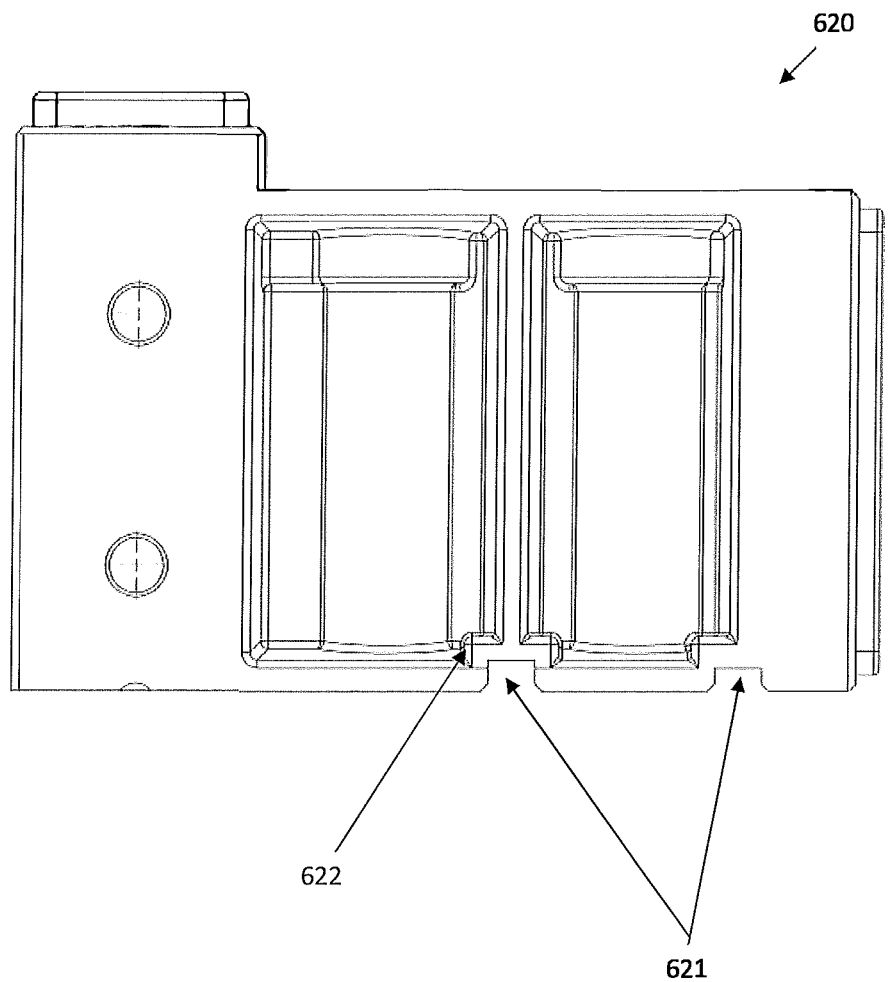
FIG. 33 is a plan view of the ninth embodiment of a lower corner connector.

A ninth embodiment of the lower column connector with shear resistance slots 620 is shown in FIGS. 32 and 33. In the embodiment shown, the connector 620 is provided with features on the gusset contact face that can engage corresponding features on the gusset plate so as to increase the resistance to slippage along the contact plane, as can occur during a seismic event. In the embodiment shown in FIGS. 32 and 33, the gusset contact face of the lower connector 620 is provided with slots 621 that can engage with resistance bars 640 on the gusset plate 643 (on shown in FIG. 34). Further the area 622 around the slots can be thickened so as to provide further support for the slots 621.

The embodiments shown in FIGS. 28-31 can be used to provide resistance to horizontal drift, buckling and uplift of the columns by joining two or more columns by welding along their vertical edges or other suitable means in to groups and welding or attaching these groups to the connector blocks in the areas provided for the purposes. In a particular embodiment, the columns are made of plates joined by welding or other suitable means along their edges and these assemblies are welded or otherwise joined to the blocks.

Figure 34A:
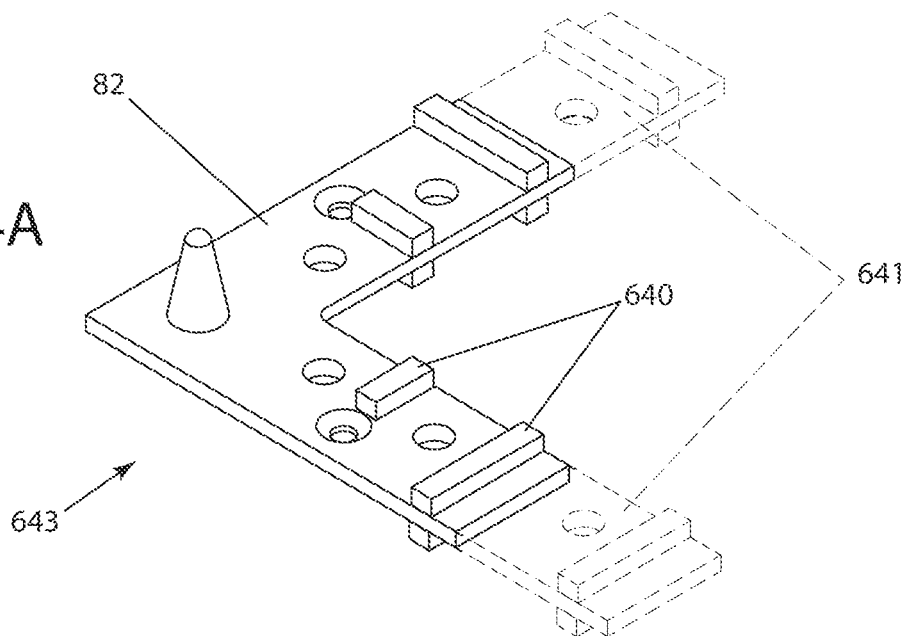
FIG. 34 (a & b) is a (a) perspective view and (b) a plan view of an embodiment of a gusset plate.
Figure 34B:
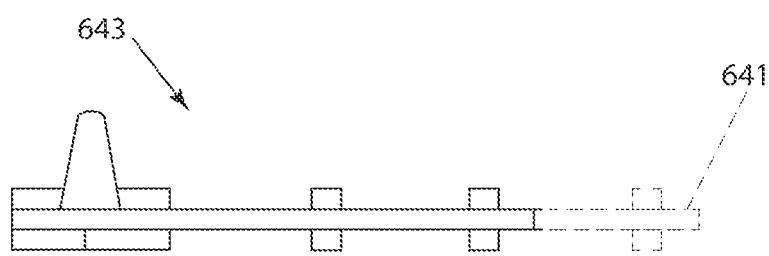
Figure 35:
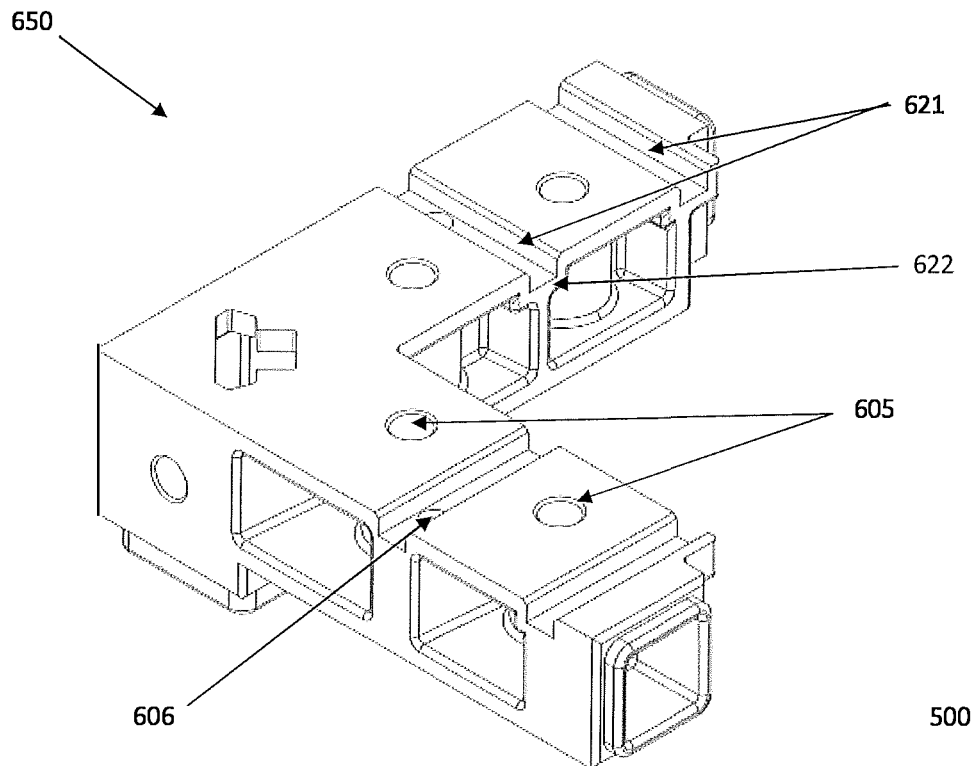
FIG. 35 is a perspective view from a side of a fourth embodiment of an upper corner connector.

FIG. 35 discloses a fourth embodiment of an upper column connector 650 that can be used in accordance with the specification. The upper connector 650 has features analogous to the lower connector shown in FIGS. 32 and 33. In the embodiment shown, the connector 650 is provided with features on the gusset contact face that can engage corresponding features on the gusset plate so as to increase the resistance to slippage along the contact plane, as can occur during a seismic event. In the embodiment shown, the gusset contact face of the upper connector 650 is provided with slots 621 that can engage with resistance bars 640 on the gusset plate 643 (on shown in FIG. 34). Further the area 622 around the slots can be thickened so as to provide further support for the slots 621. Moreover, the slot area 621 can be provided by holes to receive fasteners to fasten the upper connector 650 with the gusset plate.

An embodiment of the gusset plate 643 with shear resistance bars is disclosed in FIG. 34 (a & b). As discussed above, the shear resistance bars 640 engage slots on the upper and lower connectors to prevent slippage as might occur during an seismic event and also can help to reduce the load that such movement can apply to the shanks of the vertical tension fasteners. In a particular embodiment, an extended gusset plate 641 can be formed and provided with holes for the passage of fasteners to support and engage accessory support and connection assemblies of a variety of sizes.

FIG. 36 show an alternate embodiment of a connector assembly in accordance with the specification, which is analogous to the connector assembly shown and disclosed herein with reference to FIGS. 10 and 11. The connector assembly can be formed by sandwiching the gusset plate 643 between the upper connector 650 having shear resistance slots and lower connector 620 with shear resistance slots. The gusset plate 643 shown has two faces, where the first face can be in contact with lower connector 620 and the second face can be contact with the upper connector 650. In addition, the gusset plate 643 is provided shear resistance bars 640 that engage the slots in the upper and lower connectors. Further, the gusset plate 643 has through holes, which align with apertures on the upper connector 606 and lower connector, allowing fastening of the connectors using fastening means 80.

The fastening means 80 is not particularly limited, and can include nut and bolts, screws. In a particular embodiment, as shown FIG. 36, vertical tension fasteners 80 are inserted in holes in the lower connector 620 that pass through the gusset plate 643 and couple with the upper connector 650. Further, gusset plate fasteners 83 are inserted passed through the gusset plate 643 and engage holes (that can be threaded) in the upper connector 650. In the embodiment shown in FIG. 36, the gusset plate fasteners 83 engage holes that are positioned in the slots in the upper connector 650.

Figure 37:
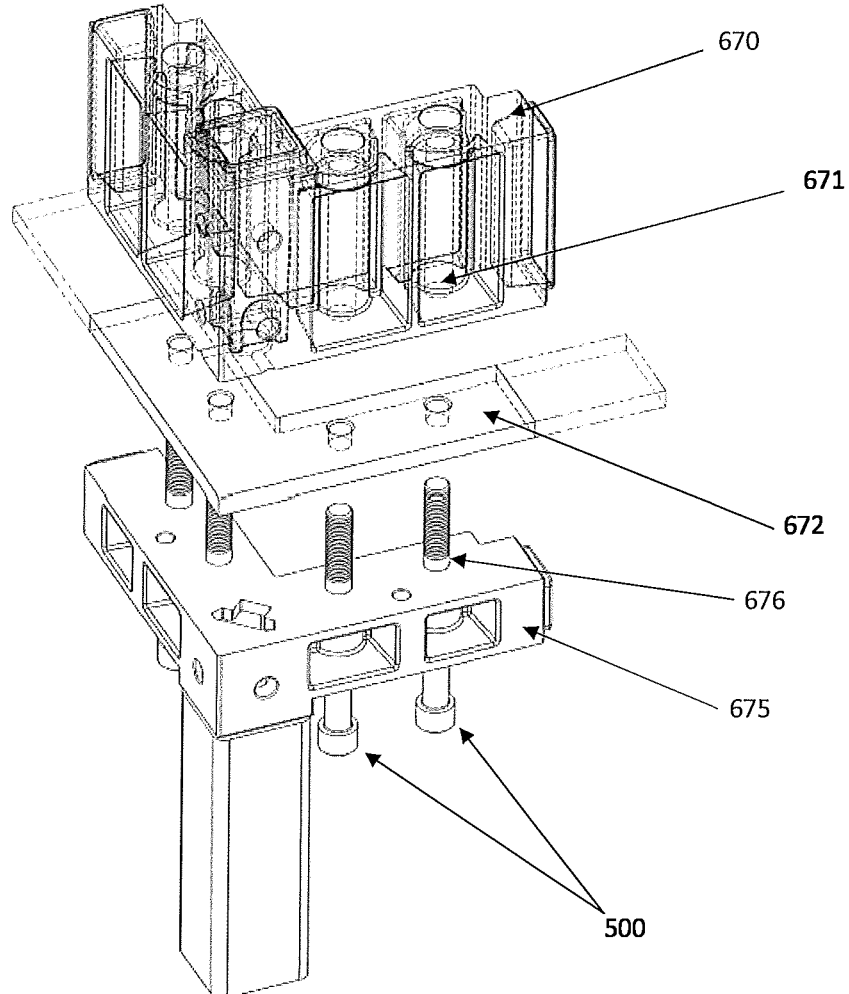

In an alternate embodiment, as shown in FIG. 37, the fasteners 500 can inserted first into the upper connector 675, passed through holes in the gusset plate 672 and engage the lower block 670. This method of fastening allows the fastener to be inserted from the bottom-up, rather than top-down as shown in FIG. 36.

FIG. 38 shows connection of an accessory connection block 683 to an extended portion 681 of a gusset plate 680. As shown with respect to FIGS. 11-13, the accessory connection block 94 can be fastened to a lower connector, which can then be used to support a hallway slab 108 or other flooring surface. The accessory connection block 683 (see FIG. 38) can be fastened using fasteners (684, 685) to the extended portion 681 of the gusset plate 680.

FIG. 39 shows a side and perspective views of a structurally graduated stack with increasing number of structural elements 696, with increasing weight per foot and load-bearing capacity in the direction of arrow 692, as shown in the figure. In the structure shown, the lower most portion has a portion of column fabricated with a built up plate 694. As the vertical position of the structure increases, the connection blocks with various arm lengths, as shown and disclosed herein can be used.

Figure 27A:
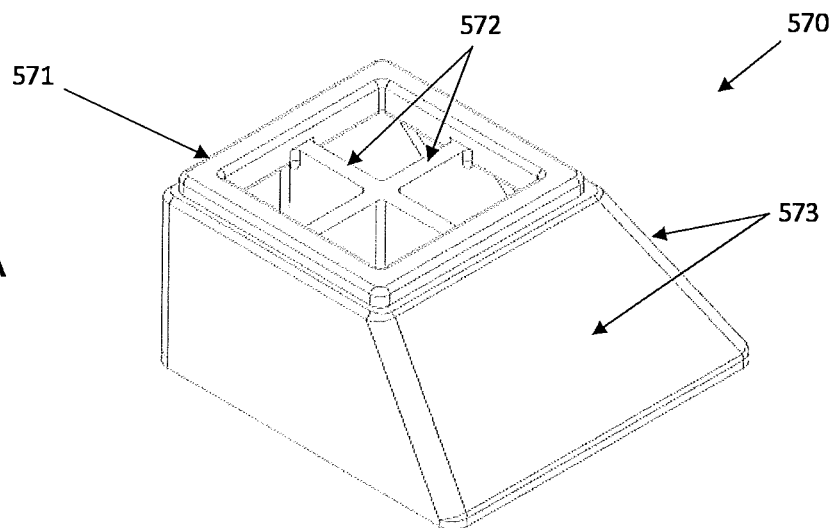
FIG. 27(*a* & b) is a perspective view showing the upper and lower faces of a column to connector size transition adapter.
Figure 27B:
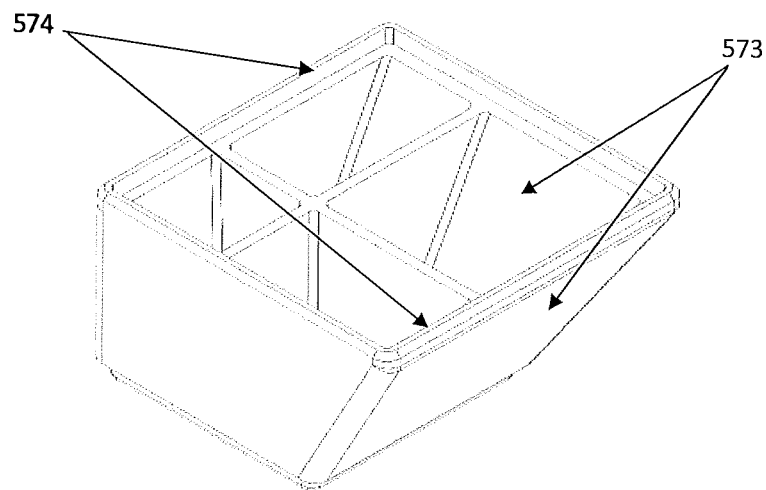

FIG. 40 shows an alternate embodiment of a structurally graduated stack (700, 701) having column to connector size transition adapters 570. An embodiment of the column to connector size transition adapters 570 is shown in FIG. 27. The adapters 570 are provided with two sloping faces 573 and two vertical faces. The portion of the adapter 570 that engages the column is provided with weld backer 571 for connecting the adapter to the column. Reinforcing ribs 572 are also provided that can help with the structural integrity of the adapter 570. The other portion of the adapter 570 that engages with the connector is also provided with joining features 574, such as a weld backer. The adapter 570 can be used in the stack shown in FIG. 40.

Further, analogous to the stack shown in FIG. 39, the stack (700, 701) in FIG. 40, the structurally graduated stack with increasing number of tubular elements 704 has increasing weight per foot and load-bearing capacity in the direction of arrow 702, as shown in the figure. In the structure shown, the lower most portion has a portion of column fabricated with a built up plate 703. As the vertical position of the structure increases, the connection blocks with various arm lengths, as shown and disclosed herein can be used. The columns are joined together by welding along their vertical edges which creates a shear wall.

Certain adaptations and modifications of the described embodiments can be made. Therefore, the above discussed embodiments are considered to be illustrative and not restrictive. Further, reference numerals have been used in the claims for solely to assist with construing the claims.

| No. | Description | No. | Description | No. | Description |
|---|---|---|---|---|---|
| 2 | Lower connector | 4 | Lower connector body | 6 | Lower connector arm |
| 8 | lower connector body column receiving end | 10 | lower connector body gusset contact end | 20 | lower connector arm gusset contact end |
| 22 | lower connector arm Inner face | 24 | lower connector arm outer face | 28 | Fixing aperture |
| 34 | lower connector arm weld receiving bevel | 36 | lower connector arm weld backer | 40 | lower connector arm load bearing face |
| 42 | lower connector arm. beam contact face | 44 | lower connector arm boss | 46 | locating pin receiving aperture |
| 50 | lower connector body gusset contact face | 52 | Load bearing surface on lower connector arm | 54 | lower connector body weld receiving bevel |
| 56 | Lower connector body weld Backer | 58 | Aperture | 60 | Weep channels |
| 62 | Arm edge bevel | 64 | Channel | | |
| 102 | Upper connector | 104 | Upper connector body | 106 | Upper connector arm |
| 108 | upper connector body column receiving end | 110 | Upper connector body gusset end | 112 | upper connector arm inner face |
| 114 | upper connector arm outer face | 116 | upper connector arm gusset contact face | 118 | upper connector arm load bearing face |
| 120 | upper connector arm beam contact face | 122 | upper connector arm boss | 124 | upper connector arm weld receiving bevel |
| 126 | upper connector arm weld backer | 128 | upper connector arm fixing aperture | 130 | upper connector arm gusset coupling aperture |
| 132 | upper connector body gusset contact face | 154 | Upper connector body weld receiving bevel | 156 | Upper connector body weld backer |
| 158 | Upper connector body aperture | 160 | Upper connector body T-shaped opening | 162 | Upper connector arm load bearing face |

Figure 12:
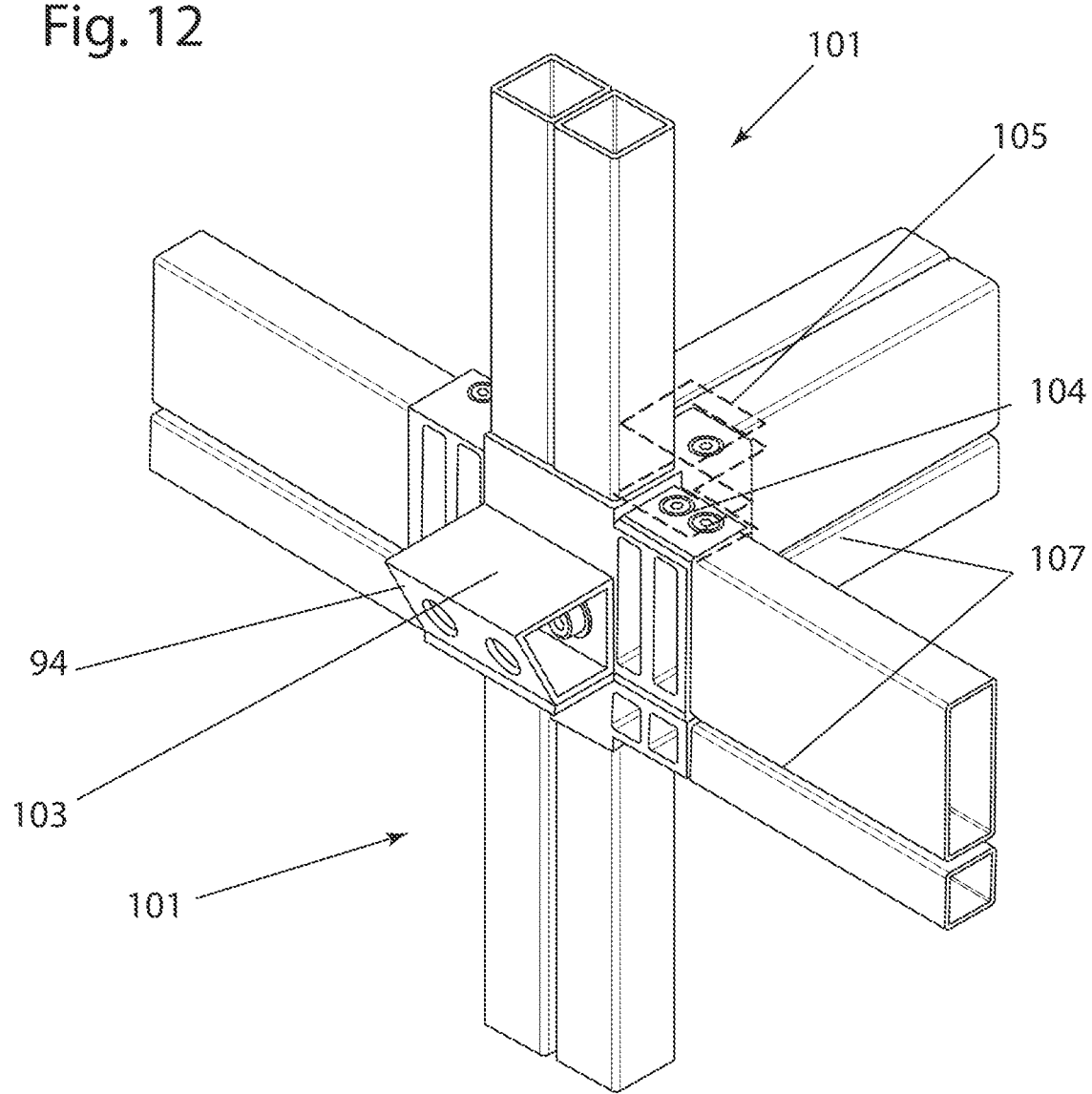
FIG. 12 is a perspective view of a coupling assembly connecting the modular frames as shown in FIG. 11.
Figure 17:
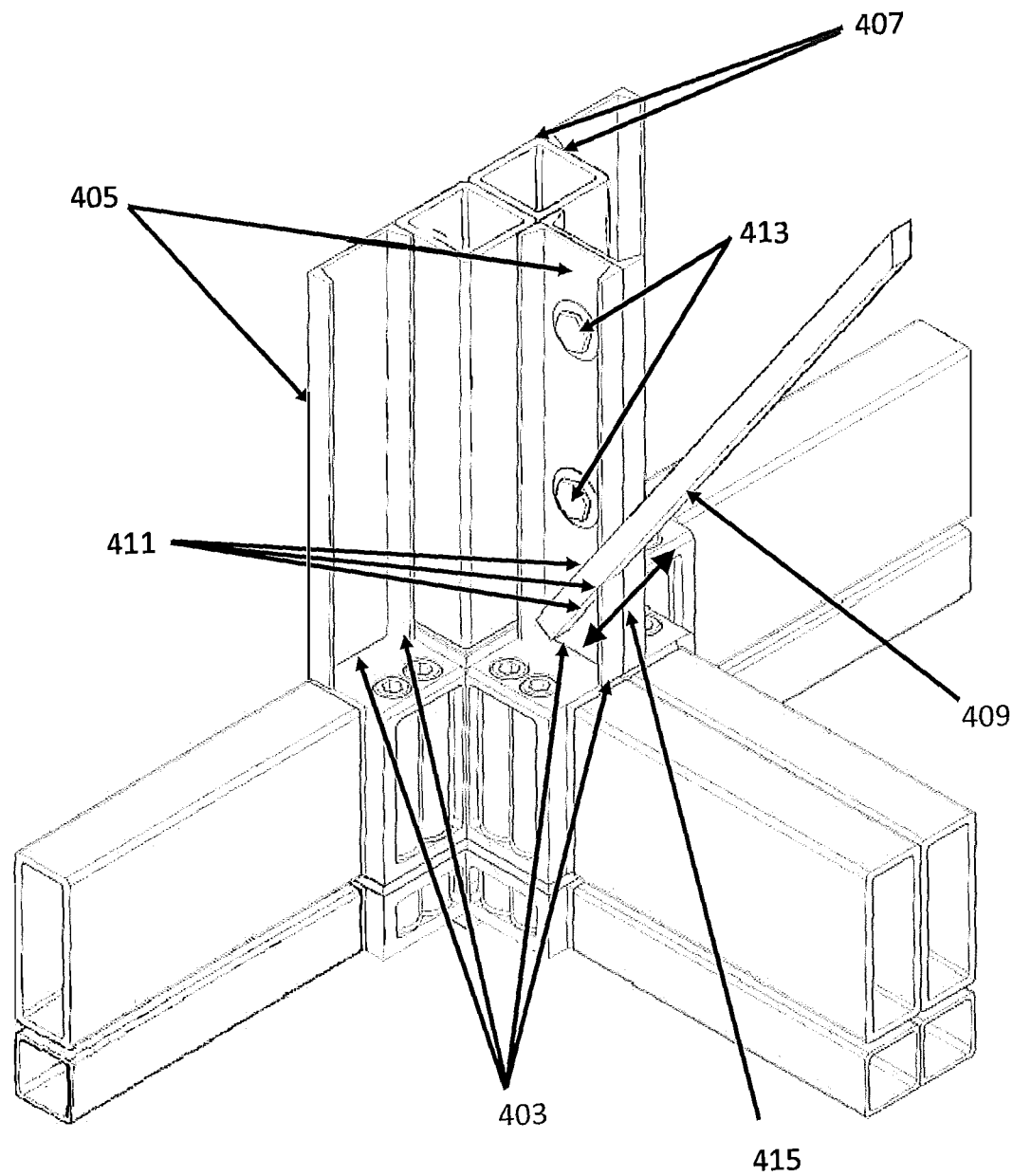
FIG. 17 discloses a perspective view of a section of an embodiment of a modular frame having the connector assembly, disclosed herein.
Figure 18:
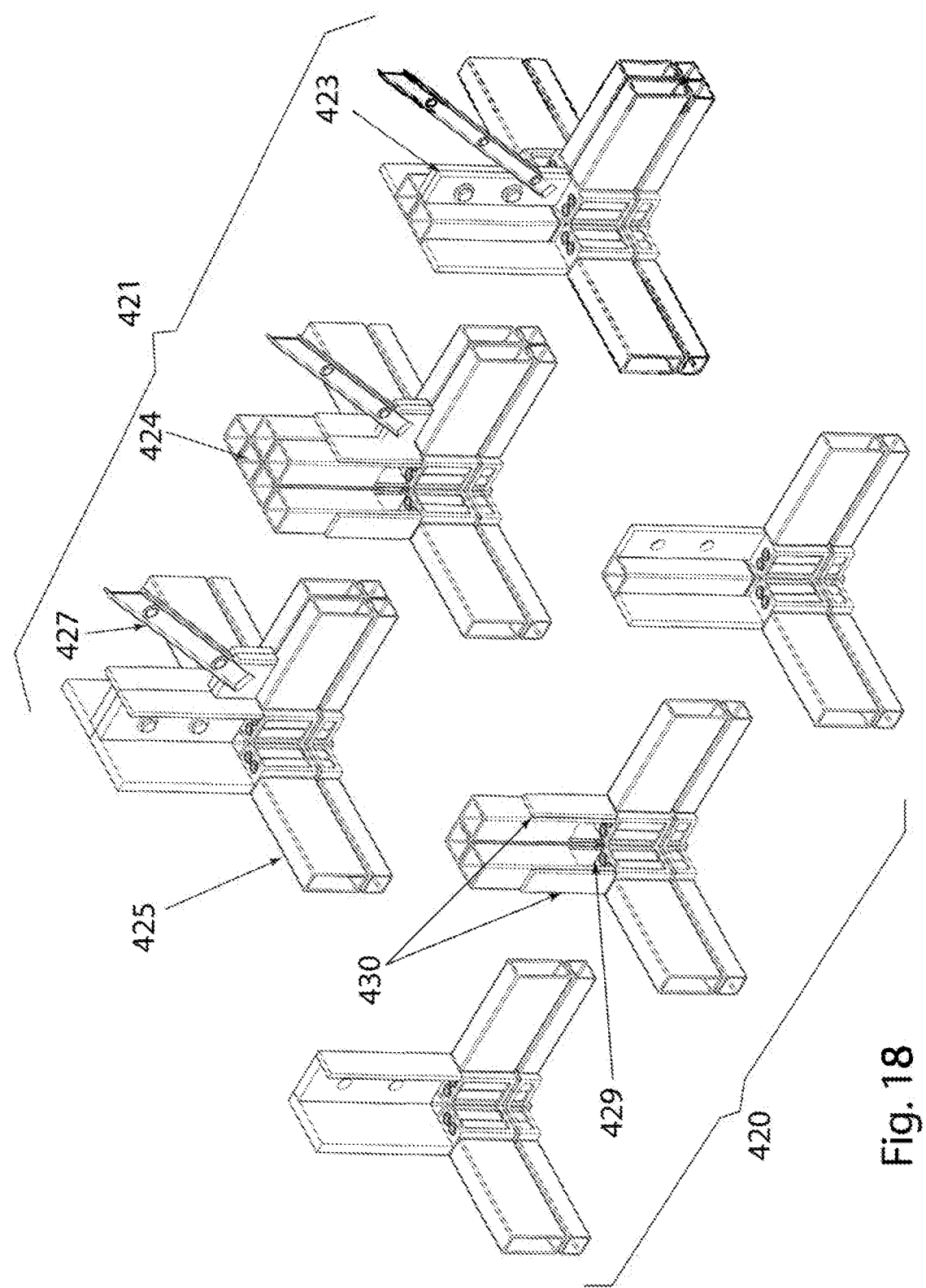
FIG. 18 discloses a perspective view of a section of embodiments of a modular frame having the connector assembly, disclosed herein.
Figure 19:
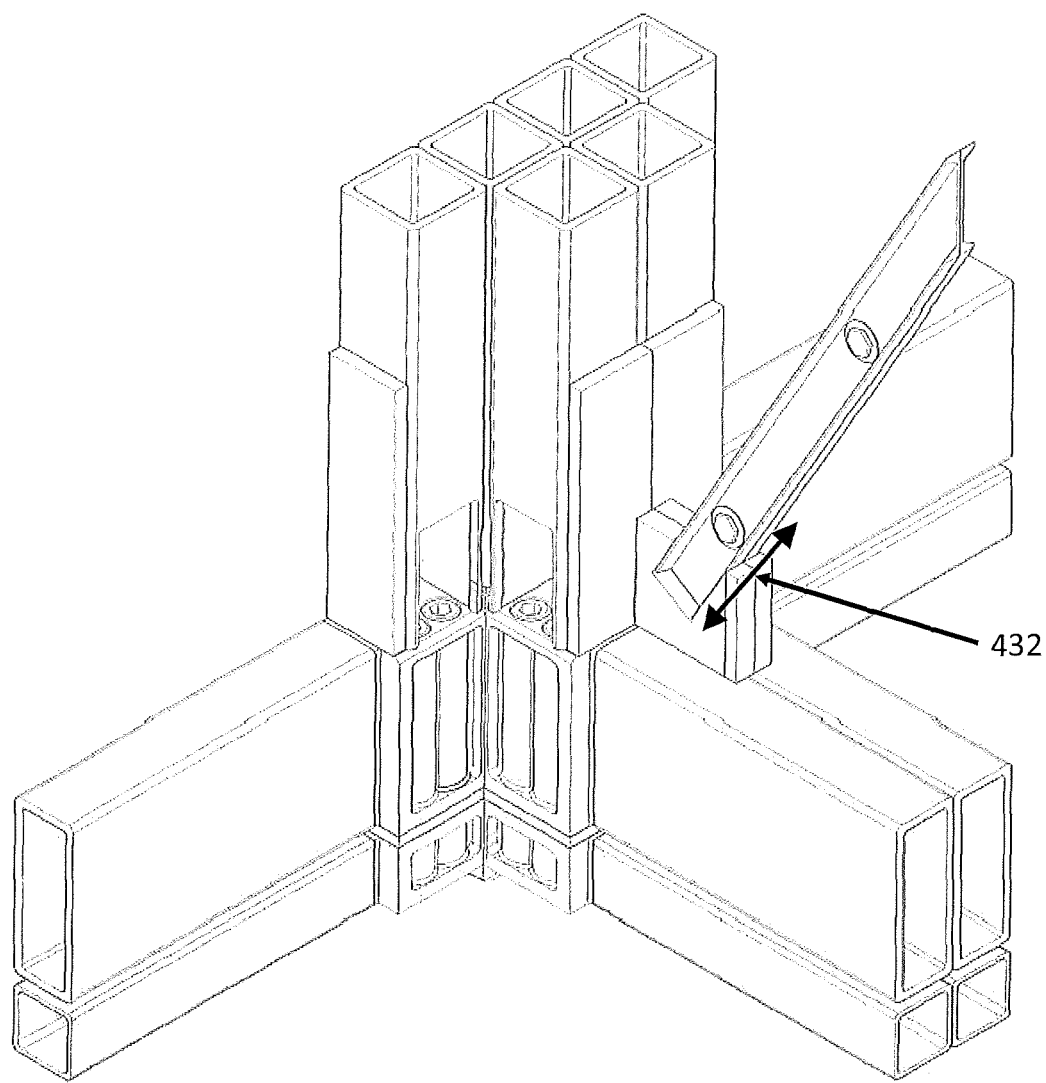
FIG. 19 discloses a perspective view of a section of another embodiment of a modular frame having the connector assembly, disclosed herein.

| No. | Description | No. | Description | No. | Description |
|---|---|---|---|---|---|
| 164 | Upper connector arm load bearing surface | 166 | Channel | | |
| 80 | Moment block connection fasteners | 82 | Gusset plate | 83 | Gusset plate connection fasteners |
| 85 | Holes for passage of moment block connection fasteners Figure 11 | 86 | Holes for fixing gusset plate | 88 | Module locating pin |
| 90 | Vertical mateline between two adjacent modules | 91 | Double gusset plate | 92 | Hallway pedestal landing extension on gusset plate |
| 94 | Intermediate hallway support pedestal | 95 | Split hallway support pedestal for hallway slab end | 97 | Support pedestal shear studs |
| 98 | Support pedestal fasteners Figure 12 | 99 | Support pedestal fastener access hole | | |
| 100 | Floor board in module | 101 | Floor slab in hallway | 103 | Surface In contact with underside of hallway slab |
| 104 | Moment block. connection fasteners installed to flush condition Figure 13 | 105 | Leave-out pieces of module floor board installed after assembly | 107 | Horizontal mateline between two layers of modules |
| 108 | Hallway slab | | | | |
| 400 | Isometric view of partial range of column types that 2 moment block types can be connected to Figure 17 | 401 | Plan view of partial range of column types that a 4" × 4" block can be connected to | 402 | Plan view of partial range of column types that a 6" × 6" block can be connected to |
| 403 | Location of welds to upper face of arms of lower block | 405 | Reinforcing members | 407 | Location of welds joining vertical reinforcing members to column |
| 409 | Diagonal brace | 411 | Location of welds of diagonal brace to be executed while frame is in fixture | 413 | Bolts to unite adjacent column reinforcements |
| 415 | Range of diagonal brace adjustment prior to welding in place Figure 18 | | | | |
| 420 | Views of single module corner columns | 421 | Views of combined module corner columns | 423 | HSS column with bar reinforcement |
| 424 | HSS column reinforced by bundling | 425 | Column fabricated from plate | 427 | Diagonal brace fabricated from adjacent channels joined back to back |
| 429 | Fastener access openings in HSS columns Figure 19 | 430 | Reinforcement at fastener access opening | | |
| 432 | Range of adjustment of diagonal brace. during assembly Figure 20 | | | | |
| 500 | plate for supporting floor material and establishing a seal in the corner area | 501 | fastening holes in floor support plate | 502 | accessory connection holes |

-continued

| No. | Description | No. | Description | No. | Description |
|---|---|---|---|---|---|
| | *Figure 21* | | | | |
| 510 | single hole connection block with shortened arms | 511 | Short arm | 512 | single hole in short arm |
| | *Figure 22* | | | | |
| 520 | connector with longer arms and three holes for vertical tension bolts | 521 | Arms | 522 | dashed lines showing possible arm lengths |
| | *Figure 23* | | | | |
| 530 | Intermediate lower connector with short arms | 531 | Short arms | 532 | accessory connection points |
| | *Figure 24* | | | | |
| 540 | upper corner connection block | 541 | shortened arms | 542 | single vertical tension bolt |
| | *Figure 25* | | | | |
| 550 | lower corner connector with apertures and reinforcing ribs | 551 | Apertures | 552 | exposed shanks of vertical tension bolts |
| 553 | reinforcing ribs | | | | |
| | *Figure 26* | | | | |
| 550 | lower corner connector with apertures and reinforcing ribs | 551 | Apertures | 553 | reinforcing ribs |
| | *Figure 27* | | | | |
| 570 | column to connector size transition adapter | 571 | weld backer | 572 | |Reinforcing ribs |
| 573 | Sloping faces | 574 | joining features on lower face | | |
| | *Figure 28* | | | | |
| 580 | lower plate connector | 581 | column made of plate | 582 | end bars on outer edge of plate column |
| 583 | weld preparation at arm end | 584 | weld preparation at lower edge of plate | 585 | Weep hole |
| 586 | Bolt holes | 587 | Cavity | | |
| | *Figure 29* | | | | |
| 580 | lower plate connector | 581 | column made of plate | 583 | weld preparation at arm end |
| 586 | bolt holes | | | | |
| | *Figure 30* | | | | |
| 580 | upper plate connector | 581 | column made of plate | 601 | upper end of column made of plate |
| 602 | location of vertical weld on arm end | 603 | location of welds to upper face of arm and body | 604 | location of welds to underside of arm and body |
| 605 | threaded holes to receive vertical tension fasteners (typ) | 606 | threaded hole to receive gusset plate fasteners (typ) | | |
| | *Figure 31* | | | | |
| 580 | upper plate connector | 601 | upper end of column made of plate | 602 | location of vertical weld on arm end |
| 603 | location of welds to upper face of arm and body | 605 | threaded holes to receive vertical tension fasteners (typ) | 606 | threaded hole to receive gusset plate fasteners (typ) |
| 607 | opening to engage hoisting means | | | | |

| No. | Description | No. | Description | No. | Description |
|---|---|---|---|---|---|
| | Figure 32 | | | | |
| 620 | lower connection block with shear resistance slots | 621 | shear resistance slots | 622 | thickened area for slot |
| | Figure 33 | | | | |
| 620 | lower connection block with shear resistance slots | 621 | shear slots | 622 | thickened area for slot |
| | Figure 34 | | | | |
| 643 | gusset plate with shear resistance bars | 640 | shear resistance bars | 641 | optional extended gusset plate with additional shear resistance bars |
| 82 | gusset plate | | | | |
| | Figure 35 | | | | |
| 650 | upper connection block with shear resistance slots | 621 | shear resistance slots | 622 | thickened area for slot |
| 605 | threaded holes to receive vertical tension fasteners (typ) | 606 | threaded hole to receive gusset plate fasteners (typ) | 607 | opening to engage hoisting means |
| | Figure 36 | | | | |
| 620 | lower connection block with shear resistance slots | 650 | upper connection block with shear resistance slots | 621 | shear resistance slots |
| 605 | threaded holes to receive vertical tension fasteners (typ) | 606 | threaded hole to receive gusset plate fasteners (typ) | 80 | vertical tension fasteners |
| 83 | gusset plate fasteners | 643 | gusset plate with shear resistance bars | 640 | shear resistance bars |
| | Figure 37 | | | | |
| 80 | vertical tension fasteners | 670 | lower block | 671 | threaded holes for engaging vertical tension fasteners |
| 672 | gusset plate with through holes to pass fasteners or threaded holes for engaging vertical tension fasteners | 675 | upper connection block | 676 | drilled holes for passing vertical tension fasteners through lower block |
| | Figure 38 | | | | |
| 680 | typical un-extended double gusset plate | 681 | extension of gusset plate | 682 | holes for the connection of accessories |
| 683 | hallway slab or accessory connection block | 684 | bolts or studs to engage to concrete or other material | 685 | Fasteners for joining accessories |
| | Figure 39 | | | | |
| 690 | side view of structurally graduated stack with increasing numbers of vertical structural elements | 691 | perspective view of structurally graduated stack with increasing numbers of vertical structural elements | 692 | Increasing weight per foot and load-bearing capacity |
| 694 | portion of column fabricated with built up plate | 695 | connection blocks with various arm lengths | 696 | groups of vertical structural elements |
| | Figure 40 | | | | |
| 570 | column to connector size transition adapters | 700 | side view of structurally graduated stack with Increasing numbers of vertical structural elements | 701 | perspective view of structurally graduated stack with increasing numbers of vertical structural elements |

| No. | Description | No. | Description | No. | Description |
| --- | --- | --- | --- | --- | --- |
| 702 | Increasing weight per foot and load-bearing capacity | 703 | portion of column fabricated with built up plate | 704 | Increasingly larger tubular sections |

What is claimed is:

1. A connector assembly, comprising an upper connector coupled to a lower connector and a gusset plate sandwiched between the upper and lower connectors, the lower connector comprising:
   - a lower connector body having a lower connector body column receiving end and a lower connector body gusset contact end, the lower connector body column receiving end being configured for receiving a first end of a first module frame and the lower connector body gusset contact end being configured for coupling to the gusset plate;
   - at least a pair of lower connector arms, each lower connector arm coupled to and extending from the lower connector body and having lower connector arm inner face, a lower connector arm outer face, a lower connector arm gusset contact face, a lower connector arm load bearing face and a lower connector arm beam contact face, the lower connector arm beam contact face being positioned distal from the lower connector body, and each lower connector arm having at least one fixing aperture on the lower connector arm load bearing face configured to receive a first fastening means that couples the lower connector to the upper connector; and
   - a lower connector arm boss coupled to and extending from the lower connector arm beam contact face of each lower connector arm, the lower connector arm boss having a lower connector arm weld receiving bevel extending from a distal end of the lower connector arm and a lower connector arm weld backer extending from the lower connector arm weld receiving bevel;

the upper connector comprising:
   - an upper connector body having an upper connector body column receiving end and an upper connector body gusset contact end, the upper connector body column receiving end being configured for receiving a first end of a second module frame and the upper connector body gusset contact end being configured for coupling to the gusset plate;
   - at least a pair of upper connector arms, each upper connector arm coupled to and extending from the upper connector body and having an upper connector arm inner face, an upper connector arm outer face, an upper connector arm gusset contact face, an upper connector arm load bearing face and an upper connector arm beam contact face, the upper connector arm beam contact face being positioned distal from the upper connector body, and each upper connector arm having at least one upper connector arm fixing aperture for receiving configured to receive a second fastening means that couples the lower connector to the upper connector and at least one upper connector arm gusset coupling aperture configured to receive a third fastening means that couples the upper connector to the gusset plate; and
   - an upper connector arm boss coupled to and extending from the upper connector arm beam contact face of each upper connector arm, the upper connector arm boss having an upper connector arm weld receiving bevel extending from a distal end of the upper connector arm and an upper connector arm weld backer extending from the upper connector arm weld receiving bevel;

the gusset plate comprising:
   - a gusset plate first face, a gusset plate second face and gusset plate through holes configured to receive each of the fastening means that couple the upper and lower connectors.

2. The connector assembly according to claim 1, wherein the fixing apertures are positioned proximate to the lower connector arm inner face providing a load bearing surface proximate to the lower connector arm outer face.

3. The connector assembly according to claim 1, wherein the lower connector arm load bearing face is spaced from the lower connector body column receiving end.

4. The connector assembly according to claim 1, wherein the lower connector arm boss is positioned proximate to the lower connector arm outer face and spaced from an edge proximate to the lower connector arm inner face.

5. The connector assembly according to claim 1, wherein the upper connector arm fixing apertures are positioned proximate to the upper connector arm inner face providing an upper connector arm load bearing surface proximate to the upper connector arm outer face.

6. The connector assembly according to claim 1, wherein the upper connector arm load bearing face is spaced from the upper connector body column receiving end, with the upper connector arm load bearing face being proximate to the upper connector body gusset contact face than the upper connector body column receiving end.

7. The connector assembly according to claim 1, wherein the upper connector arm boss is positioned proximate to the upper connector arm outer face and spaced from the edge proximate to the upper connector arm inner face.

8. The connector assembly according to claim 1, wherein at least one of the lower connector body or the upper connector body have one or more bores adapted for receiving affixing means.

9. The connector assembly according to claim 1, wherein at least one of the upper connector body or the lower connector body has a column receiving bevel and a weld backer for cooperatively engaging a frame structure.

10. The connector assembly according to claim 1, wherein the lower connector body and the upper connector body have a square shaped cross-section.

11. The connector assembly according to claim 1, wherein at least one of the lower connector or upper connector have an aperture extending from an inner face to an outer face, and further comprise diagonal reinforcing ribs.

12. The connector assembly according to claim 1, wherein at least one of the lower connector or upper connector have a cut-out on an outer face and the arms of the connector extend towards an outer face of the arm.

13. The connector assembly according to claim 1, wherein at least one of the lower connector or upper connector further comprise slots on the gusset contact face for receiving bars on a respective gusset face.

14. The connector assembly according to claim 1, further comprising a locating pin positioned on the gusset plate first face for engaging a locating pin receiving aperture on a lower connector body gusset contact face for positioning the lower connector on the gusset plate.

15. The connector assembly according to claim 14, wherein the lower connector arm gusset contact face lies in a plane defined by the lower connector body gusset contact face.

16. The connector assembly according to claim 1, wherein the upper connector arm gusset contact face lies in a plane defined by an upper connector body gusset contact face.

17. The connector assembly according to claim 16, wherein the upper connector body gusset contact face has a substantially T-shaped opening.

18. The connector assembly according to claim 1, further comprising a flange or plate extending from the arms of the lower connector towards an inner face of the lower connector.

19. The connector assembly according to claim 18, wherein the flange or plate is coplanar with the lower connector arm load bearing face.

20. A hoistable connector assembly, comprising the connector assembly as defined in claim 1 and a lifting device detachably attachable to one of the upper or lower connector.

21. The hoistable connector assembly according to claim 20, wherein the lifting device is detachably attachable to the upper connector.

22. A liftable frame assembly, comprising:
at least a pair of beams having an upper end and a lower end;
struts coupled to the at least pair of beams forming a liftable frame structure;
a plurality of first hoist blocks releasably affixed to the upper ends of the beams and slidably moveable from a first position to a second position on the beams when released;
load bearing cables coupled to the plurality of first hoist blocks;
a plurality of second hoist blocks releasably affixed to the lower end of the beams and slidably moveable from the first position to the second position of the beams when released; and
the connector assembly as defined in claim 1, the connector assembly being a lifting connector assembly coupled to the plurality of second hoist blocks on one end of the lifting connector assembly and to a modular frame unit on another end of the lifting connector assembly.

23. A system utilizing the connector assembly of claim 1 for coupling adjacent modular frame units for forming a modular building, comprising:
a first module frame unit having a first module frame unit first end coupled to a first module frame unit connector;
a second module frame unit positioned adjacent to the first module frame unit and having a second module frame unit first end having a second module frame unit connector; and
a floor section having pedestals coupled to a slab, the pedestals having an opening adapted for coupling the pedestals to the first and second module frame unit connectors; and
wherein the first and second module frame unit connectors are one of the upper or lower connectors, and having a bore in the hollow body adapted for receiving and coupling the pedestals.

24. A system of modular frame units for forming a modular building, the system utilizing the connector assembly of claim 1, comprising:
a first module frame unit having a first end coupled to the lower connector;
a second module frame unit having a first end coupled to the upper connector; and
the upper and lower connected being coupled and sandwiching the gusset plate.

25. A system for vertically and horizontally joining modular frame units for forming a modular building, comprising the system as defined in claim 24.

26. A method of coupling modular frame units for forming a modular building, the method utilizing the connector assembly of claim 1, comprising:
coupling the lower connector to a first end of first module frame unit;
coupling the upper connector to a first end of second module frame unit; and
sandwiching the gusset plate and coupling the upper and lower connectors to form modular frame units.

27. A module frame unit comprising the the connector assembly as defined in claim 1.

28. A building comprising the module frame unit of claim 27.

* * * * *